(12) United States Patent
Sharma et al.

(10) Patent No.: US 11,875,163 B1
(45) Date of Patent: Jan. 16, 2024

(54) SYSTEM AND METHOD FOR GENERATING A USER INTERFACE FOR VISUALIZATION, IN COMBINATION, ENVIRONMENTAL, SOCIAL, AND GOVERNANCE ( ESG ) AND FINANCIAL ANALYTICS PRELIMINARY

(71) Applicant: MORGAN STANLEY SERVICES GROUP INC., New York, NY (US)

(72) Inventors: Srijan Sharma, Montreal (CA); Andrew Kyle Ford, Cranford, NJ (US); David Anthony Senn, New York, NY (US); Sowmya Viswanath, New York, NY (US); Haridass Ramachandran, Princeton Junction, NJ (US); Amit Kumar Goel, Morganville, NJ (US); Anirudh Gopal, Montreal (CA)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 18/367,993

(22) Filed: Sep. 13, 2023

(51) Int. Cl.
*G06F 3/048* (2013.01)
*G06F 9/451* (2018.01)
*G06F 3/04842* (2022.01)
*G06F 3/0482* (2013.01)
*G06T 11/20* (2006.01)

(52) U.S. Cl.
CPC ............ *G06F 9/451* (2018.02); *G06F 3/0482* (2013.01); *G06F 3/04842* (2013.01); *G06T 11/206* (2013.01)

(58) Field of Classification Search
None
See application file for complete search history.

(56) References Cited

U.S. PATENT DOCUMENTS

| | | | |
|---|---|---|---|
| 10,521,863 B2 | 12/2019 | Stoner, Jr. et al. | |
| 10,902,484 B1 | 1/2021 | Pepere et al. | |
| 11,188,983 B1 | 11/2021 | Joshi et al. | |
| 11,328,361 B2 | 5/2022 | Xie et al. | |
| 11,704,308 B1 | 7/2023 | Starnes et al. | |
| 11,704,330 B2 | 7/2023 | Kim et al. | |
| 2006/0200358 A1* | 9/2006 | Ohnemus | G06Q 10/06393 345/619 |
| 2018/0225764 A1 | 8/2018 | Donia | |
| 2019/0362427 A1 | 11/2019 | Chen et al. | |
| 2022/0027814 A1* | 1/2022 | Lalit | G06Q 10/0639 |
| 2022/0277044 A1 | 9/2022 | Kim et al. | |
| 2022/0343433 A1 | 10/2022 | Yan et al. | |
| 2022/0350809 A1* | 11/2022 | Bradley | G06F 16/2272 |
| 2022/0414560 A1* | 12/2022 | Abele | G06Q 40/04 |
| 2023/0068433 A1* | 3/2023 | Puls | G06Q 10/06393 |

* cited by examiner

*Primary Examiner* — Thanh T Vu
(74) *Attorney, Agent, or Firm* — WEITZMAN LAW OFFICES, LLC

(57) ABSTRACT

A system includes one or more processors and software, executable by the one or more processors that, when executed by the one or more processors, cause the system to retrieve Environmental, Social & Governance (ESG) related data from one or more first databases, retrieve financial-related data from one or more second databases, and generate a dynamically interactive graphical user interface (GUI), containing a combination of ESG and financial information, the GUI having multiple GUI Modules including a Screening GUI Module, a Ratings GUI Module, a Climate GUI Module, and a Sustainability GUI Module.

9 Claims, 36 Drawing Sheets

FIG. 16

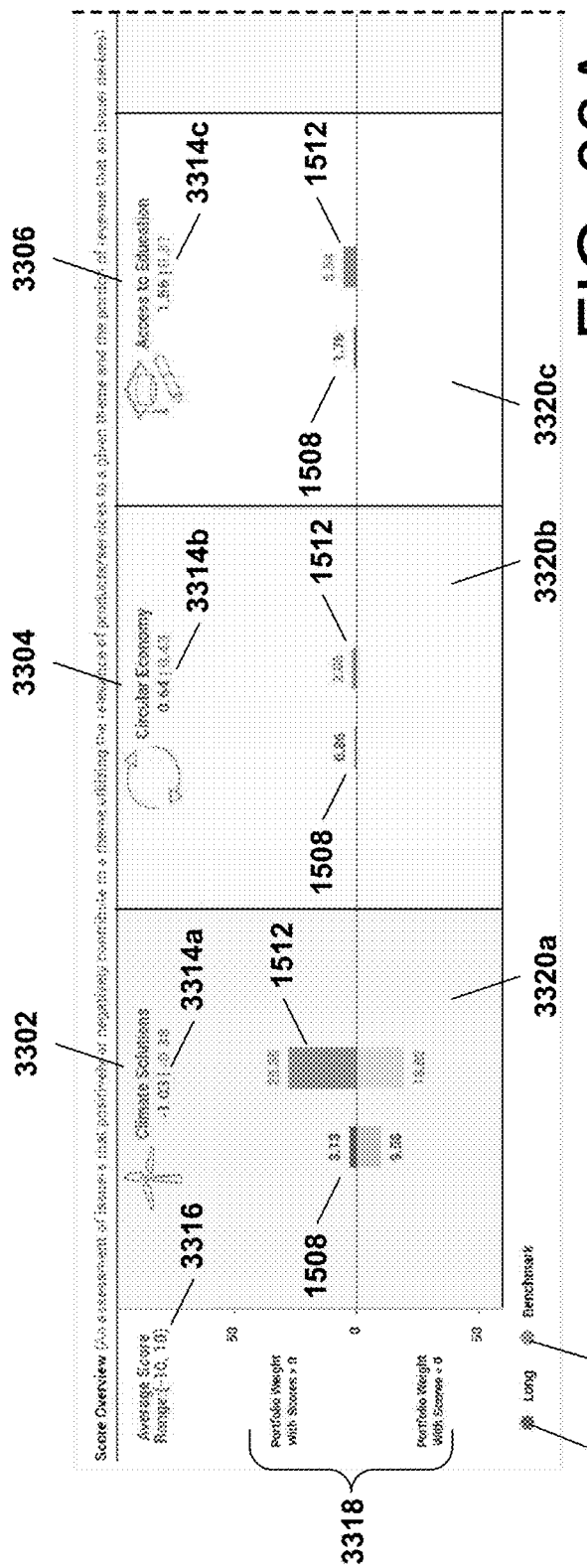
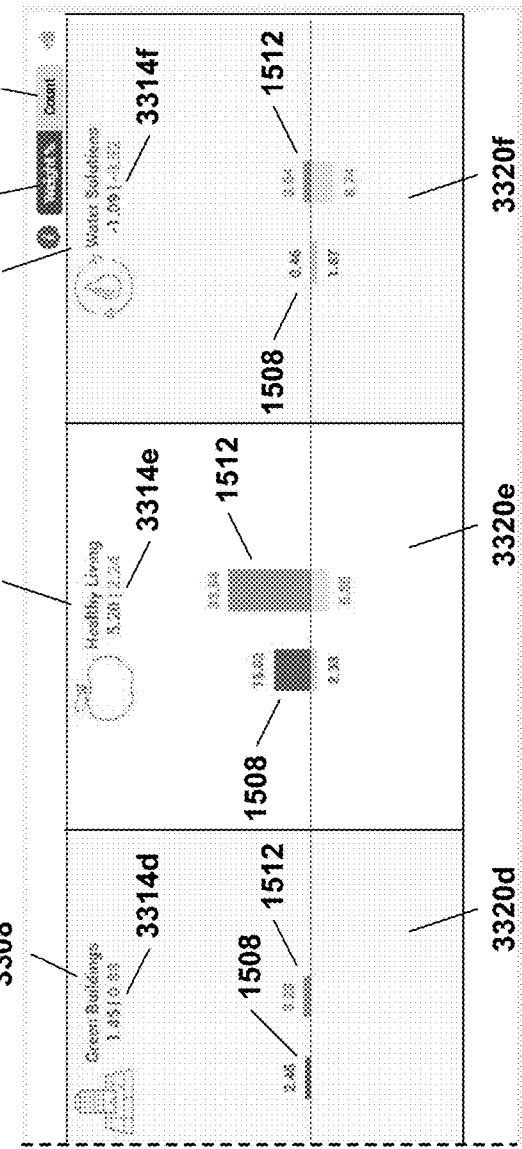
FIG. 33A
FIG. 33B

FIG. 36

Portfolio Settings: Rescale Portfolio Weights: ⬤

Benchmark: [____] 420

| Sustainability Indicators | Long | Short | Benchmark | Long vs Benchmark | % Assessed (Long) | % Assessed (Short) | % Assessed (Benchmark) |
|---|---|---|---|---|---|---|---|
| Sustainability Indicators | | | | | | | |
| Weights | | | | | | | |
| GHG Emissions (Tonnes CO2e) | | | | | | | |
| Scope 1 | | | | | | | |
| Scope 2 | | | | | | | |
| Scope 3 | | | | | | | |
| Total | | | | | | | |
| Carbon Footprint (Tonnes CO2e / $M) | | | | | | | |
| GHG Intensity (Tonnes CO2e / $M Revenue) | | | | | | | |
| Exposure to Fossil Fuels (% Weight) | | | | | | | |
| Energy Production (Non-Renewable GWh / Renewable GWh) | | | | | | | |
| Non-Renewable Energy Production (% of Total Production) | | | | | | | |
| Renewable Energy Production (% of Total Production) | | | | | | | |
| Energy Consumption for "High Impact Climate Sectors" (Tonnes CO2e / $M Revenue) | | | | | | | |
| Exposure to Investments Negatively Affecting Biodiversity-sensitive Areas (% Weight) | | | | | | | |
| Water Footprint (Cubic Meters / $M) | | | | | | | |
| Hazardous Waste Footprint (Tonnes / $M) | | | | | | | |
| Exposure to Violations of UNGC Principles or OECD Guidelines (% Weight) | | | | | | | |
| Exposure to Non-UNGC Signatories (% Weight) | | | | | | | |
| Board Gender Diversity (Female / Total) | | | | | | | |
| Female Board Members (Avg) | | | | | | | |
| Male Board Members (Avg) | | | | | | | |
| Exposure to Controversial Weapons (% Weight) | | | | | | | |

3600

3602

US 11,875,163 B1

SYSTEM AND METHOD FOR GENERATING A USER INTERFACE FOR VISUALIZATION, IN COMBINATION, ENVIRONMENTAL, SOCIAL, AND GOVERNANCE ( ESG ) AND FINANCIAL ANALYTICS PRELIMINARY

FIELD OF THE INVENTION

This disclosure relates generally to computers and, more particularly, to computer systems for generating graphical user interfaces (GUIs).

BACKGROUND

Environmental, Social and Governance (ESG) is a concern of some investors and financial services providers. That concern, as caused entities to develop analytics reflecting, and to assist in making investment decisions, based upon ESG factors.

Presently, there is a lot of ESG-related information available but it is difficult to intelligibly relate that information to commonly used financial factors so that appropriate investment decisions can be made that take into account desired ESG, aspects let alone make it possible to dynamically see the interaction if aspects of either are changed.

The lack of a way to visualize ESG information, particularly alongside financial metrics or with traditional financial characteristics, is a problem for those wishing to include ESG factors in their financial decision-making process.

Satisfactory solutions for the aforementioned problem(s) remain elusive.

SUMMARY

This disclosure describes solutions that provide significant advances in addressing the aforementioned problems.

One aspect of this disclosure involves a system including one or more processors and software, executable by the one or more processors that, when executed by the one or more processors, cause the system to a) retrieve Environmental, Social & Governance (ESG) related data from one or more first databases; b) retrieve financial-related data from one or more second databases; c) generate a dynamically interactive graphical user interface (GUI) comprising multiple GUI Modules comprising a Screening GUI Module, a Ratings GUI Module, a Climate GUI Module, and a Sustainability GUI Module. The Screening GUI Module is generated by an ESG Micro Service and comprises at least two interactive, dynamically interrelated displayable panes containing a concurrent combination of i) ESG information based upon some of the ESG related data retrieved from the one or more first databases and ii) financial information based upon some of the financial-related data retrieved from the one or more second databases, such that, when a component within one of the at least two interactive, interrelated panes of the Screening GUI Module is selected, contents of at least an other of the at least two interactive, interrelated panes of the Screening GUI Module will automatically be updated in real-time based upon the selection; and d) receive a user selection of a component of a pane within a specific pane of the Screening GUI Module and generate, in real-time, an updated view in a chart within a different pane of the Screening GUI Module.

Another aspect of this disclosure involves a system having one or more servers and software, executable within the one or more servers which, when executed, implement an ESG Microservices instance and causes the system to: a) retrieve Environmental, Social & Governance (ESG) related data from one or more first databases; b) retrieve financial-related data from one or more second databases; c) generate, using the ESG Microservices instance, a dynamically interactive graphical user interface (GUI) comprising a Screening GUI Module, a Ratings GUI Module, a Climate GUI Module, and a Sustainability GUI Module; and d) receive a user selection of a component of a pane within a specific pane of the Screening GUI Module and generate, in real-time, an updated view in a chart within a different pane of the Screening GUI Module.

BRIEF DESCRIPTION OF THE DRAWINGS

This disclosure is further described in the detailed description that follows, with reference to the drawings, wherein the same reference numbers appearing in the various drawings and description designate corresponding or like elements among the different views. and in which:

FIG. 16 shows, in simplified form, an example chart that can be displayed in a pane of FIG. 14;

FIGS. 33A-33B, in combination show, in simplified form, the left and right sides of an example chart that can be displayed in a pane of FIG. 32;

FIG. 36 shows, in simplified form, an example chart that can be generated by the Sustainability Micro Service 232 for display in the GUI as part of the Sustainability GUI Module.

DETAILED DESCRIPTION

Figure 1:
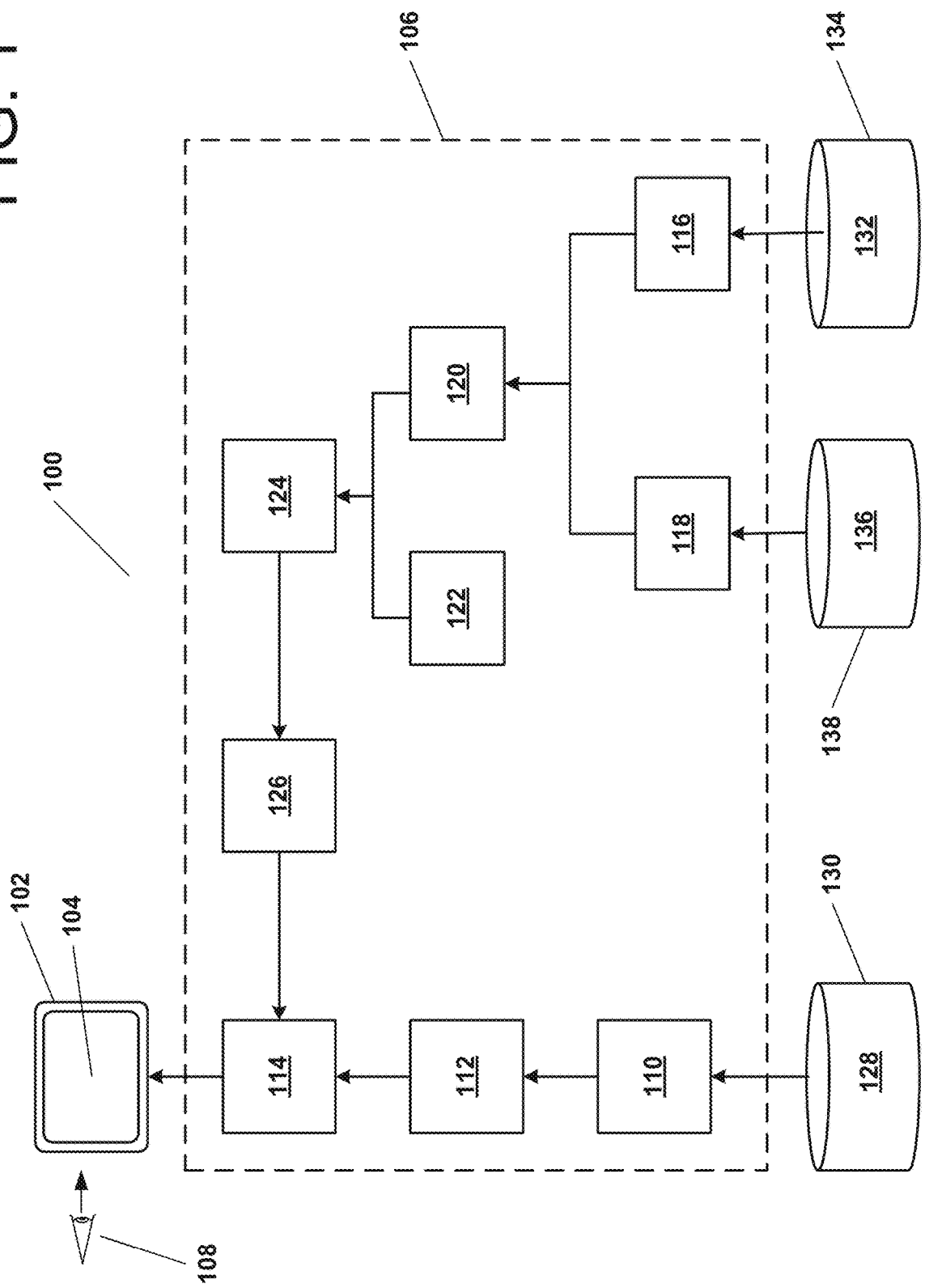
FIG. 1 illustrates, in simplified form, one representative example of a computer system architecture implementing the approaches described herein.

We have devised a system and method that allows users to view the ESG exposures and impacts alongside the financial characteristics of the portfolio. Through our unique graphical user interface (GUI) we make it possible to view the ESG impact of financial/economical optimization decisions on investment and trading portfolios and vice versa.

The system, method and GUI allow a user to view the ESG impact of an adjustment to a portfolio, for example, based on econometric goals or market conditions, thereby providing a unique way of assessing the impact of a purely econometric decision on a portfolio's ESG landscape.

The system, method and GUI further provide analytics on multiple dimensions of a portfolio's sustainability-related opportunities and exposure which can be utilized in portfolio construction and/or trading across a spectrum of sustainability approaches.

Our system, method and GUI, make it possible to:

1) Visualize a portfolio's exposure to business activities, issues or sectors based on a screening subcategory and revenue threshold;

2) Evaluate a portfolio's overall environmental, social and governance ratings including sectors and geographies driving the scores;

3) Evaluate a portfolio's weighted average carbon intensity or financed emissions;

4) Project carbon price impacts on a portfolio's earnings adjusted to a user selected climate scenario and time;

5) Evaluate a portfolio's contribution to various sustainability themes; and/or

6) Benchmark a portfolio's performance relative to some benchmark portfolio.

The interactive GUI provides a mechanism that allows adjustment of environmental and social preferences and visually provides a quantitative assessment of the adjustment. Some variants further provide an option to adjust an existing portfolio, based upon the adjustments, to better align the portfolio with the values indicated by the adjustment.

In overview, our system comprises of several individual modules that allow a portfolio manager/trader to import a set of positions or trades, and, using our unique GUI that combines the ESG and financial aspects in a visual display, they can adjust positions to the desired environmental and financial exposures, quantitatively assess positions on sustainability impact areas, and benchmark investments against market indices and custom holdings. As a result, we make it possible for a user to easily visualize and understand the ESG characteristics of a portfolio (or long- or short-only portion thereof).

With our system, method and GUI, a user can view sustainability information across a net portfolio, long leg, or short leg. As sustainability information is changed, the system and method will dynamically update the GUI display. Likewise, benchmarks, which may be an index (e.g., the S&P 500, Dow Jones Industrial, NASDAQ Composite, Russell, etc.) or a specific financial product or portfolio, can be dynamically switched with the switch causing a change throughout all relevant portions of the GUI to allow for comparisons to be made against some other portfolio (actual or hypothetical).

Thus, our system, method and GUI make it possible to highlight a portfolio's exposure to the ESG-impacting business activities of issuers or sectors based on an underlying screening sub-categories and revenue thresholds. It further provides for drill down analysis facilitating selecting and adjusting a portfolio's exposure to any of multiple screening subcategories, and further provides the capability to interactively adjust a revenue threshold according to preference.

As a result, our system, method and GUI collectively interoperate to capture unique ESG preferences and help analyze and compare a portfolio against a benchmark investment. As such, they not only make it possible to visualize current exposures, but they also allow for planning for future adjustments, for example, by highlighting decarbonization efforts and reduction targets, impact scenarios of future carbon tax changes on a company's earnings in EBITDA form. Likewise, our system, method and GUI collectively interoperate to provide analytics describing the impact of a portfolio on the environment and the portfolio's performance based upon various sustainability indicators. Moreover, our system, method and GUI allows users to set thresholds on parameters such as revenue and carbon footprint making it possible to adjust an existing portfolio according to threshold-based preferences.

In simplified overview, our system and method involve an underlying engine that breaks down a portfolio into long, short, and net components, and then computes the portfolio's weighted ESG metrics across several factors and cuts of the portfolio. The associated GUI captures user-specified sustainable impact preferences and generates visualizations for the portfolio's analytics compared to specified benchmark portfolios.

The system draws from multiple data sources stored in non-transitory storage, such as market data, historical pricing, risk models, volume distributions & impact models, in order to determine the economic and trading characteristics for a specified portfolio. The system and method interoperate to obtain ESG data pertaining to Climate, Common Screening Factors, ESG Ratings & Thematic and builds a data cache of such data for use in the interactive analysis described herein. The system and method are interacted with via a unique GUI as described herein that provides for unique concurrent visualization of ESG and financial information in an interrelated manner.

A portfolio engine within the system accepts a specified portfolio of positions/trades. This engine drives the GUI and allows a user to adjust/optimize the portfolio as per their target needs involving ESG-related preferences and factors.

In operation, our methods compute financial metrics using, for example, Barra factor models or proprietary trading impact models, along with historical pricing and volume data. The system and method further interoperate to auto detect an appropriate benchmark to be used for comparative study, which may be selected from, for example, depending upon the particular implementation, conventional financial indexes, financial services provider-created benchmarks or ESG-specific benchmarks. According to the example method described herein, the portfolio and benchmark are then handed over to ESG engines. The ESG engines are made up of multiple micro services that are responsible for different aspects of the ESG spectrum. Example, one set of micro services would compute climate exposures, another set of micro services would compute sustainability metrics like weapons exposure & ethics related exposures.

A common screener module is then used to then provide an overall ESG view for the portfolio in the GUI.

The engines comprise software that is written in a generic fashion such that they can load and evaluate different modules as needed. This allows for scaling based on demand for specific functionality. The engines also compute metrics and exposures for different cuts of a portfolio and a specified benchmark portfolio while controlling for user-specified (and adjustable) range of percentage of revenue thresholds.

The GUI is interactive in that it allows a user to pick specific cuts of a portfolio and dive deeper into, or explore specific facets of, the ESG landscape like climate/carbon exposures, ratings, future carbon reduction targets etc.

Some implementations can include additional modules such as an ESG Hedge builder which would use an ESG specific factor model to allow for construction of a theoretical hedge portfolio that would offset the ESG exposures in a portfolio's current holdings. To do so, the system and method would accept a specific set of target exposures, given a current portfolio, and apply an optimizer model to create a hedge portfolio that offsets the original portfolio for the desired levels of exposures.

In further simplified overview, the GUI is made up of multiple families of dynamically interrelated panes which, purely for simplicity of reference and understanding, are each referred to as "GUI Module", i.e., a "Screening" GUI Module, a "Ratings" GUI Module, a "Climate" GUI Module and a "Sustainable Themes" GUI Module.

Within the Screening GUI Module, the GUI allows a user to see the high-level categories of screens, dynamically change the Revenue Threshold used for all screens, and within specific charts select, highlight, or examine the information therein in greater detail. Threshold aspects can be manually changed or overridden, specific screening sub-categor(y/ies) can be selected which will dynamically cause updates to other portions of the GUI on the screen to allow for greater detail on, for example, GICS and Country exposures. Users can also switch between chart and table view, and how the information is aggregated (% portfolio weight, count of issuers, or $ amount of portfolio). The GICS chart therein allows flexibility to switch between various financial characteristics such as GICS 1, GICS 2, GICS 3, Market Cap, Country, Region, and Country Status. Again, selecting any of these automatically causes updates to propagate through other relevant portions of the display. The GUI also makes it possible for users to view the security-level holdings for either the long or short portions of a portfolio or benchmark.

The Ratings GUI Module includes similar features. A user can dynamically change between the Overall ESG Score, Environmental Score, Social Score, and Governance Score, with a change causing propagation of the relevant changed information into all other portions of the GUI displayed on the screen.

The Climate GUI Module includes sub-GUI Modules which allow for display of detail across Carbon Analysis, Emissions Reduction Targets, and Climate Change Revenues. Each sub-GUI Module further contains unique charts and visualizations. Within the Carbon Analysis sub-GUI Module's charts display how the weighted average carbon intensity (WACI) is broken out across a portfolio. Within the Emissions Reduction Targets sub-GUI Module, visualization of this categorical variable is provided and provides the flexibility to switch between Weight and Count. This sub-GUI Module also uniquely displays both carbon emissions data and emissions reduction data in the same chart, and gives users the ability to switch the metrics on the x-axis and the displayed bubble size.

Within the Sustainable Themes GUI Module, a user can dynamically select a specific theme within Score Overview and the GICS Level 1, and associated Distribution charts will each update accordingly. The content in this GUI Module can be further adjusted to change between Average Score, Count, and Weight, or to zoom into the Distribution charts.

With the foregoing general overview in mind, the details of the system, method and GUI will now be described.

FIG. 1 illustrates, in simplified form, one representative example of a computer system architecture 100 implementing the approaches described herein.

As shown in FIG. 1, the system architecture 100 involves at least one display 102 (for example, a computer monitor or display, a tablet computer or cell phone display), on which a graphical user interface ("GUI") 104, as will be described later, can be displayed. The display 102 is coupled to a computer system 106 which, depending upon the particular implementation, may be a single computer, an individual server or a group of servers, each having one or more processors (i.e., CPUs). The computer system 106 runs software using the one or more CPUs to cause certain data manipulations, as described herein, to occur and cause particular graphical images to be displayed on the at least one display 102 for viewing by one or more user(s) 108 so that such user(s) can interact with portions of the GUI 104 as described herein.

The system architecture 100 is made up of multiple, conceptual, software-implemented modules. Those modules include an ESG Dataset Generator 110, an ESG Dataset In-Memory Cache 112, ESG Microservices 114, a Product Pricing Service 116, a Product Reference Service 118, a Portfolio Characteristics Computation module 120, an Index Composition Provider 122, a Portfolio Creation/Editing Services module 124, and a Portfolio In-Memory Store 126. The ESG Dataset In-Memory Cache 112 Portfolio In-Memory Store 126 are cache memories that serve to increase throughput and reduce latency.

As shown in FIG. 1, the system architecture 100 is organized as follows. The ESG Dataset Generator 110 is configured to obtain ESG Derived Data 128 from non-transitory storage 130 that is accessible to the computer system 106. The ESG Dataset Generator 110 is coupled to the ESG Dataset In-Memory Cache 112, which is, in turn, coupled as an input source to the ESG Microservices 114.

The Product Pricing Service 116 is configured to obtain Pricing Data 132 from non-transitory storage 134 that is accessible to the computer system 106.

The following is example process flow for implementing the Product Pricing Service 116:

GetPricesForSecurities:
1. First initialize the request object with the provided fieldName, strike date time and symbols values.
2. Add necessary fields required for the security object like market data symbol & user Field, currency, output raw prices, fields, and trades.
3. Extract the query date and time from the strike date time member variable.
4. Use a tokenizer to split the strike date time string based on the letter "T" as a delimiter.
5. Store the extracted query date and query time values in the query date and query time output parameters, respectively.
6. Retrieve the query date and query time values and create a "Trades" element and iterate over the 'symbols' member variable using a "for" loop.
7. For each symbol, create a "Trade" element and add child elements representing the different attributes of the trade.
   a. The attribute values and text values of these child elements are set based on the symbol, query date, and query time.
8. Return the created "Trades" element.

Overall, the code flow starts with the construction of a product prices request object, which initializes its member variables. The service uses the strike date and time provided from the user input to fetch prices from a pricing data base. A unique trade date is generated by determining the strike date time in the request.

Likewise, the Product Reference Service 118 is configured to obtain Reference Data 136 from non-transitory storage 138 that is accessible to the computer system 106.

The Product Reference Service 118 retrieves a security product based upon a provided security id and search order. The Product Reference Service 118 accumulates the verifiable reference data for equity and listed derivative products. The Product Reference Service 118 provides coverage for any possible listing that can be traded. The Product Reference Service 118 aggregates the security descriptive information like description, country, of issue, traded currency and product classification. The Product Reference Service 118 uses the security id and search order parameters to perform a lookup in the product reference cache from the passed-in list and return the product details.

The following is example process flow for implementing the Product Reference Service 118:
1. Iterate through the list of products, For Each product in the request get the regional primary product
   a. Check if the given security id and security id type correspond to a regional BBCode. If so, use the product reference cache to retrieve the corresponding product.
   b. If the security id and security id type do not correspond to a regional BBCode, the flow calls the getPrimaryProduct function to retrieve the primary product for the security.
2. If a product is found in the product reference cache, it returns the product.
3. If no product is found, it performs a cascade series of searches with various security id types to determine the possible security ID types and merging them with the search order.
4. searchOrder is a dynamically updated traversal order based on the sequential search algorithm.
5. It then performs lookups using the guessed searchOrder, and if a product is found, it returns the product and updates the searchOrder.
6. If the in-memory product service cache doesn't contain the product data, it performs the same lookup steps again, but this time looking up the reference data database.

The following is example process flow for the getPrimaryProduct function which retrieves the primary ETS product from a provided list of security Id and Security id types.
1. Iterate over the products in the list using a "for" loop.
   a. If the reference data for the product has a primary market flag set, it is considered as a potential primary product.
   b. Track a previous product that had the primary market flag set, with the previous product pointer.
   c. If a product has both the primary market flag and primary issue flag set in the obtained reference data, previous product pointer is updated with the current product and the loop is terminated.
2. After iterating over all products, the function returns previous product pointer, which represents the primary product.

Depending upon the particular implementation, the non-transitory storage 134, 138 may be on the same physical storage unit or, as is more likely, can come from any of multiple physical storage units. The Product Pricing Service 116 and Product Reference Service 118 are both coupled as inputs to the Portfolio Characteristics Computation module 120.

The Portfolio Characteristics Computation module 120 calculates the validations of the constituent securities and creates a portfolio pulling in the securities reference data.

Specifically, the Portfolio Characteristic Computation module 120 populates product information for the given security element based on the attributes specified in the constituent characteristics. The portfolio characteristics are computed over multiple asset classes, global fund structures and transaction volume. The constituent level data is reconciled and distributed in a secure and scalable processes. The computations are normalized into standardized format and returned to the portfolio creator service. The portfolio characteristics metrics are then computed using securities reference data. This is done using the validatePortfolio function, which takes a Simple Object Access Protocol (SOAP) request message as input and performs the validation of portfolios and populates the response with the validation results.

The following is example process flow for the Validate-Portfolio function:

ValidatePortfolio
1. Get the root element of the request and create a response root.
2. Get the parameters and populate the product validation fields.
3. Get the securities in the portfolio and set the default security id type to market ID.
4. Determine if constituents are present in the analytics map or if a db lookup needs to be performed.
   a. Iterate through each security element.
   b. For each security in the portfolio perform an in-memory lookup for product reference data.
   c. If the constituent is not found, look up persisted db to fetch product data.
5. Return the response.

More particularly, the ValidatePortfolio function operates to get the root element of the request message and create the response root element. It Extracts the parameters from the request using the XPath expression and populate the vector with the default product validation fields. Then it extracts the securities from the request using the XPath expression and determines the default security ID type. Next, it checks if guesses should be made and if a database lookup should be performed based on the values of the XPath expressions. The process is iterated through each security element in the securities vector and or each security element it: a) validates the security by using the security element, default security ID type, result type and dbLookup as parameters. The security validation function returns a product object based on an in-memory store lookup or returns null if validation fails. If the validation succeeds (the product is not null), the security ID type of the security element is set to the result type and the product information function with the security element and product vector are populated as parameters. If the validation fails (product is null), the error value of the security element is set to the appropriate error string. Then each security element is added to the response root element and the response envelope is returned.

The following is example pseudocode for the Portfolio Characteristic Computation module 120:
1. Retrieve the database caches for composition and index family
2. Iterate over each attribute (price, VaR, beta) to populate respective values
3. Check if the attribute is for composition product
   a. Set the initial value of hasComposition as false
   b. Check if the composition cache is available for this product and set the attribute value in the security element
4. Check if the attribute is for the index family product
   a. Check if the index family cache is available
   i. Retrieve the index family value from the cache based on the product's issue ID
   b. Else if product not found
   i. Create a buffer and output stream to store the index data
   ii. Create the product index and write it to the output stream
   iii. Create a "Data" element in the response and set its text content as the index data from the buffer:
   Else
   a. Throw an exception with the message "Invalid number of parameters". Catch block to handle exceptions The Index Composition Provider 122 provides a benchmark that aligns a client's objectives and environmental preferences to their portfolio.

The following is example process flow for the Index Composition Provider 122:

Validate and Explode Benchmark Index:
1. Retrieve the user ID from the request header and declare a variable userId to store the user ID extracted from the request header
2. Retrieve the root elements from the request and response envelopes
3. Start the try block to handle exceptions:
   a. Retrieve the benchmark market ID from the request
   b. Retrieve the benchmark product from the product cache
4. Check if the user is entitled to the benchmark:
   a. If the user is not entitled to the benchmark, throw an exception: User is not entitled to the benchmark or invalid benchmark selected
5. Check if the benchmark product exists:
   a. If the benchmark product is not found, create a SOAP fault response with an error message and return the response.
6. Retrieve the product manager reference and declare a variable composite pointer to store the composite product related to the benchmark
7. Determine the type of benchmark and find the composite underlying:
   a. If the benchmark is a future or ETF, find the composite product by underlying
   b. Else, find the composite product by benchmark
8. Check if a composite product exists:
   a. If there is a composite product,
   Retrieve the composite components from the composite product:
   Iterate over the composite components and process each one:
9. Retrieve the required attributes from the product
   a. Get the RIC attribute from the product
   b. Get the shares attribute from the composite component and convert it to a double
10. Create a new Element pointer for the security and add the securityID, benchmark Shares attributes
11. Add the security element to the response root
12. If a composite product is not found, create a SOAP fault response and return it:
    Return the response.

The Portfolio Characteristics Computation module 120 and Index Composition Provider 122 are both coupled as inputs to the Portfolio Creation/Editing Services module 124.

The Portfolio Creation/Editing Services module 124 performs various operations such as parsing input parameters, creating and manipulating portfolio objects, running analytics, and generating the response. It also handles error conditions and ensures the integrity of portfolio data. This module 124 relies on the Portfolio Characteristics Computation module 120 for getting the parameters for the underlying securities and the Index Composition Provider 122 for generating the benchmark.

The following is example process flow for the Portfolio Creation/Editing Services module 124:
1. Initialize the response header to match the request header
2. Extract relevant data from the request:
   a. Extract various parameters such as portfolio ID, portfolio name, TNL ID, input portfolio notional, rounding preferences, conversion settings, netting preference, and MDV weighting preference.

3. Parse and set the report parameters:
   a. Parse the report parameters from the root element and set the report parameter in the portfolio object.
4. Create a new analytics object with the provided portfolio name, netting preference, and portfolio ID.
5. Set portfolio properties:
   a. Set the input portfolio notional and rounding preferences.
   b. Set the conversion settings for ADRs, ETFs, indexes, and futures.
   c. Set the user ID for the portfolio.
   d. Set the report parameter and TNL ID in the portfolio.
6. Convert to underliers:
   a. Check if conversion to underliers is required for the portfolio.
   b. If so, Convert to Underliers decomposes the portfolio into its constituent and recursively aggregates the constituents and create the portfolio
7. Run recursive computations on the constituents of the portfolio to calculate the portfolio metrics
8. Store the portfolio:
   a. Check if the portfolio ID already exists for a different user.
   b. If not, store the portfolio object in the analytics Map, using the portfolio ID as the key.
   c. Mark the portfolio as dirty portfolio to be subsequently persisted into the in memory persistor
9. Add portfolio details to the response, passing the analytics object and the response action element.
   a. Add the report parameters and invalid securities to the portfolio element.
10. Handle exceptions:
    a. If any exception occurs during the process, catch the exception and construct a SOAP fault response.
11. Return the response:
    a. Return the response envelope containing the created portfolio.

The Portfolio Creation/Editing Services module 124 is coupled to the Portfolio In-Memory Store 126, which is, in turn, coupled as an input source to the ESG Microservices 114.

The Portfolio In-Memory Store 126 is responsible for saving dirty portfolios to a database. The following is example process flow for the Portfolio In-Memory Store 126:

PAPortfolioPersistorImpl:
1. Initialize a map called ModifiedPortfolioMap to store portfolios that have been modified
2. Acquire a write lock on the map
3. Iterate over each element in the ModifiedPortfolioMap
   a. Retrieve the portfolioId
   b. Search the portfolioId in the in-memory analytics map using key based search, if found
      i. Update the existing portfolio object
      ii. Otherwise, insert the portfolio into the in-memory analytics map
4. Clear the ModifiedPortfolioMap
5. Release the write lock.
6. Iterate over each element in analytics map
   a. Update the portfolio in the persisted database with the portfolioId as an argument.

The Portfolio In-Memory Store 126 also initializes a map called ModifiedPortfolioMap to store the dirty portfolios according to the following process:

1. It acquires a write lock on the _lock variable to ensure exclusive access to the ModifiedPortfolioMap
2. It iterates over each element in the ModifiedPortfolioMap and performs the following operations:
   a. Retrieves the portfolio ID
   b. Checks if the portfolio ID exists in the main analytics map using recursive key based search
   c. If the portfolio ID is found in the main analytics map, update the portfolio properties
   d. Otherwise, the portfolio is inserted into the in-memory analytics map
3. Once all the modified portfolios have been processed, the modifiedPortfolioMap is cleared.
4. The write lock is released.
5. The process iterates over each element in the modifiedPortfolioMap and calls the updateDB( ) function with the portfolio as an argument and is responsible for updating the database with the portfolio information.
6. The updateDB( ) function, called for each dirty portfolio, performs some checks and saves the portfolio to the database if the conditions are met.

The ESG Microservices 114 drives creation of the GUI 104 that a user 108 can view and interact with.

Figure 2:
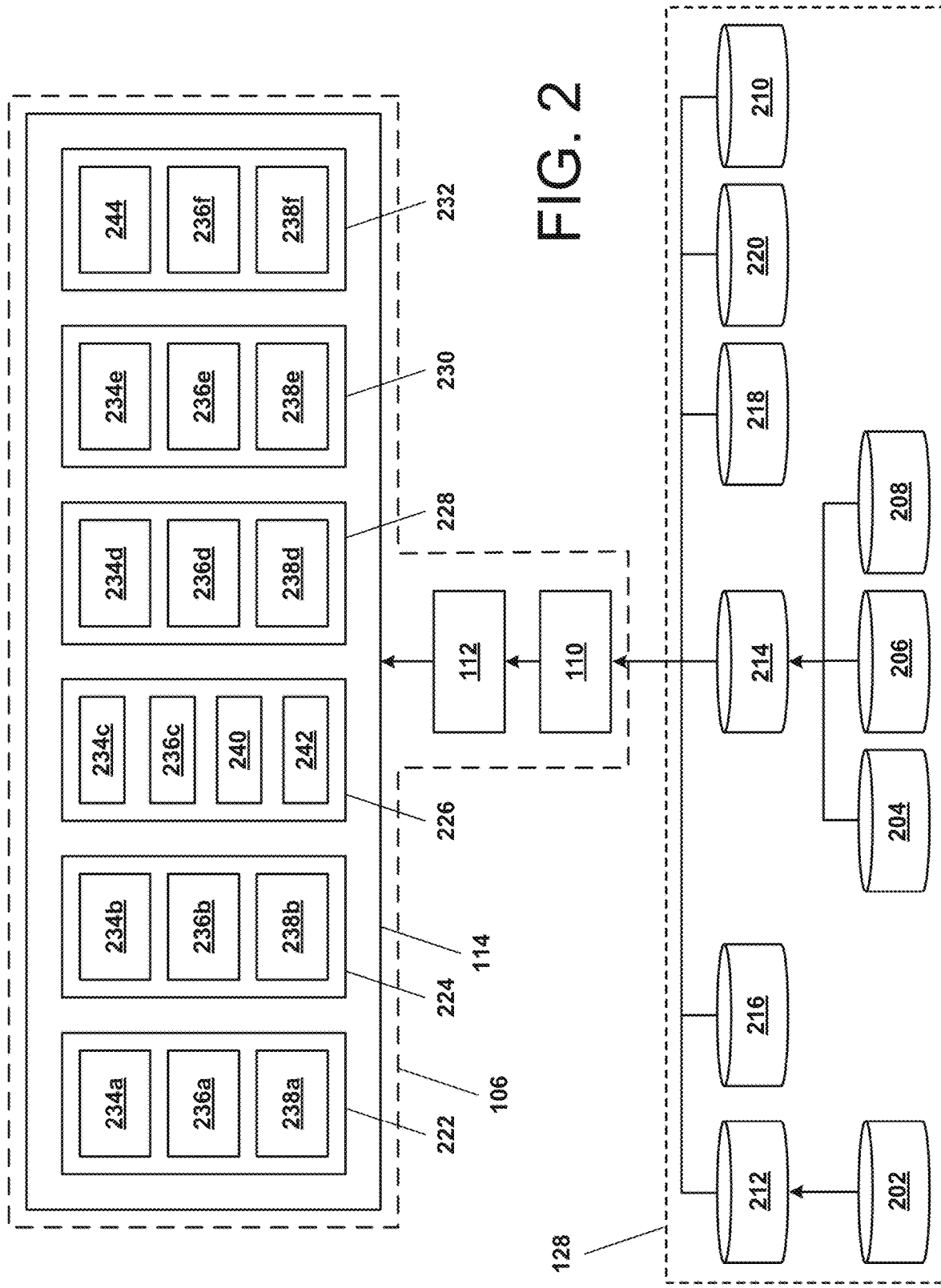
FIG. 2 illustrates, in simplified form, in greater detail, a portion of the computer system and details of the ESG Derived Data.

FIG. 2 illustrates, in simplified form, in greater detail, a portion of the computer system 106 and details of the ESG Derived Data 128.

The ESG Derived Data 128 includes data from multiple data sources. For example, the data could come from third party commercial sources that provide subscriptions or querying access to other businesses' or entities' ESG and sustainable finance, and any specific sources would be provided only for illustrative purposes and showing a preferred method of obtaining data. This system is designed to be modular and source-agnostic such that any particular source or vendor may be substituted for another, before or after initialization of the system. We also leverage in-house created databases.

As specifically shown in FIG. 2, Screening and Controversies Data 202 is the source for Screening Derived Data 212. Similarly, Carbon Emissions Data 204, Carbon Emissions Scope 3 Data 206 and Climate Transition Risk Data 208 are the sources for the Climate Derived Data 214. Additional data, for example Ratings Derived Data 216, Fundamental Global Data 218, Thematic Data 220, and SFDR Data 210 are also used by the ESG Dataset Generator 110.

The Screening and Controversies Data 202 is a sustainability dataset pertaining to specific company-level business practices (e.g., exposure to tobacco, weapons, global sanctions list). The dataset contains a set of over 60 screens that a company can be assessed against and includes a narrative summary of where the exposure derives from.

This dataset is processed as follows: The Dataset is first sanitized by removing Null/duplicate ISIN entries. Next, a column, Science Based Emissions Reduction Target, is generated based on the values of 'ClimateScienceBasedTargets' and, if the value is 'Concrete Target', we assign a "1" value, or else, if the value is 'Committed' or 'No Commitment' we assign a "0" value. Next, a column that represents one of the potential 60 screens is generated based on the values from the Vendor. These values can be numerical or categorical. Categorical values are assigned a "1" value where they have been assessed by the vendor for those screens, otherwise a "0" or null value.

The Screening Derived Data 212 transforms the vendor Screening and Controversies Data 202 into categories of screens.

Vendor Carbon Emissions Data 204 is time series ESG data focusing on greenhouse gas emissions climate data with normalized intensity metrics, by company, GICS sectors, country, and year.

Vendor Carbon Emissions Scope 3 Data 206 is carbon emissions data focusing specifically on Scope 3 upstream and downstream emissions.

Vendor Climate Transition Risk Data 208 is an ESG dataset containing scenario-based assessment of company level Carbon Earnings at Risk or Carbon Exposure at Risk or Carbon Value at Risk, which, purely for simplicity of explanation, we refer to generically hereafter as Carbon Earnings at Risk. The scenarios assess the impact of a carbon price in 2020, 2025, 2030, 2040, and 2050 across various Paris Agreement climate scenarios on corporate financials.

This dataset is processed as follows: The data is sanitized by removing Null/Duplicate ISIN entries. The data is also filtered out based on the latest received date and Financial Year values.

The Climate Derived Data 214 is obtained from the Vendor Carbon Emissions Data 204, Vendor Carbon Emissions Scope 3 Data 206 and Vendor Climate Transition Risk Data 208 as follows:

The Vendor Carbon Emissions Scope 3 Data 206 is filtered by Financial Year of 2017 and newer data. Dataset's 2 and 3 are merged on a unique identifier to build a combined dataset having Emissions data covering Scope 1, 2 and 3. Calculations are performed on this combined dataset to calculate Total Carbon Emissions, specifically:

Scope 1+2 [Sum of Scope 1 and Scope 2 across the dataset for each row],

Scope 1+2+3 [Sum of Scope 1, Scope 2 and Scope 3 across the dataset for each row], and Scope 3 Upstream+Downstream [Sum of Scope 3 Upstream and Scope 3 Downstream across dataset for each row].

Then the dataset is cleaned by removing any duplicate entries, null entries for the ISIN field.

The Ratings Derived Data 216 is a derived version of Vendor Corporate Ratings data that reduces the number of columns and transforms the data in those columns to a derived format (i.e., scales to 0-1 score) and creates deltas based on historical scores.

The Fundamental Global Dataset 218 is comprised of fundamentals metrics derived from vendor data. This dataset is used to build out a collection of Product Information, and is reduced to a subset to a few columns such as ISIN, RIC, Ticker.

Thematic Data 220 is a corporate level dataset of company revenues mapped to the UN Sustainable Development Goals (SDGs) pertaining to either contribution or obstruction to the goals. The dataset notes revenue amounts, rationale, and includes wrapped up numerical scores as calculated by a Vendor. The Thematic Data 220 is obtained as follows: Datasets 6, 7, 8, and 9 are cleaned by removing duplicate/null ISIN entries. All the 9 datasets are then run through an equity mapping expansion. Any entries which contain underliers are expanded and underliers are added correspondingly into our dataset.

The SFDR Data 210 is a derived dataset that maps underlying third-party ESG data to the EU SFDR principal adverse sustainability impact indicators. We clean the dataset by removing duplicate/null ISIN entries.

All the processed data sets 212, 216, 214, 218, 220, 210 collectively are referred to as the ESG data toolkit.

The 9 datasets are now merged with the Fundamental Global dataset preprocesses the data emanating from the ESG data toolkit and runs an equity mapping expansion. Any entries which contain underliers are expanded and underliers are added correspondingly into our dataset. The ESG Dataset Generator 110 then merges all datasets into a combined dataset as the base dataset on ISIN as the primary key across all the datasets and the combined dataset is persisted.

As noted above, the ESG Derived Data 128 is received by the ESG Microservices 114 via the ESG Dataset In-Memory Cache 112.

The following is example pseudocode for implementing the ESG Dataset Generator 110.

BEGIN
BEGIN FOR dataset in [Ratings, Screening, Climate, SFDR]
Perform Equity Expansion for dataset
Run through the ISIN's in the dataset and check if there are other entities related to the ISIN, such as an underlying ADR for the ISIN for example, if present add the entry of the related product to ensure coverage of a broad range of ISIN's for each dataset
Check data threshold levels to ensure minimum number of datapoints
Check the count of each dataset to ensure a sufficient coverage.
Merge dataframe into ESG_Dataframe
All the datasets will have a column called ISIN (International Securities Identification Numbering system) which will be used as a key across all the datasets.
Using ISIN, merge all the datasets into a single dataframe from which, for a given ISIN, there is Ratings, Screening, Climate and SFDR data.
END FOR
END The following is example pseudocode for implementing the ESG Dataset In-Memory Cache 112.
BEGIN
BEGIN FOR isin in ESG_Dataset
Insert row containing isin into In-Memory cache
The contents of the row are stored into the In-Memory cache under the key 'ESG_' and the ISIN value itself.
END FOR
END The ESG Microservices 114 involve multiple services, for example, an ESG Screening Micro Service 222, an ESG Ratings Micro Service 224, an ESG Climate Micro Service 226, an ESG Carbon Earnings at Risk Micro Service 228, an ESG Thematic Micro Service 230 and an ESG SFDR Micro Service 232.

Each of the component Micro Services 222, 224, 226, 228, 230, 232 making up the ESG Microservices 114 include an Overview Report generator 234a-234e, a Drilldown Report generator 236a-236f and a Distribution Report generator 238a-238b, 238d-238f. Optionally, the ESG Climate Micro Service 226 also includes a Climate Lorenz Weighted Average Carbon Intensity (WACI) Report generator 240, a Climate Attribution Report generator 242 and/or a Sustainability Indicators Report generator 244.

ESG Microservices 114 play an important role in the recursive computations for calculating sector level metric scores using a correlation matrix. Pseudo code for the microservices can be summarized as follows:

BEGIN
Read portfolioId, benchmarkId, reportType, reportParameters from request
The input parameters for the Microservice are portfolioId, benchmarkId, reportType—
portfolioId: Unique identifier used to obtain the constituents of the user's portfolio from the portfolio analytics engine benchmarkId: Unique identifier used to obtain the constituents of the user's benchmark portfolio from the portfolio analytics engine reportType: The requested ESG Analytics. E.g.: Ratings Overview Report. reportParameters: Additional report specific parameters. E.g., Range of Score limits for Ratings Chart BEGIN FOR id in [portfolioId, benchmarkId]
  Fetch constituents from portfolio analytics engine using id
  Store constituents into a dataframe
  Using issueId's of constituents, fetch esg data from Redis cache (an open source, in memory data store capable of efficient non-blocking synchronization, minimizing latency and maximizing resiliency) into a dataframe Merge ESG Dataframe with constituents dataframe
  Using the portfolioId and benchmarkId, the constituents of the user's portfolio, benchmark portfolio are retrieved from the portfolio analytics engine and stored into a dataframe.
  Using the issueId's of the constituents, retrieve ESG Data from cache and store into a dataframe.
  Both the dataframe's (Constituents, ESG Data) are merged into a single Dataframe.
END FOR
Based on reportType Perform corresponding aggregation/calculations and create a response dataframe
BEGIN report processing
  FOR portfolio in [portfolio, benchmark]
    Compute Report Values
  END FOR
END report processing The Overview Report generator 234*a*-234*e* (for ESG Screening, ESG Ratings, ESG Climate, ESG Carbon Earnings at Risk, ESG Thematic and ESG SFDR) returns the aggregated Portfolio/Benchmark Level Metrics. This is done by first calculating the weighted metric value for each name within the portfolio/benchmark and then aggregating the weighted metric value across each name to arrive at a single value for the portfolio/benchmark. The Overview is calculated as follows:

Σ(sym[ESG_Metric]*sym[Weight])

where 'sym' is each symbol present in the portfolio/benchmark.

The Drilldown Report generator 236*a*-236*f* returns the aggregated ESG Metrics for groups formed on the portfolio/benchmark based on [Country, Global Industry classification standard (GICS—1,2,3), Region, Liquidity, Market Cap, Country Status]. To do this, the individual names/symbols within the Portfolio/Benchmark are first grouped into categories according to the GroupBy parameter received. Then iterate over the formed Groups and calculate the aggregated metric for the group using the formula:

Σ(sym[ESG_Metric]*sym[Weight])

where 'sym' is each symbol present in the group.

The Distribution Report generator 238*a*-238*b*, 238*d*-238*f* returns each individual symbol's weighted ESG_Metric for every symbol present within the portfolio/benchmark according to the formula:

sym[ESG_Metric]*sym[Weight]

where 'sym' is each individual symbol.

The Lorenz WACI Curve Report generator 240 calculates the Cumulative % of Portfolio WACI vs Cumulative % of Portfolio Weights. WACI is calculated using the formula:

SUMPRODUCT(Carbon Intensity of Symbol*Weight of Symbol).

The Climate Attribution Report generator 242 calculates the effects of sector allocation (based on GICS Sectors) and stock selection decisions on the portfolio footprint's relative efficiency to the benchmark.

For sector allocation, this is calculated according to the formula:

$$\frac{((\text{Sector Weight } Pf - \text{Sector Weight } Bm) * (WACI\ Bm - WACI\ \text{Sector } Bm))}{WACI\ Bm}$$

where Sector Weight Pf/Bm is the Weight of the Sector group in the Portfolio/Benchmark, WACI Bm is the WACI of the Benchmark, and WACI Sector Bm is the WACI of the Sector Group of the Benchmark.

Stock allocation is calculated according to the formula:

$$\frac{((\text{Sector Weight } Pf) * (WACI\ \text{Sector } Bm - WACI\ \text{Sector } Pf))}{WACI\ Bm}$$

where Sector Weight Pf/Bm is the Weight of the Sector group in the Portfolio/Benchmark, WACI Bm is the WACI of the Benchmark, and WACI Sector Bm is the WACI of the Sector Group of the Benchmark.

The Sustainability Indicators Report generator 244 generates values for a selective list of Sustainability Indicators as defined by the European Union's Sustainable Finance Disclosure Regulation (SFDR) that are aggregated on the Portfolio/Benchmark level. The SFDR metrics are calculated according to the formulas below:

GHG Emissions Scope 1 is calculated as:

$$\sum \left( sym \frac{[\text{Notional}] * sym[\text{Scope\_1\_Emissions}]}{(sym[MktCap] * 1000000)} \right)$$

where 'sym' is the individual symbol in the portfolio/benchmark and MktCap is the Market Cap of the symbol.

GHG Emissions Scope 2 is calculated as:

$$\sum \left( sym \frac{[\text{Notional}] * sym[\text{Scope\_2\_Emissions}]}{(sym[MktCap] * 1000000)} \right)$$

where 'sym' is the individual symbol in the portfolio/benchmark and MktCap is the Market Cap of the symbol.

GHG Emissions Scope 3 is calculated as:

$$\sum \left( sym \frac{[\text{Notional}] * sym[\text{Scope\_3\_Emissions}]}{(sym[MktCap] * 1000000)} \right)$$

where 'sym' is the individual symbol in the portfolio/benchmark and MktCap is the Market Cap of the symbol.

Carbon Footprint is calculated as:

$$\frac{\sum \left( sym \frac{[\text{Notional}] * sym[\text{Scope\_1 + 2 + 3\_Emissions}]}{sym[MktCap] * 1000000} \right)}{\sum (sym[\text{Notional}])} * 1000000$$

GHG Intensity is calculated as:

$$\Sigma(sym[\text{Intensity\_Scope\_1+2+3}]*sym[\text{Weight}])$$

Fossil Fuel Exposure is calculated as:

$$\Sigma(sym[\text{Weight}] \text{ if } sym[\text{Fossil\_Fuel\_Rev\_Share}]>0.01)$$

Non-Renewable Energy Consumption Intensity is calculated as:

$$\frac{\sum(sym[\text{Non\_Renewable\_Power\_Generation}])}{\sum(sym[\text{Renewable\_Power\_Generation}])}$$

Non-Renewable Energy Production is calculated as:

$$\frac{\sum(sym[\text{Non\_Renewable\_Power\_Generation}])}{\sum(sym[\text{Non\_Renewable\_Power\_Generation}]) + \sum(sym[\text{Renewable\_Power\_Generation}])}$$

Renewable Energy Production is calculated as:

$$\frac{\sum(sym[\text{Renewable\_Power\_Generation}])}{\sum(sym[\text{Non\_Renewable\_Power\_Generation}]) + \sum(sym[\text{Renewable\_Power\_Generation}])}$$

Energy Consumption Per High Impact Sector is calculated (if sym is Part of High Impact Sector) as:

$$\sum\left(sym\frac{[\text{Energy\_Consumption}]*sym[\text{Notional}]}{sym[\text{Revenue\_\$M}]*1000000*sym[\text{Weight}]}\right)$$

Biodiversity is calculated as:

$$\Sigma(sym[\text{Weight}]*sym[\text{Biodiversiy\_Metric}])$$

Water is calculated as:

$$\sum\left(\frac{(sym[\text{Emissions\_to\_Water}]*sym[\text{Notional}])}{(1000000*sym[\text{MktCap}])*sym[\text{Weight}]}\right)$$

Waste is calculated as:

$$\sum\left(\frac{(sym[\text{Hazardous\_Waste}]*sym[\text{Notional}])}{(1000000*sym[\text{MktCap}])*sym[\text{Weight}]}\right)$$

United Nations Global Compact (UNGC) Violations, Non-UNGC Signatories, Board Gender Diversity and Controversial Weapons Exposure are each calculated as:

$$\Sigma(sym[\text{Metric}]*sym[\text{Weight}])$$

Figure 3:
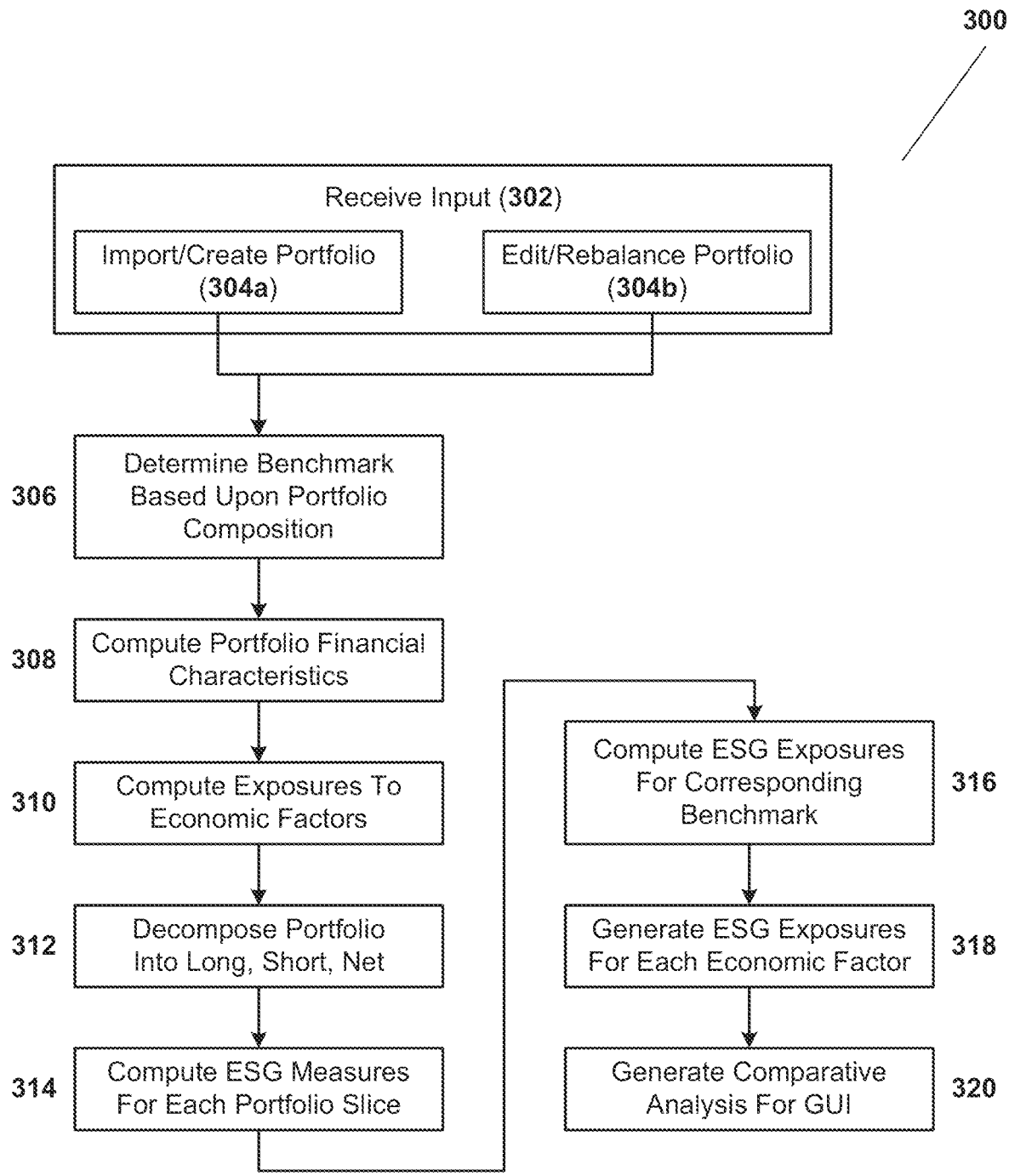
FIG. 3 illustrates, in simplified form, a flowchart of a representative workflow method for generating the GUI.

FIG. 3 illustrates, in simplified form, a flowchart 300 of a representative workflow method for generating the GUI 104.

The method begins with the receipt of input (Step 302), either as a result of importing or creating a portfolio (Step 304a) or as a result of editing or rebalancing a portfolio (Step 304b)

Next the appropriate benchmark is determined based upon the specific composition of the portfolio to be analyzed (Step 306).

The portfolio financial characteristics are computed (Step 308) as are the exposures to economic factors (Step 310). Note that, depending upon the particular implementation, Steps 308 and 310 can occur in opposite order or concurrently.

Next the portfolio is decomposed into long, short and net slices (Step 312).

Then, ESG measures are computed for each portfolio slice (Step 314).

ESG exposures are also computed of the determined benchmark (Step 316) along with ESG exposures for each economic factor (Step 318). Note here too that, depending upon the particular implementation, once Step 306 has been performed, Step 316 can occur concurrently with or prior to any one or more of Steps 308-314.

Finally, the comparative analysis is generated for display in the GUI (Step 320).

The GUI

Having described the structure of the system and various processes performed therewithin, our novel GUI will now be described.

Advantageously, our GUI allows users to view the ESG exposures and impacts alongside the financial characteristics of a portfolio. It displays the ESG impact of financial/economical optimization decisions made on investment and trading portfolios and vice versa.

The GUI is an application made up of five main modular displays, a Screening Module, a Ratings Module, a Climate Module, and a Sustainability Themes Module.

The Screening Module highlights portfolio exposures to business activities, issues, or sectors based on a specific screening category and defined revenue threshold, the Ratings Module focuses on Overall ESG and individual Environmental, Social, and Governance score details, the Climate Module focuses on carbon metrics details such as carbon intensity and financed emissions, science-based targets commitment coverage, revenue derived from sustainable climate activities by issuers in a portfolio, projects future carbon price impacts across regions and sectors, and the Sustainability Themes Module assesses revenue derived from sustainable activities by issuers in a portfolio and can display portfolio and benchmark performance on a set of sustainability-focused indicators.

The Screening Module within the application is served by the underlying ESG Screening microservices described above and provides a user interface capturing the measurable exposure of investments to a range of ESG factors in a single view. This unique visualization is designed to allow an overall view of the portfolio and draws attention to areas of concern without the user having to search/drilldown for specific areas. The portfolio settings control captures user preferences between Net, Long and Short positions of the portfolio, and updates the screening exposure to reflect the selection.

The Ratings module within the application is served by the ESG Ratings Micro Service 224 and provides a layered view of a portfolio's ESG Ratings. ESG data is used to compute a scaled up coverage weighted average Ratings score. The computation methodology upscales the portfolio to offset the weight contribution of the non-coverage constituents and successively computes the weighted average score of the resultant portfolio. The Data coverage interface of the module shows the constituent coverage, and the Ratings Overview interface of the module shows the Environmental, Social and Governance score of the portfolio.

The user interface of the Ratings module provides unique user interaction capabilities by providing multiple drilldown views. The interaction of a Ratings Histogram Computation engine with ratings Exposure and Ratings Distribution engine ensures that the user interface captures client's interaction and then re-computes the drilldown analytics based on user preferred settings. A user can also choose a ratings category to dive deeper into the exposure analytics and clicking on a score category will dynamically alter the remaining charts in the Ratings module to display information pertinent to selected score category.

Thus, the Ratings exposure module shows multiple parametric representations of the user selected score category. Based on a user's visualization preferences, the Ratings Micro Service 224 generates data to show the exposure breakdown in terms of Average score, Count of securities or the weight distribution of the underlying constituents. It also provides the user to customize the exposure category to shows the breakup based on GICS/Market Cap/Country/Region.

The Climate module computes the portfolios weighted average carbon intensity and financed emissions. The underlying Climate Micro Service 226 computes the constituents weighted average carbon intensity adjusted to the coverage data. A unique settings panel allows a user to select between the Portfolio/Long/Short visualization coupled with greenhouse gas (GHG) emission scope preference. This interactive interface captures a user's visualization preference and shows a comparative study with respect to an auto selected appropriate benchmark or a benchmark specified by the user. The interface also shows carbon data coverage for the overall portfolio along with long and short positions with benchmark coverage overlaid.

A unique Weighted Average Carbon Intensity (WACI) Lorenz curve is generated by the underlying Micro Service 240 showing the correlation between the WACI and the cumulative weight for both the portfolio and the benchmark. It provides statistical insight into the percentage of total WACI that is generated from 20 percent of the portfolio weight. The interface also allows visualization according to a user's GHG emission scope preference.

The underlying Carbon Attribution Micro Service 242 generates the weighted average carbon intensity values of the underlying constituents to show detailed analytics of the percent difference in WACI between the portfolio and an appropriate benchmark. The Carbon Attribution Micro Service 242 also computes the statistical difference between a sector allocation and security selection to carbon intensive companies within the sector.

The Climate Micro Service 226 is responsive to user preferences and re-computes the WACI values based on user interactions. The interface captures the user preference of the exposure category, and generates the weighted average values for the constituents in the selected exposure category. The GHG emission scope and portfolio/Long/Short preferences of the user is superimposed over the analytics and the interface provides granular control over the displayed metrics.

An Emission Reduction Targets (ERT) component of the Climate Micro Service 226 calculates the weighted average distribution of the constituents based on science-based emissions reduction target. The intuitive user interface captures user preference in terms of the portfolio/Long/Short exposure that they want to visualize. The ERT component also provides a summary view of constituent's distribution across various ERT categories. It also superimposes the benchmark distribution in each category to make the interface user friendly and display all portfolio and benchmarking data together.

ERT exposure charts in the GUI brings together portfolio exposure data with ERT distribution. The user interface also captures the user visualization preference and shows the ERT distribution spread across various category exposure areas. The user interface further allows users to choose between the weighted distribution or a count of securities exposed to user selected exposure area. A user can select between a comparison chart or table views to display the data.

The ERT distribution chart presents a novel way of showing issuer target type against a carbon intensity. The Climate Micro Service 226 computes the weighted average data and enables the visualization according to user selected GHG emission scope. The user interface captures the user's interaction and gives a user granular control over the values for the x-Axis and the "bubble" size in the display. Benchmark data is displayed simultaneously under each issuer type and helps visualize the portfolio performance compared to a benchmark portfolio.

A Climate Change Revenue (CCR) component of the Climate Micro Service 226 computes the weighted average climate change revenue metrics for the portfolio along with long and short positions. It also presents a comparative study against the benchmark. The user interface displays the CCR score on a increasing scale with long and short positions with the benchmark score overlaid over the same scale.

The unique CCR exposure chart captures user preference in terms of the exposure category they want to drill down into. The climate change revenue spread across various exposure categories like GICS/Market Cap/Country/Region is computed and displayed. The interface also gives clients the option to visualize these metrics in terms of the average score across exposure category, the number of securities, or the weight distribution. Again, the user-friendly interface allows users to choose between the chart view and the table view and also allows users to jump off into the exposure category. Selecting an exposure category re-computes the distribution charts to show all underlying securities with exposure to a user-selected category. This unique drill down ability helps users superimpose the exposure categorization over the ESG metrics.

The ESG Carbon Earnings at Risk Micro Service 228 considers user-selected parameters of Scenario, Time and the EBITDA threshold and computes a statistical analysis on the underlying constituents. The user interface captures these parameters based on user preferences and shows analytics customized to the user selection. A Summary panel shows the weighted average computation of the constituents divided into Portfolio/Long/Short dimensions and overlays the benchmark computations to allow a comparative view. Thus, in this regard, the interface provides a consolidated view of these metrics in a single panel allowing for enhanced visualization experience.

The Trajectory component of the ESG Carbon Earnings at Risk Micro Service 228 calculates the weighted average EBITDA at Risk progressing into the future based upon user selected scenarios. This portion of the GUI shows the future projections of the earnings at risk running until 2050. The unique computation methodology also computes the benchmark risk, and the novel interface imposes the benchmark calculations on the same panel for a comparative study. The user can also visualize the effect on the earnings based on various carbon price assumptions and allows users to select the preferred computations.

The Sustainability Themes module computes the revenue derived from sustainable activities by issuers in the portfolio. The underlying ESG Thematic Micro Service 230 computes the statistical analysis on the Long/Short categorization of the underlying constituent and the novel interface shows the analytics divided into the positive and the negative contribution to a theme based on constituent's revenue associated with a given theme. The data is shown in comparison to the benchmark score. Clients can also choose to visualize the data in terms of weight distribution or the number of securities contributing to a theme.

A sustainable themes exposure and distribution component of the ESG Thematic Micro Service 230 allows users to visualize the exposure breakup of a portfolio and allows users to jump off into detailed analysis of an exposure category by looking into a dynamic distribution panel. Users can select from a list of exposure visualization mode like GICS/Market Cap/Country/Region and the underlying Micro Service 230 re-computes the weights based on the user's selection which can then be visualized in a chart or table mode. The exposure view also allows users to view these analytics based on Average Score of the underlying constituents, the number of securities or the weight distribution of the underlying securities across different exposure category. A distribution panel shows the weight of the constituents against a Thematic score. The interaction of both exposure and distribution aspects allows users to visualize the constituents of a user selected exposure category.

The Sustainability Themes module also includes an interface that shows the portfolio performance on a selective list of sustainability indicators, as defined by the European union's sustainable finance disclosure regulation (SFDR). The underlying Micro Service 232 computes the analytics segmented into Long, Short and Portfolio composition of the underlying constituents and provides visualization options by rescaling the Long/Short leg of the portfolio or running the analytics on the original portfolio. The weight adjusted metrics can be displayed into a comparative mode vs the user selected benchmark.

Figure 4:
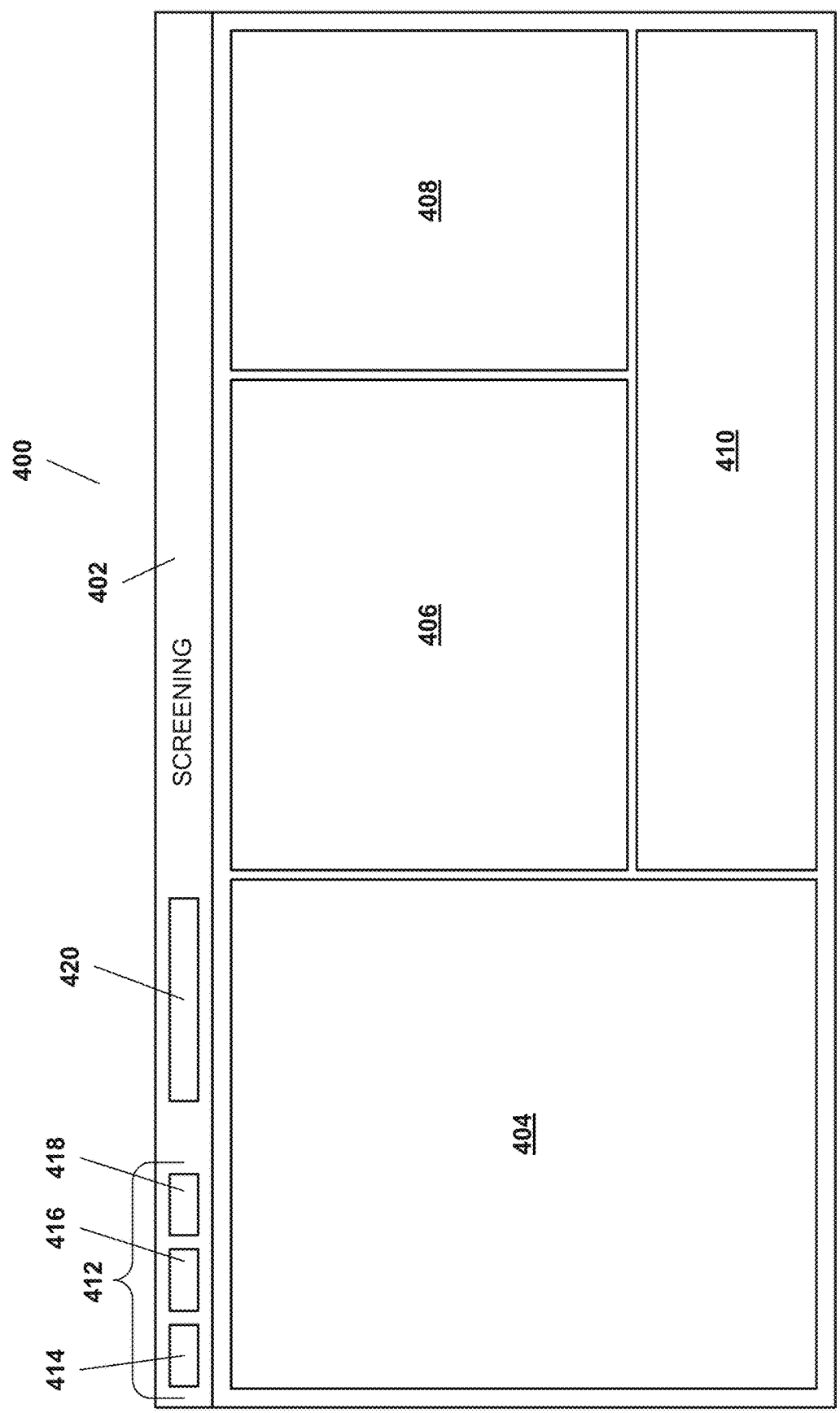
FIG. 4 illustrates, in simplified form, an example layout for a concurrently displayable interactive family of dynamically interrelated panes for a Screening GUI Module.

Turning now to specific aspects of the GUI, FIG. 4 illustrates, in simplified form, an example layout 400 for a concurrently displayable interactive family of dynamically interrelated screening panes (referred to hereafter as a Screening GUI Module 402) in accordance with the description herein. As shown in FIG. 4, the Screening GUI Module 402 includes four panes 404, 406, 408, 410 that each contain different graphical elements as will be described in greater detail below. In addition, the Screening GUI Module 402 includes selectable elements 412 (e.g., known buttons, icons, a drop down menu, etc.) for a Net 414, Long 416 and Short 418 positions to enable display of exposure for each leg individually or on a Net basis. Advantageously, changing the portfolio-level setting between Net 414, Long 416 and Short 418 will update all charts on the page to reflect the side selected.

The Screening GUI Module 402 includes a selectable element 420 (e.g., button, icon, dropdown menu, etc.) that provides for selection of an appropriate benchmark (e.g., S&P 500, DJIA, NASDAQ Composite, Russell 2000, or other specific benchmark grouping, like QGREEN, CELS, or other green index, or some combination of the foregoing, etc.) to compare a portfolio against.

Figure 5:
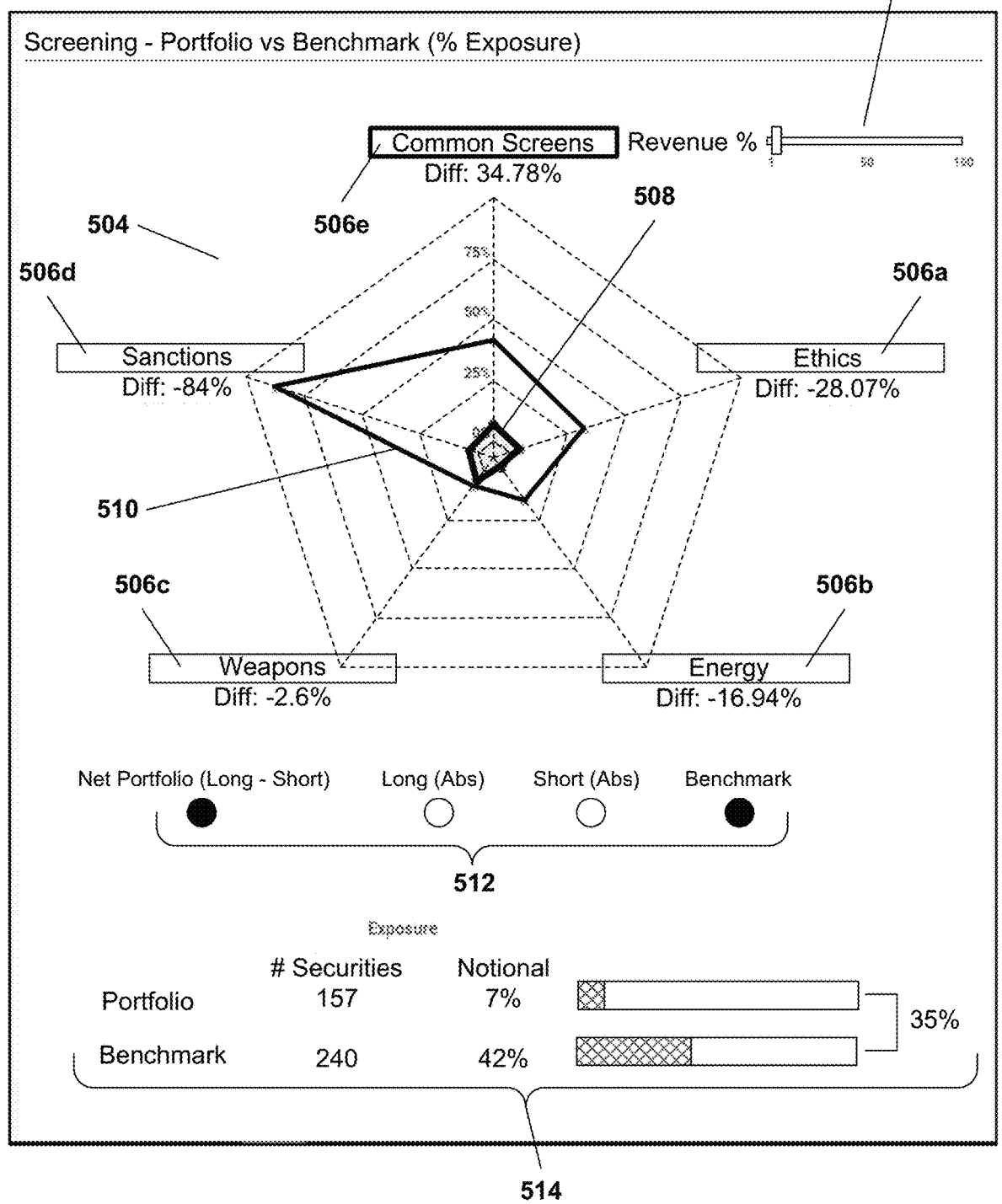
FIG. 5 shows, in simplified form, an example screening category chart that can be displayed in a pane of FIG. 4.

FIG. 5 shows, in simplified form, an example screening category chart 500 that can be displayed in the pane 404 of FIG. 4. As shown, this chart 500 provides a unique representation of a portfolio's exposure to multiple Screening categories using a "spider web" chart (a/k/a radar chart or star chart) for multivariate data visualization to facilitate visualization of different category exposures benchmarked to a model portfolio in a single view. The pane provides users with a granular control over visualizing an exposure difference, both in terms of count of exposed securities as well as notional percentage spread over multiple screening categories.

As shown in FIG. 5, the chart 500 includes a revenue bar slide 502 that enables a user interactively define which companies are included in the exposure calculation based on the revenues they generate from activities.

The chart 500 specifically includes a "spider web" graph 504, that enables multivariate data visualization, where each vertex corresponds to one of multiple selectable categories 506a-506e. By way of example, such categories could include, broad or general categories such as Ethics 506a, which highlights involvement in a range of business activities with ethical considerations (for example, animal welfare, stem cells, genetically modified organisms, predatory lending, abortion, contraceptives, racial discrimination, controversies, alcohol, tobacco, *cannabis*, violent video games, gambling, abortifacients, euthanasia, for profit correctional facilities, hazardous pesticides, palm oil, pornography, etc.), Energy 506b, which highlights involvement in a range of energy activities (for example, fossil fuel, shale oil gas, energy & extractives, hydraulic fracturing, nuclear power, oil sands, gas power generation, coal mining total, coal power generation, arctic drilling, oil power generation, etc.), Weapons 506c, which highlights involvement in a range of weapons-related business activities (for example, military equipment, civilian firearms, nuclear weapons, cluster munitions, anti-personnel mines, depleted uranium, white phosphorus, biological weapons, chemical weapons, incendiary weapons, etc.), Sanctions 506d, which highlights companies designated as being subject to sanctions by countries, governing bodies, and/or international organizations (for example, Freedom House countries of concern or Australian, Canadian, European, Hong Kong, Japanese, U,S. Office of Foreign Asset Control, Swiss, United Kingdom or United Nations sanctions programs, etc.) or, depending upon the particular implementation, subcategories within them. As shown, in FIG. 5, for purposes of example, the graph 504 is a pentagonal graph that includes each of the foregoing general categories 506a-506d as well as a Common Screens 506e category, which is merely a subset made up of specific sub-Module screens from the other four categories, that represent the mostly commonly used sub-category activities from each.

In FIG. 5, the exposure of both the benchmark 508 and portfolio 510 are graphed and, thereby, shows both graphically and numerically exposure to each screening category. For example, as shown in FIG. 5, the graph 510 of the example portfolio illustrates that the portfolio is 28.7% less exposed to ethics, 16.94% less exposed to energy, 2.6% less exposed to weapons and 84% less exposed to sanctions relative to the benchmark. In the graph 504 of FIG. 5, portfolio values less than the benchmark are displayed as a negative numbers and portfolio values greater than a benchmark can be displayed as a positive number, although, such differences can be noted in other manners, for example, by displaying or highlighting positive differences in green and negative differences in red, or some other manner, the approach used in this regard, if any, being a matter of design choice.

As further shown in FIG. 5, the chart 500 also includes a set of buttons 512 that allow the user to change what is graphed for comparison. Thus, advantageously, some implementations can allow for comparing any of net portfolio, long leg, short leg or benchmark against each other.

Finally, FIG. 5 includes a section 514 that, when a specific category 506a-506e is selected, displays a summary breakdown of the portfolio and benchmark exposures based on the number of exposed securities and notional percent. For example, as shown in section 514 of FIG. 5, the specific portfolio has 157 securities that are exposed to the Common Screens, totaling 7% of the portfolio, whereas the selected benchmark has 240 securities that are exposed to the Common Screens, totaling 42% of the benchmark, a notional difference of 35%.

Figure 6:
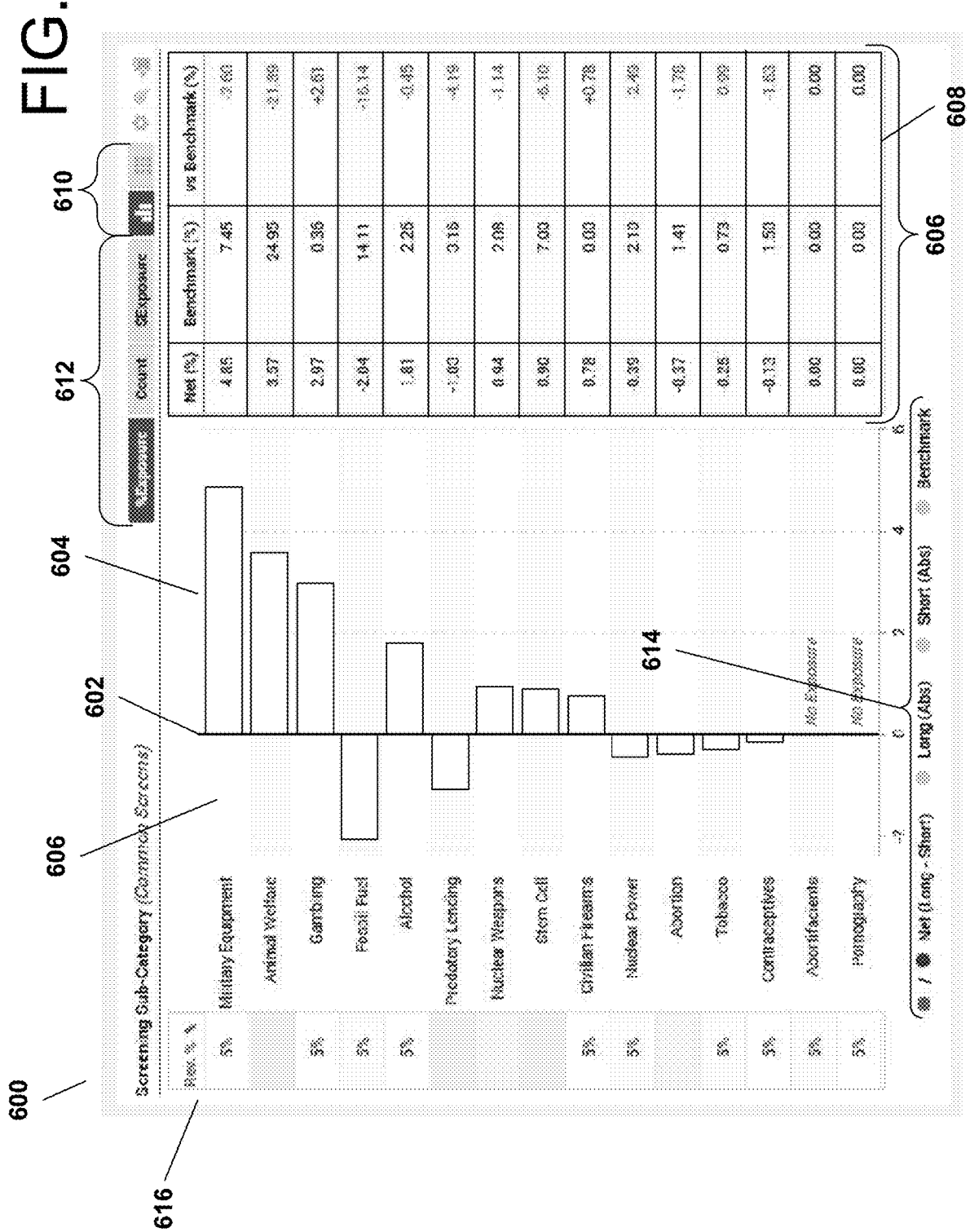
FIG. 6 illustrates, in simplified form, another chart that can be displayed within the Screening GUI Module in a pane of FIG. 4.

FIG. 6 illustrates, in simplified form, another chart 600 that can be displayed within the Screening GUI Module 402 in the pane 406 of FIG. 4.

This chart 600 shows the portfolio's exposure to individual screening subcategories within Energy. A separator bar 602 delineates the long side 604 from the short side. For example, as shown, this portfolio is most exposed to military equipment on the long side (4.85%) and fossil fuel on the short side (−2.04%), as shown in the columns to 606 the right. As shown in the rightmost column 608, which compares the portfolio to the benchmark, the portfolio is less exposed relative to the benchmark in both categories. Advantageously, in this implementation, selecting the "chart" or table icons 610 causes the data in this pane 406 to be displayed in bar chart or tabular form. In addition, although the data is shown in terms of % exposure in FIG. 6, optionally, different implementations can be created that allow for display of the data as % exposure, count or monetary exposure, or as specifically shown in FIG. 6, can provide the ability, via selectable elements 612 to toggle among two or more of them.

Additionally, as shown in FIG. 6, the chart 600 also provides the ability, through user selection 614, to display the specified information on the basis of net portfolio, long leg, short leg or for the benchmark or to overlay them in a single chart.

In addition, as shown, the chart 600 allows the user to set revenue thresholds 616 at the subcategory level to adjust the threshold for which companies get included in the exposure calculation based on their revenue involvement.

Figure 7:
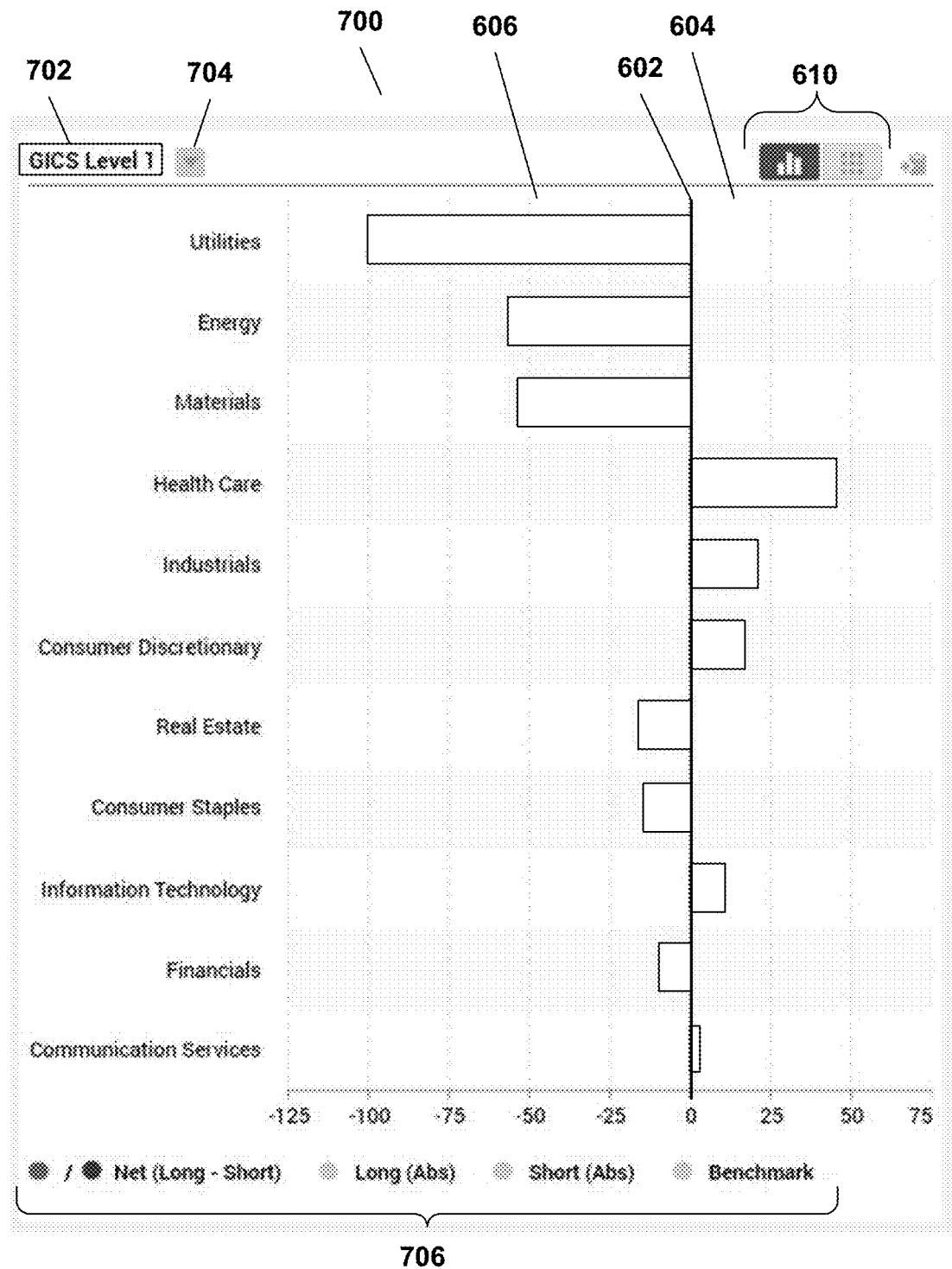
FIG. 7 illustrates, in simplified form, another chart that can be displayed within the Screening GUI Module in a pane of FIG. 4.

FIG. 7 illustrates, in simplified form, another chart 700 that can be displayed within the Screening GUI Module 402 in the pane 408 of FIG. 4.

The chart 700 is used to show the GICS, Market Cap, Country, Region, and Country Status contributing to the portfolio's exposure based upon selection of an item 702 from, as shown, a menu 704. As shown, GICS Level 1 is the selected item 702 and the chart 700 shows that healthcare, industrials, consumer discretionary, information technology and communication services are contributing net long 604 exposure to this portfolio, whereas utilities, energy, materials, real estate, consumer staples, and financials are contributing net short 606 exposure to this portfolio. Advantageously, here too, this chart 700 updates dynamically based on the subcategory 506a-506e selected in the spider web graph 505 of FIG. 5 in pane 404.

As with the chart 600 of FIG. 6, also can provide the ability, through user selection 706, to display the specified information on the basis of net portfolio, long leg, short leg or for the benchmark or to overlay them in a single chart. Depending upon the particular implementation, or a configuration setting, the user selection 706 can be tied to the user selection 614 or can be independent thereof.

Figure 8:
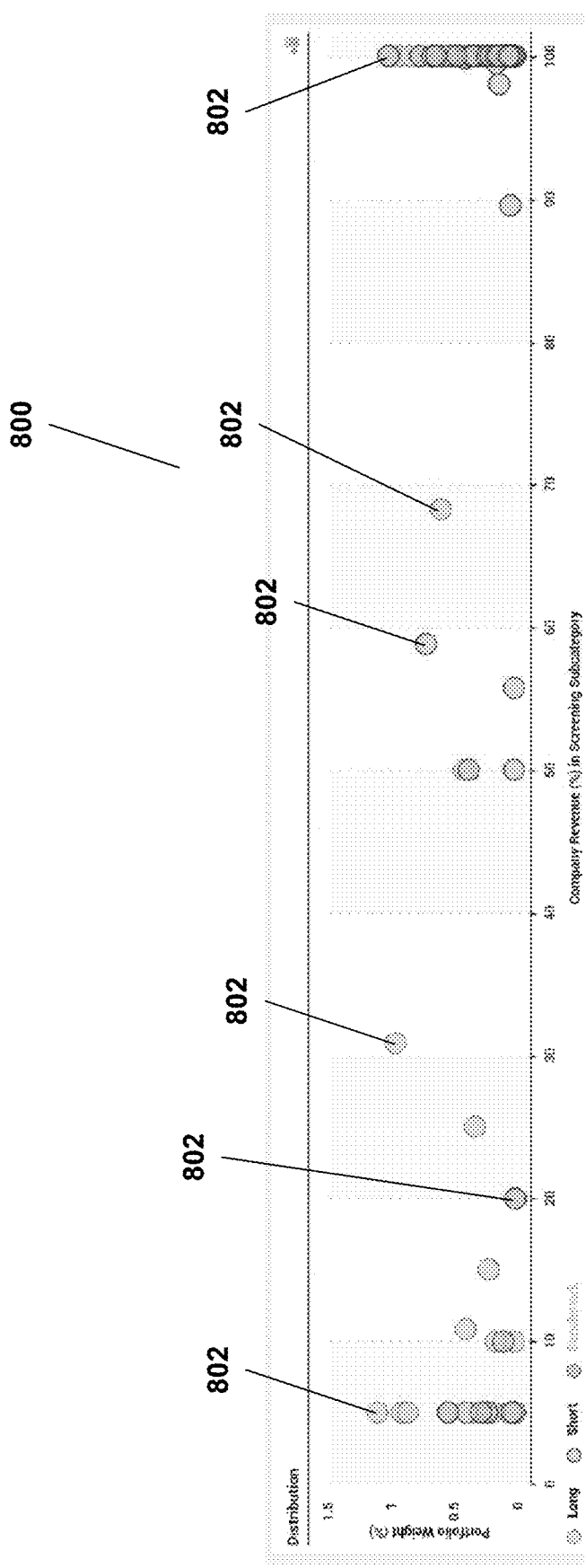
FIG. 8 illustrates, in simplified form, another chart that can be displayed within the Screening GUI Module in a pane of FIG. 4.

FIG. 8 illustrates, in simplified form, another chart 800 that can be displayed within the Screening GUI Module 402 in the pane 408 of FIG. 4.

As shown, the chart 800 of FIG. 8 plots the notional weights (y-axis) of individual companies in the portfolio against the revenues they derive (x-axis) from activities classified under a selected screening sub-category using "bubbles" 802. Depending upon the particular implementation, different colors, shading or other means can be used to denote the specific portfolio leg and/or benchmark shown by the bubbles 802 in the chart 800. As shown, there are companies in the Long portfolio and Short portfolio with revenues from the subcategory 506a-506e selected in the spider web graph 505 of FIG. 5 in pane 404. As shown, for purposes of illustration, those revenues range from 5% to 100%. with the vast majority of both the long and short portfolio being at those two extremes.

Figure 9:
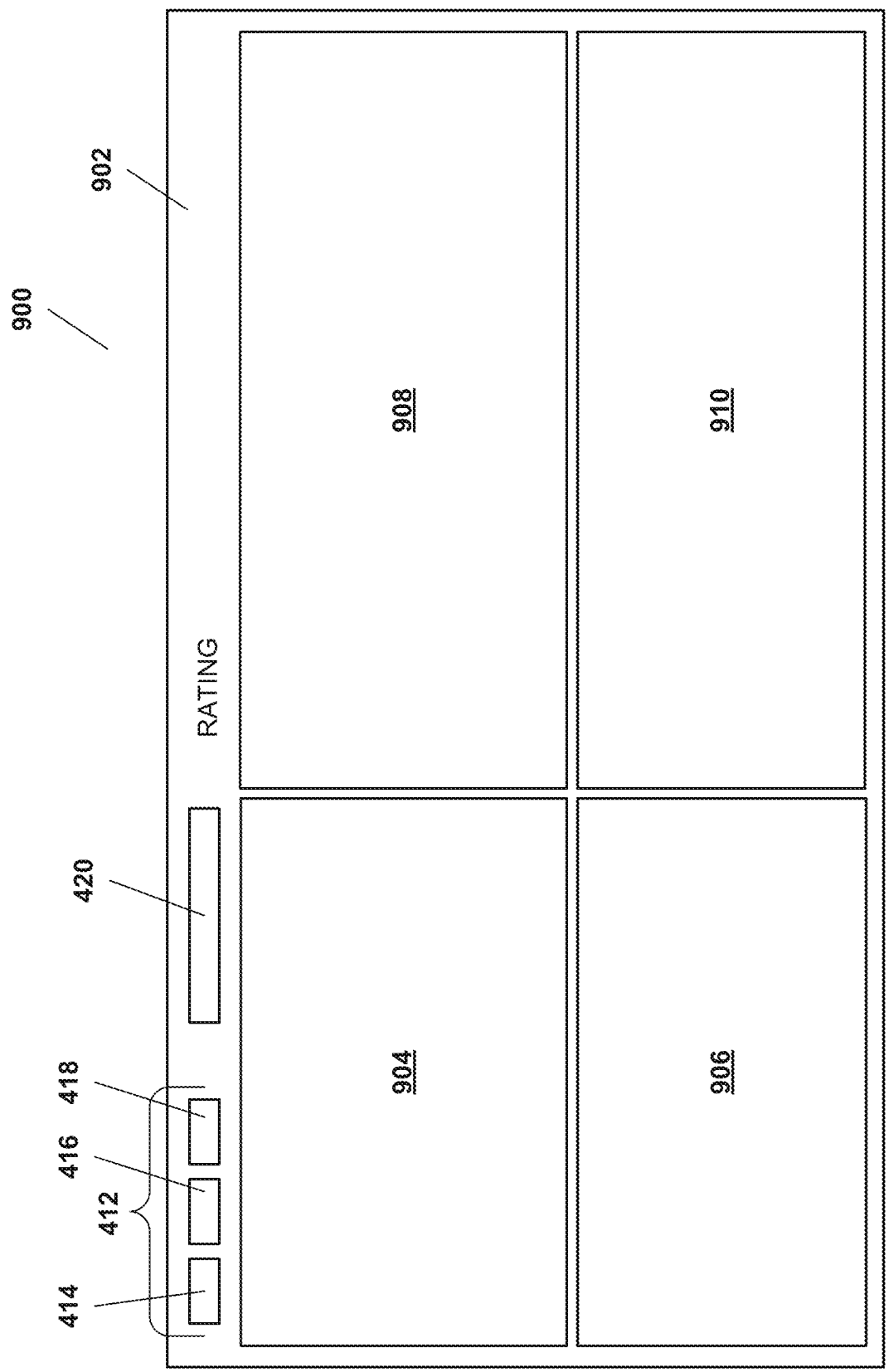
FIG. 9 illustrates, in simplified form, an example layout for a concurrently displayable interactive family of dynamically interrelated panes for a Ratings GUI Module in accordance with the description herein.

FIG. 9 illustrates, in simplified form, an example layout 900 for a concurrently displayable interactive family of dynamically interrelated panes for a Ratings GUI Module 902 in accordance with the description herein. As shown in FIG. 9, the Ratings GUI Module 902 includes four panes 904, 906, 908, 910 that each contain different graphical elements as will be described in greater detail below.

Figure 10:
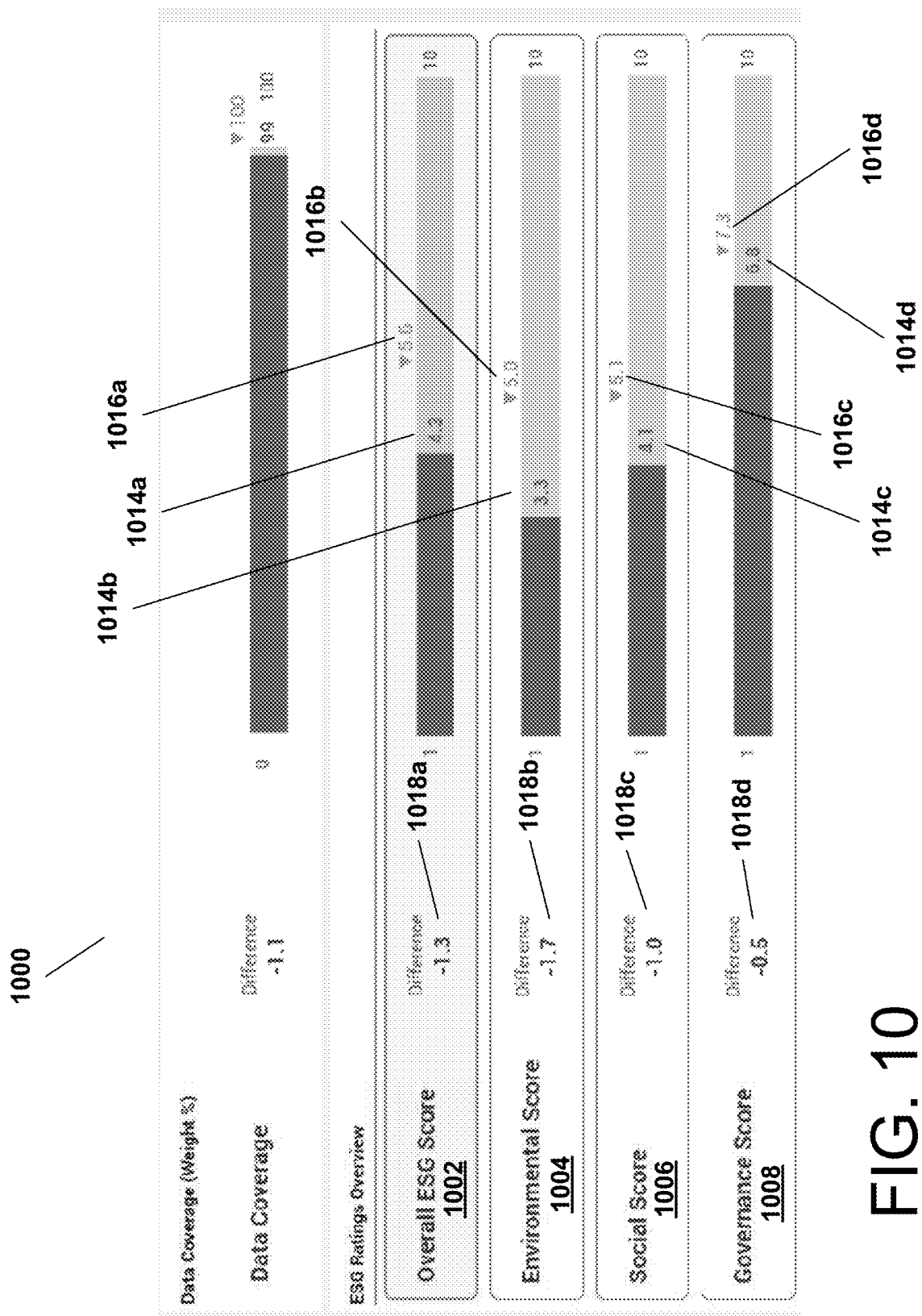
FIG. 10 shows, in simplified form, an example ratings category chart that can be displayed in a pane of FIG. 9.

FIG. 10 shows, in simplified form, an example ratings category chart 1000 that can be displayed in the pane 904 of FIG. 9. This chart 1000 shows a portfolio's weighted average ESG scores, ranging on a scale from 1-10, in comparison to a benchmark 420 selected in the Ratings GUI Module 902 of FIG. 9, for the portfolio 414, long 416 or short 418 positions.

When a position 414, 416, 418 is selected, all charts in the layout 900 are updated to reflect the side selected.

Moreover, advantageously, each rating category 1002, 1004, 1006, 1008 is selectable and will cause the contents all of the panes 904, 906, 908, 910 to update and display information pertinent to that category's ratings. For example, clicking on the "Social Score" box will dynamically alter the panes 904, 906, 908, 910 in the Ratings GUI Module 902 to display information pertinent to only the "Social" ratings.

As shown in FIG. 10, each rating category 1002, 1004, 1006, 1008 includes a bar chart 1010a-1010d and concurrently identifies the benchmark score 1012a-1012d and portfolio score 1014a-1014d in that category 1002, 1004, 1006, 1008 along with the difference 1018a-1018d between them. For example, as shown in FIG. 10, the specified portfolio's "Governance" score at 6.8 is 0.5 points lower than the selected benchmark's score of 7.3.

Figure 11:
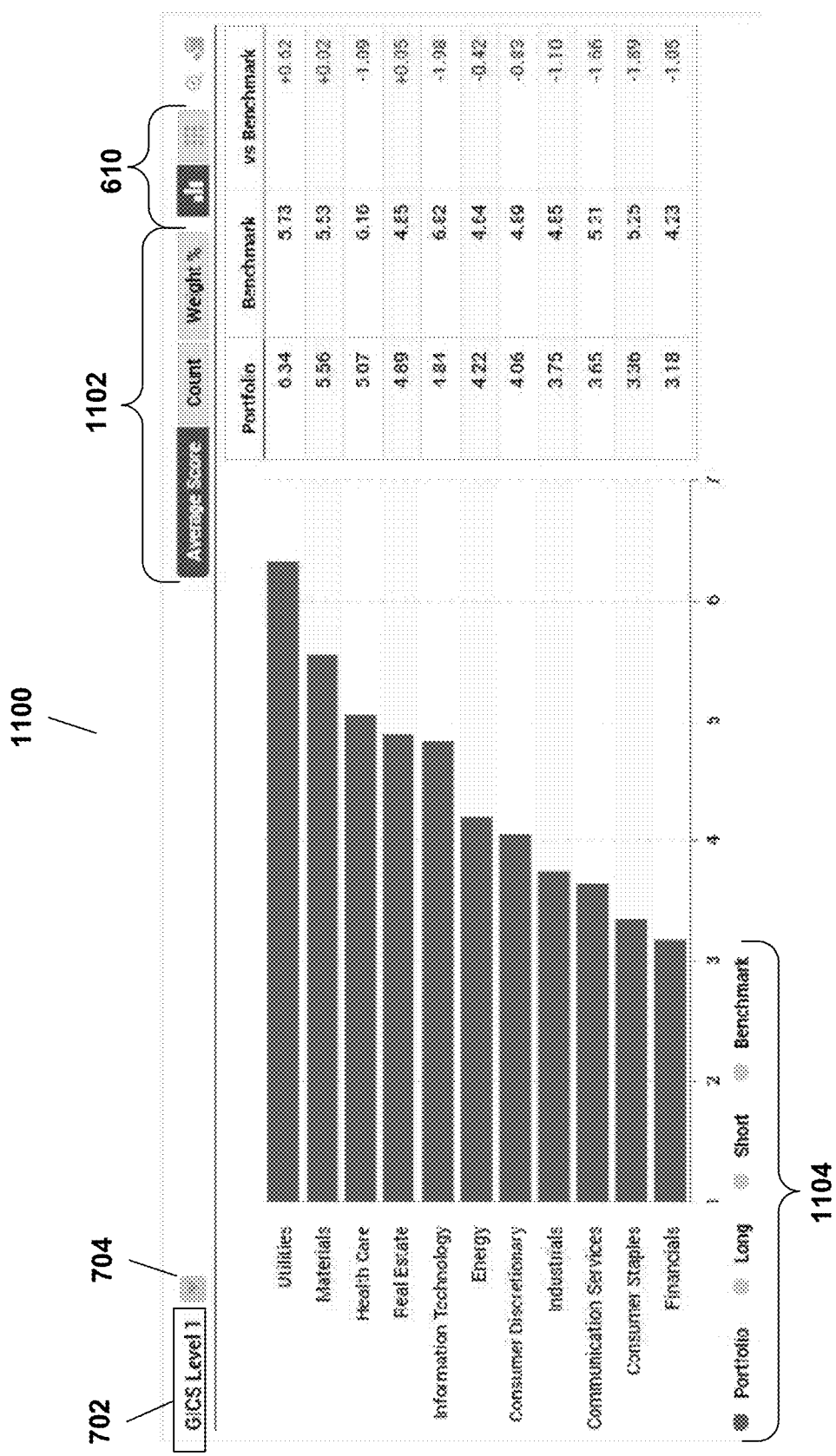
FIG. 11 shows, in simplified form, an example ratings category chart that can be displayed in a pane of FIG. 9.

FIG. 11 shows, in simplified form, an example ratings category chart 1100 that can be displayed in the pane 906 of FIG. 9. This chart 1100 shows information for various sectors and sub-sectors in the portfolio. The chart 1100 is specific to the Overall 1002, Environmental 1004, Social 1006 or Governance 1008 rating type selected in FIG. 10. Advantageously, this chart will dynamically change as the rating type selected in FIG. 10 changes.

Similarly to previous charts, users are able select 704 among GICS, Market Cap, Country, Region or Country Status. As shown, the specific selection 702 is GICS Level 1. Likewise, in this chart 1100, elements are provided that allow for display of the data in terms of Average Score, Count or weight %.

Additionally, the display can be further selectively modified 1104 so that the display is for the entire portfolio, the long leg, the short leg and/or the benchmark.

Figure 12:
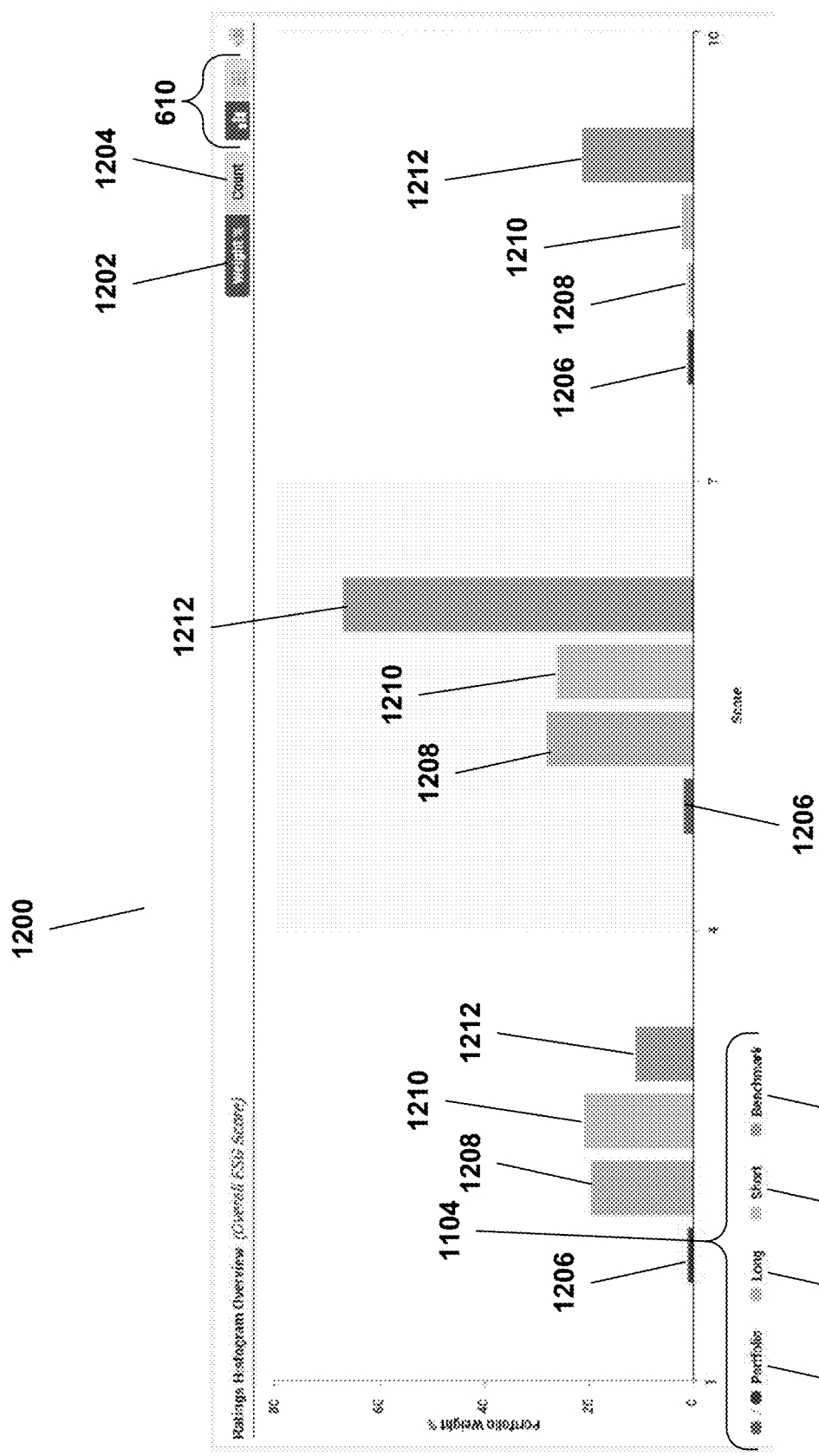
FIG. 12 shows, in simplified form, an example ratings category chart that can be displayed in the pane of FIG. 9.

FIG. 12 shows, in simplified form, an example ratings category chart 1200 that can be displayed in the pane 908 of FIG. 9. This chart 1200 shows the concentration of a portfolio's ESG scores in comparison to a selected benchmark. For example, this histogram is specific to the Overall ESG score 1002 selected in FIG. 10. It shows the % of the net portfolio weight and % of the benchmark weight that received an overall ESG Score between 1-4, between 4-7 and between 7-10. This chart 1200 can advantageously be displayed based on weight (%) 1202 or count 1204 and, as shown, does so concurrently, based upon user selection. As shown the user has selected all of the overall portfolio 1206, the long leg 1208, short leg 1210 and benchmark 1212, so all are displayed.

Figure 13:
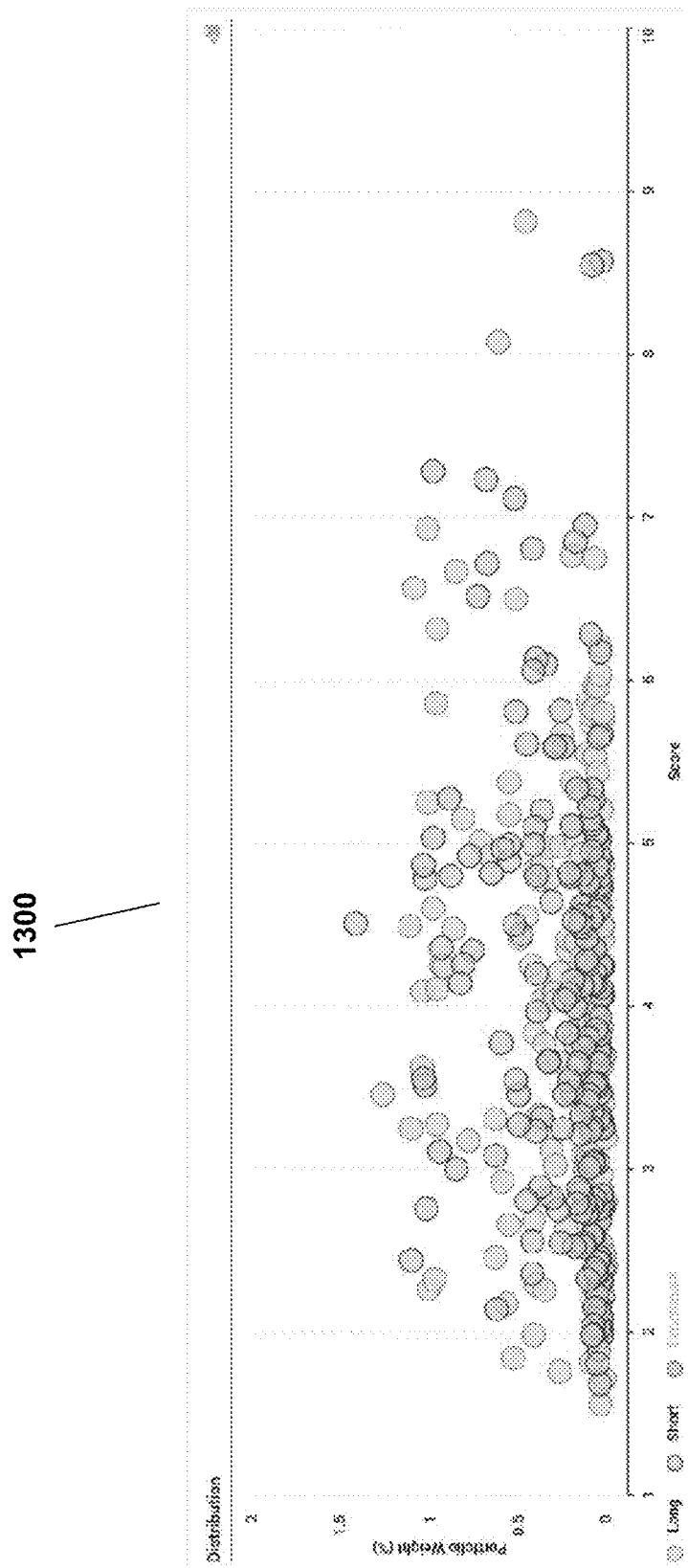
FIG. 13 illustrates, in simplified form, another chart, similar to that of FIG. 8, that can be displayed within the pane 910 of FIG. 9.

FIG. 13 illustrates, in simplified form, another chart 1300, similar to that of FIG. 8, that can be displayed within the pane 910 of FIG. 9.

As shown, the chart 1300 is similar to that of FIG. 8 and plots the notional weights (y-axis) of individual companies in the portfolio against their scores (x-axis) based on the rating type 1002, 1004, 1006, 1008 selected in FIG. 10.

In general, as noted above a given "GUI Module" need not be limited to a single family of interactive, interrelated panes. Rather, a specific "GUI Module" can be constructed such that it includes multiple individual families of interactive, interrelated panes.

Figure 14:
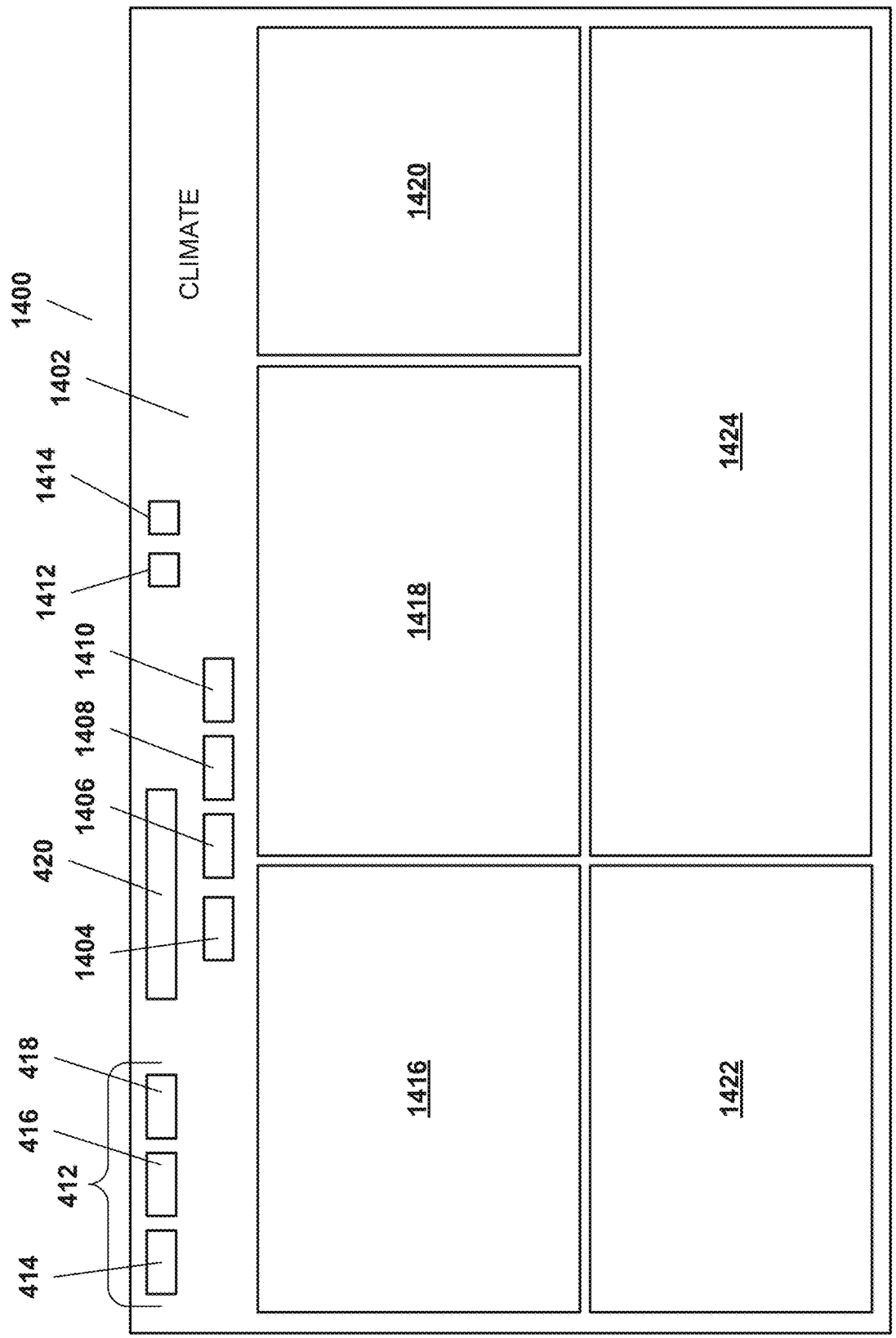
FIG. 14 illustrates, in simplified form, an example layout for a first family, of multiple families of concurrently displayable interactive, interrelated, panes for a Climate GUI Module of the GUI.

FIG. 14 illustrates, in simplified form, an example layout 1400 for a first family, of multiple families of concurrently displayable interactive, interrelated, panes for a Climate GUI Module 1402 of the GUI.

As shown in FIG. 14, the first family of the Climate GUI Module 1402 is accessed by selecting the first button 1404 of multiple family selection buttons 1404, 1406, 1408, 1410. Of course, it is to be understood, that the use of buttons is a matter of design choice and pull down menus, tabs, or other display elements could be used to select and navigate among multiple families of interactive, interrelated, panes for a given GUI Module.

Additionally, the Climate GUI Module 1402 can include other selectable elements 1412, 1414 that are applicable to more than one family of panes.

The first family layout 1400 includes four panes 1416, 1418, 1420, 1422, 1424 that each contain different graphical elements as will be described in greater detail below.

Specifically, with respect to the layout shown in FIG. 14, the family selection buttons include a button 1404 for a Carbon Analysis family of panes 1416, 1418, 14120, 1422, 1424, a button 1406 for an Emission Reduction Targets family of panes (not shown in FIG. 14), a button 1408 for a Climate Change Revenues family of panes (not shown in FIG. 14) and a button 1410 for a Carbon Earnings at Risk family of panes (not shown in FIG. 14).

In addition, one selectable element 1412 allows a user to limit the contents of the panes of the families to GHG Emissions Scope 1 & 2, the other selectable element 1414 allows a user to limit the contents of the panes of the families to GHG Emissions Scope 3. Depending upon the particular implementation design choice, including coverage for all of GHG Emissions Scopes 1-3 can involve, in some implementations, selecting both elements, whereas, other implementations would achieve the same coverage by having both elements unselected.

Figure 15:
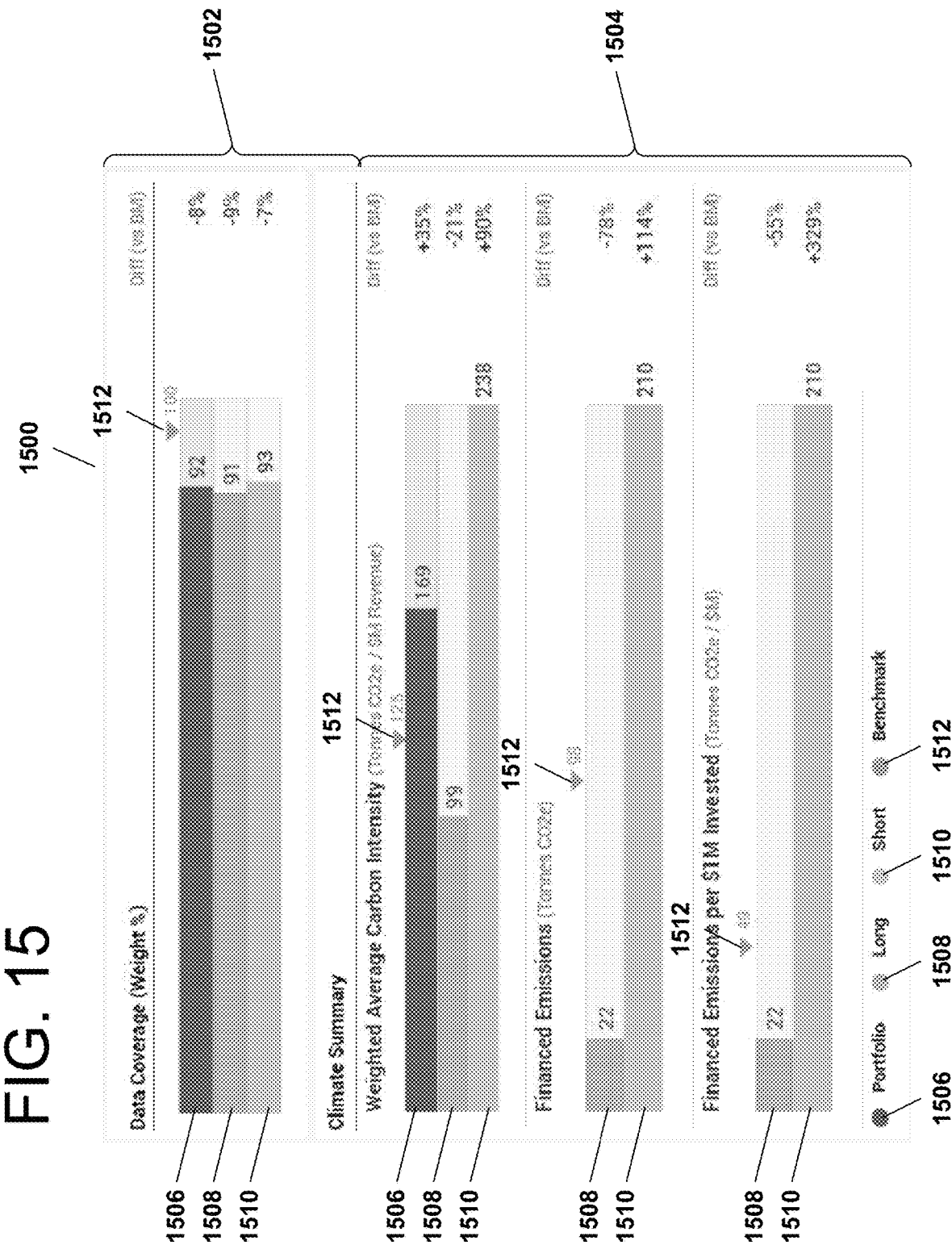
FIG. 15 shows, in simplified form, an example chart of carbon-related summary information that can be displayed in a pane of FIG. 14.

FIG. 15 shows, in simplified form, an example chart 1500 of carbon-related summary information that can be displayed in the pane 1416 of FIG. 14.

The chart 1500 is made up of two parts 1502, 1504. The first part 1502 displays carbon data coverage (by % weight) for the overall portfolio 1506 along with long 1508 and short 1510 positions with the comparable benchmark coverage 1512 overlaid.

The second part 1504 displays a summary of portfolio (total or long/short) positions vs benchmark Weighted Average Carbon Intensity (WACI) and Financed Emissions statistics, with the comparable benchmark figures 1512 overlaid.

Figure 16:
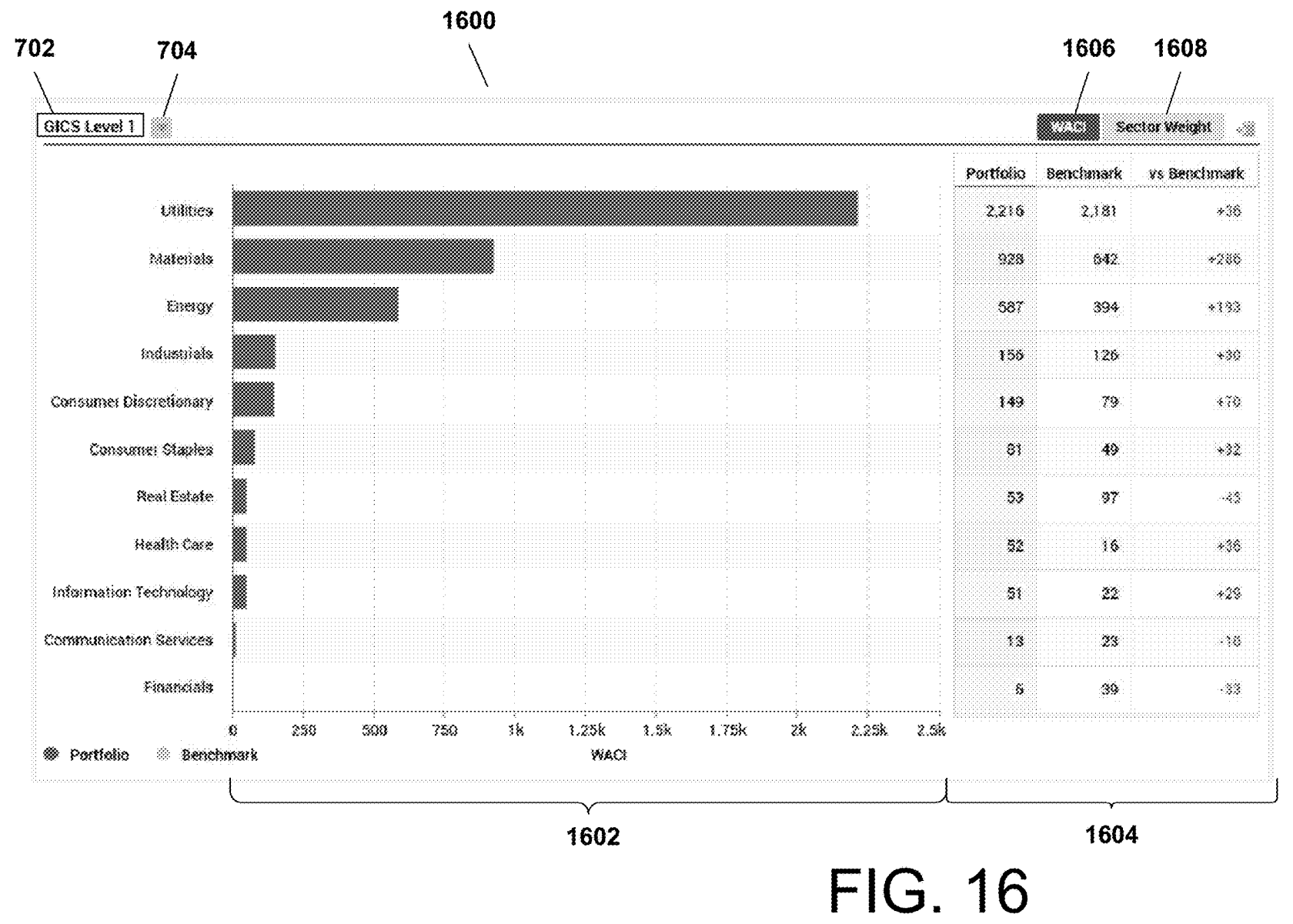

FIG. 16 shows, in simplified form, an example chart 1600 that can be displayed in the pane 1418 of FIG. 14. This chart 1600 shows the WACI for various sectors and sub-sectors of the portfolio and/or benchmark graphically 1602 and numerically 1604. In addition, in this chart 1600, buttons 1606, 1608 are provided that allow a user to switch the displayed information between WACI 1606 and Sector Weight 1608.

Figure 17:
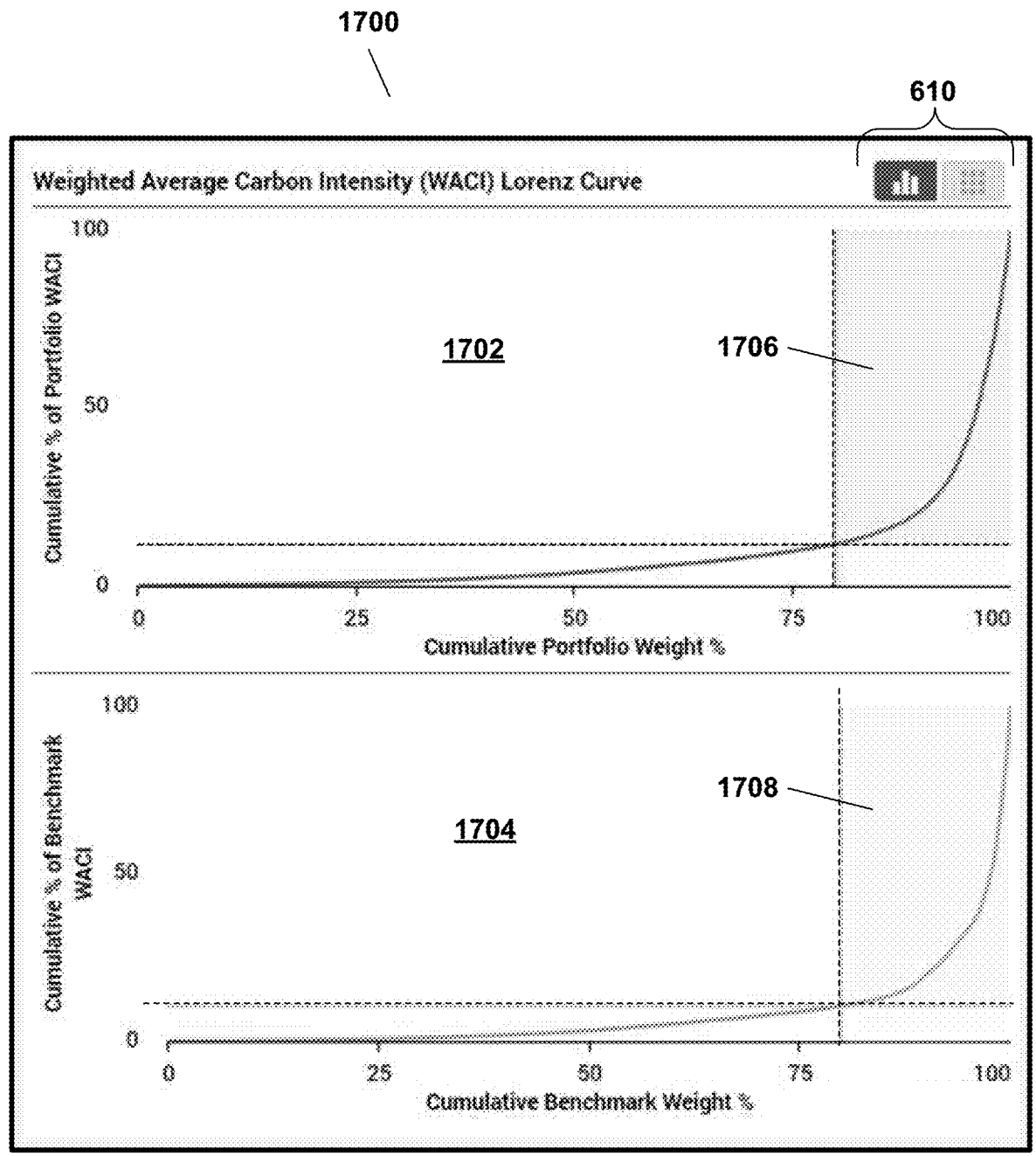
FIG. 17 shows, in simplified form, an example pair of charts that can be displayed in a pane of FIG. 14.

FIG. 17 shows, in simplified form, an example pair of charts 1700 that can be displayed in the pane 1418 of FIG. 14. The charts 1700 plots the WACI (y-axis) against the cumulative weight (x-axis) for both the portfolio 1702 and benchmark 1704. The chart 1700 also indicates the percent of the total WACI coming from just 20% of the portfolio weight 1706 and the percent of the total WACI coming from just 20% of the benchmark weight 1708.

Figure 18:
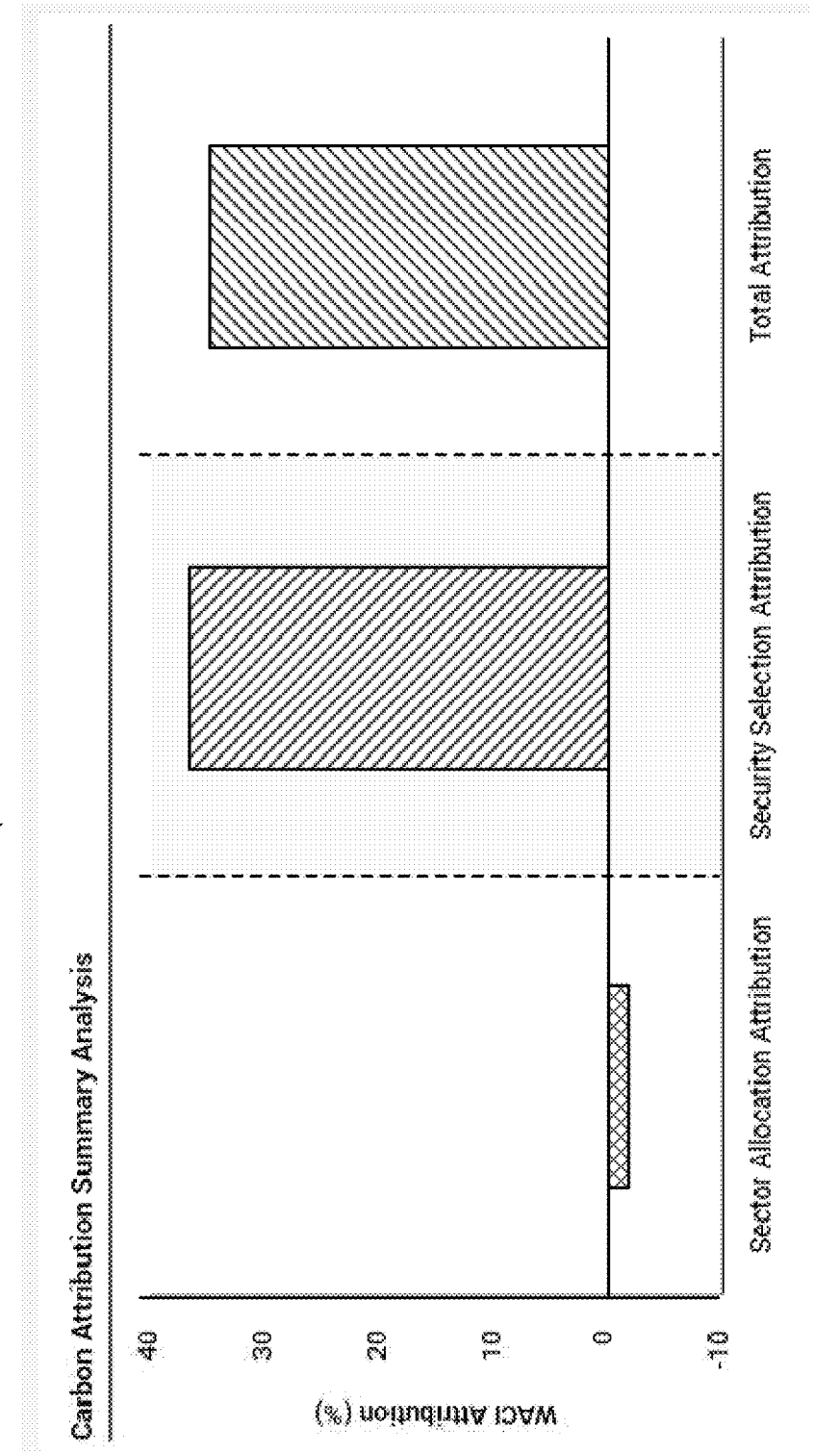
FIG. 18 shows, in simplified form, an example chart that can be displayed in a pane of FIG. 14.

FIG. 18 shows, in simplified form, an example chart 1800 that can be displayed in the pane 1422 of FIG. 14. This chart 1800 plots the WACI Attribution, decomposing the percent difference in WACI between the Portfolio and the Benchmark. The attribution is divided between sector allocation (weighting to carbon intensive sectors) and security selection (weighting to carbon intensive companies within a sector).

Figure 19:
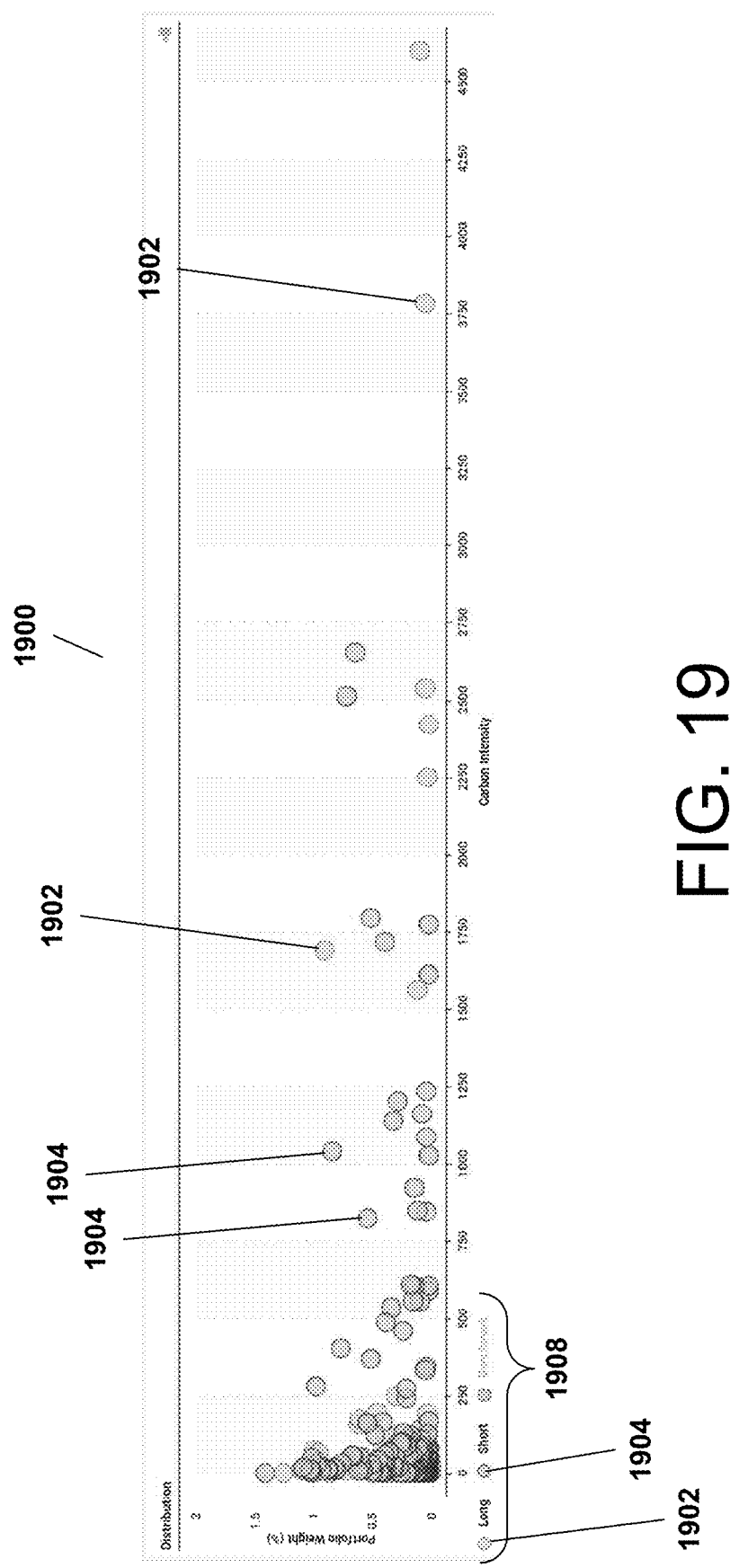
FIG. 19 illustrates, in simplified form, another chart, similar to those of FIGS. 8 and 13, that can be displayed within a pane of FIG. 14.

FIG. 19 illustrates, in simplified form, another chart 1900, similar to those of FIGS. 8 and 13, that can be displayed within the pane 1424 of FIG. 14.

As shown, the chart 1900 plots the notional weights (y-axis) of individual companies in the portfolio against their WACI (x-axis). The long 1902, short 1904 and/or benchmark 1906 "bubbles" that are displayed can be changed by selecting the respective long, short and/or benchmark items in the lower portion 1908 of the chart 1900. As shown, the long and short items are selected, but the benchmark item is not, so bubbles for the benchmark are not present in this chart.

Figure 20:
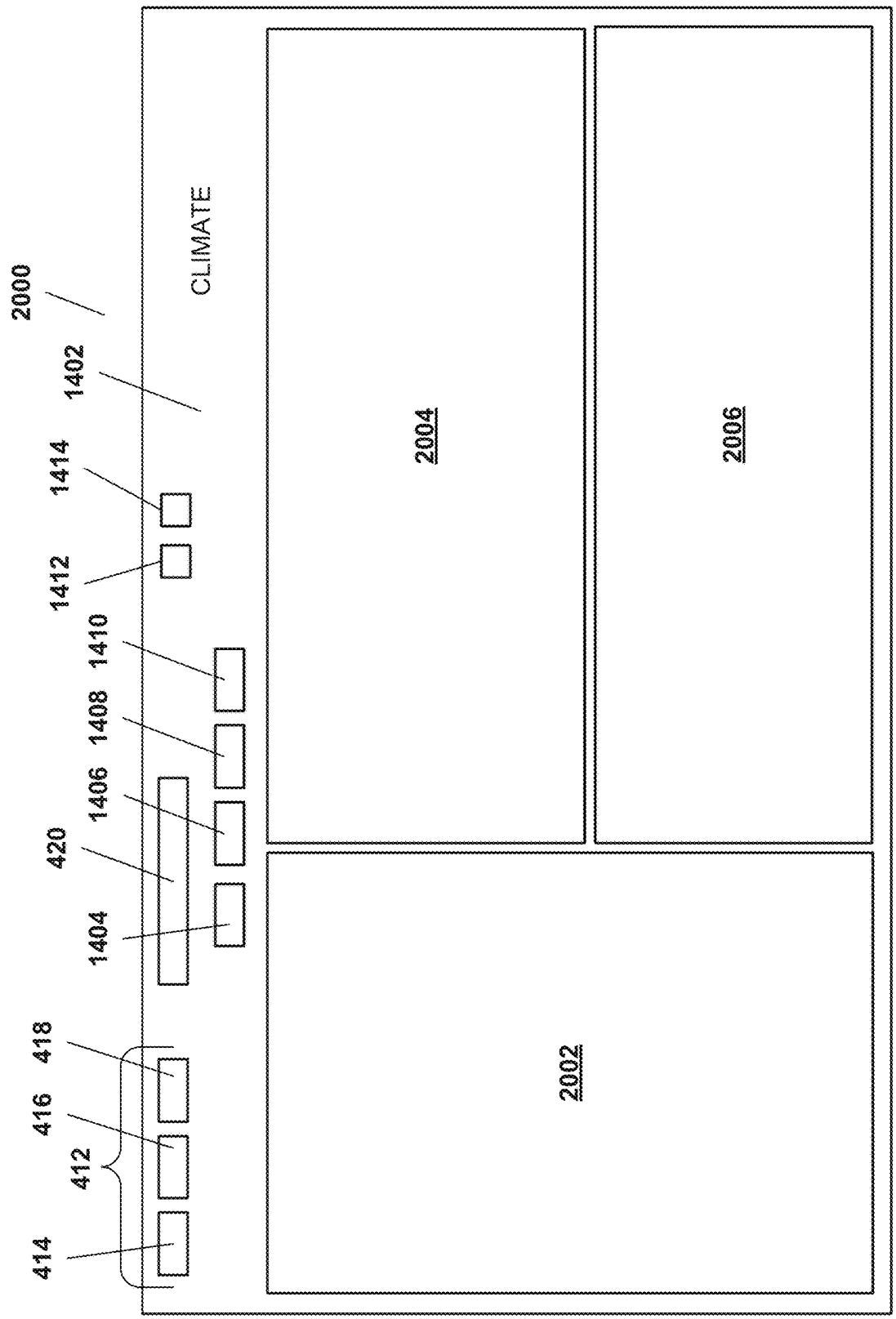
FIG. 20 illustrates, in simplified form, an example layout for a second and third family, of the multiple families of interactive, interrelated, panes for a Climate GUI Module of the GUI.

FIG. 20 illustrates, in simplified form, an example layout 2000 for a second and third family, of the multiple families of interactive, interrelated, panes for a Climate GUI Module 1402 of the GUI. As shown in FIG. 20, the second family of the Climate GUI Module 1402 is accessed by selecting the second button 1406 of multiple family selection buttons 1404, 1406, 1408, 1410.

The second family layout 2000 includes three panes 2002, 2004, 2006 that each contain different graphical elements as will be described in greater detail below.

Figure 21:
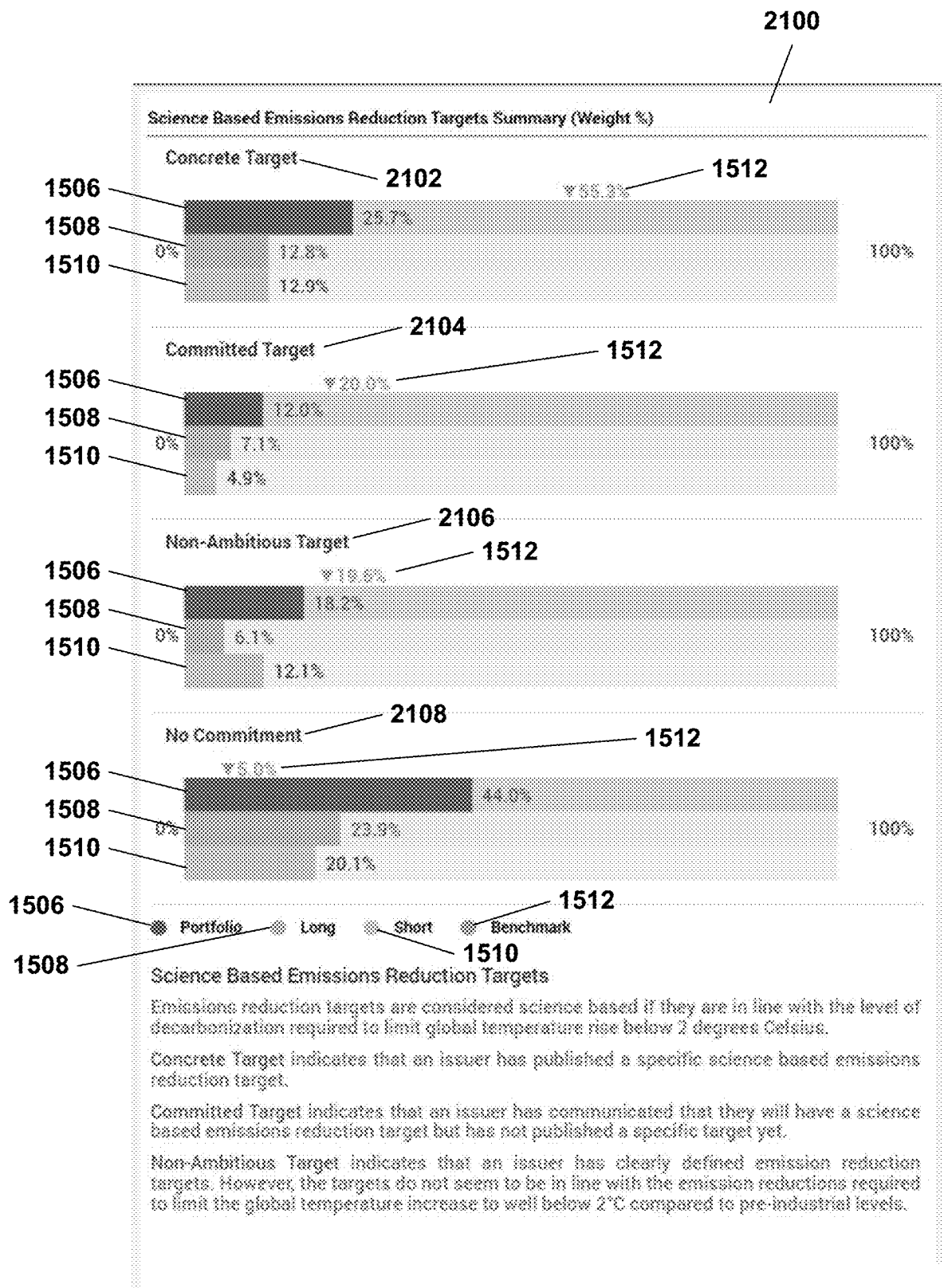
FIG. 21 shows, in simplified form, an example chart that can be displayed in a pane of FIG. 20.

FIG. 21 shows, in simplified form, an example chart 2100 that can be displayed in the pane 2002 of FIG. 20 of summary of emission reduction targets for the overall portfolio, long and short positions, with the benchmark overlaid.

The Concrete Target section 2102 of the chart 2100 displays the weight of portfolio and benchmark issuers that have published a specific science-based emissions reduction target.

The Committed Target section 2104 of the chart 2100 displays the weight of portfolio and benchmark issuers that have communicated that they will have a science-based emissions reduction target but have not published it yet.

The Non-Ambitious Target section 2106 of the chart 2100 displays the weight of portfolio and benchmark issuers that have clearly defined emission reduction targets, but the targets are not in line with the reductions required to limit the global temperature increase to well below 2° C. compared to pre-industrial levels.

The No Commitment section 2108 of the chart 2100 displays the weight of portfolio and benchmark issuers that have no current commitment to a science-based emissions reduction target.

Figure 22:
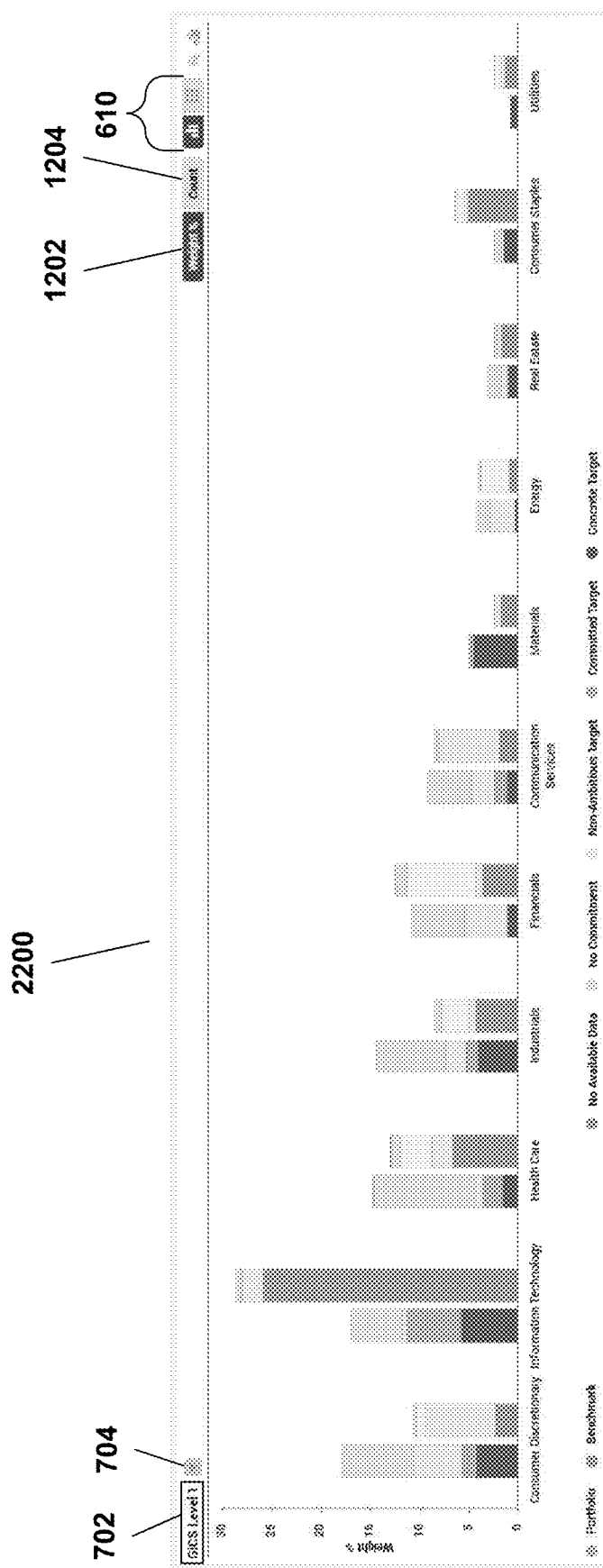
FIG. 22 shows, in simplified form, an example chart that can be displayed in a pane of FIG. 20.

FIG. 22 shows, in simplified form, an example chart 2200 that can be displayed in the pane 2004 of FIG. 20 that shows the weight of sectors and sub-sectors contributing to a portfolio and benchmark's reduction targets. In this pane, users can toggle between weight % 1202 and count 1204.

Figure 23:
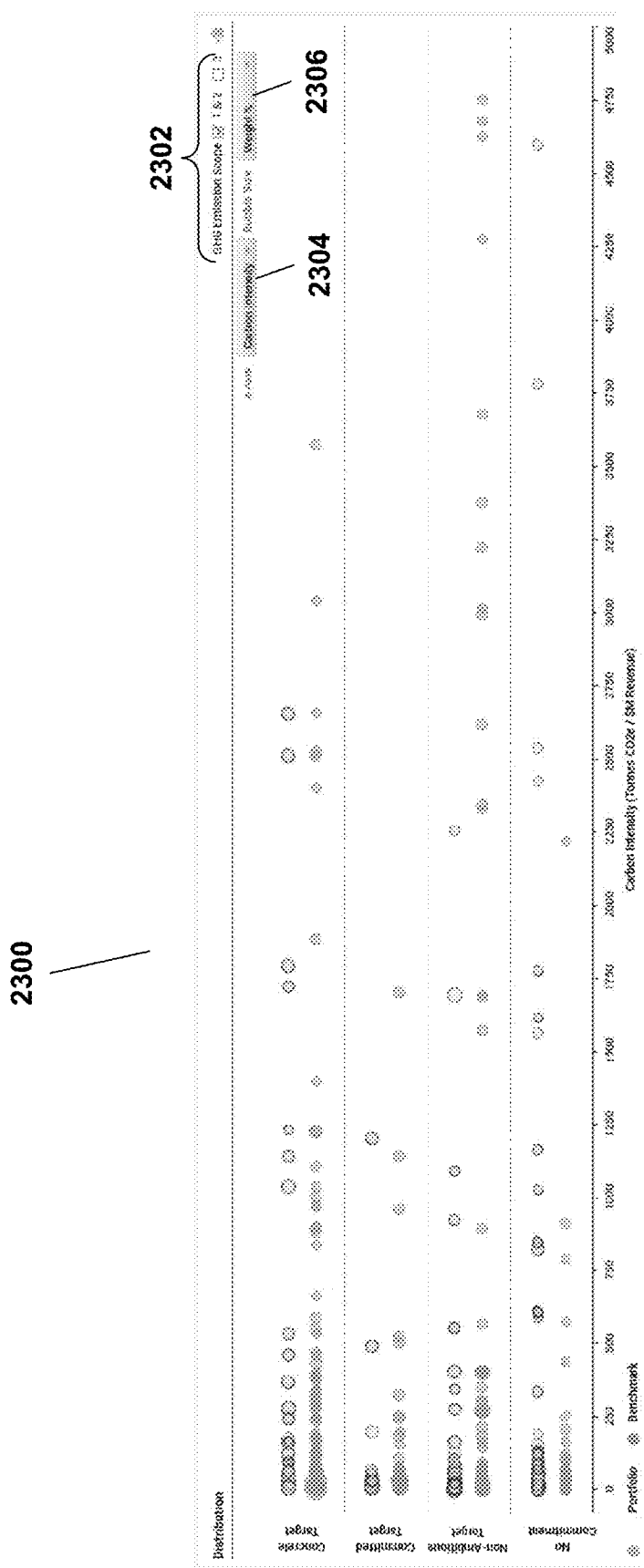
FIG. 23 shows, in simplified form, an example chart that can be displayed in a pane of FIG. 20.

FIG. 23 shows, in simplified form, an example chart 2300 that can be displayed in the pane 2006 of FIG. 20 that plots the issuer target type (y-axis) against carbon intensity (x-axis) with the bubble size representing the weight of each issuer.

As shown, selectable elements 2302 allow a user to choose to display Scope 1, 2, and 3 emissions. In addition, a pair of pull down menus 2304, 2306 allow the user change the x-axis setting 2304 between carbon intensity and weight % and to change the bubble size setting 2306 be based upon weight % or carbon intensity.

Figure 24:
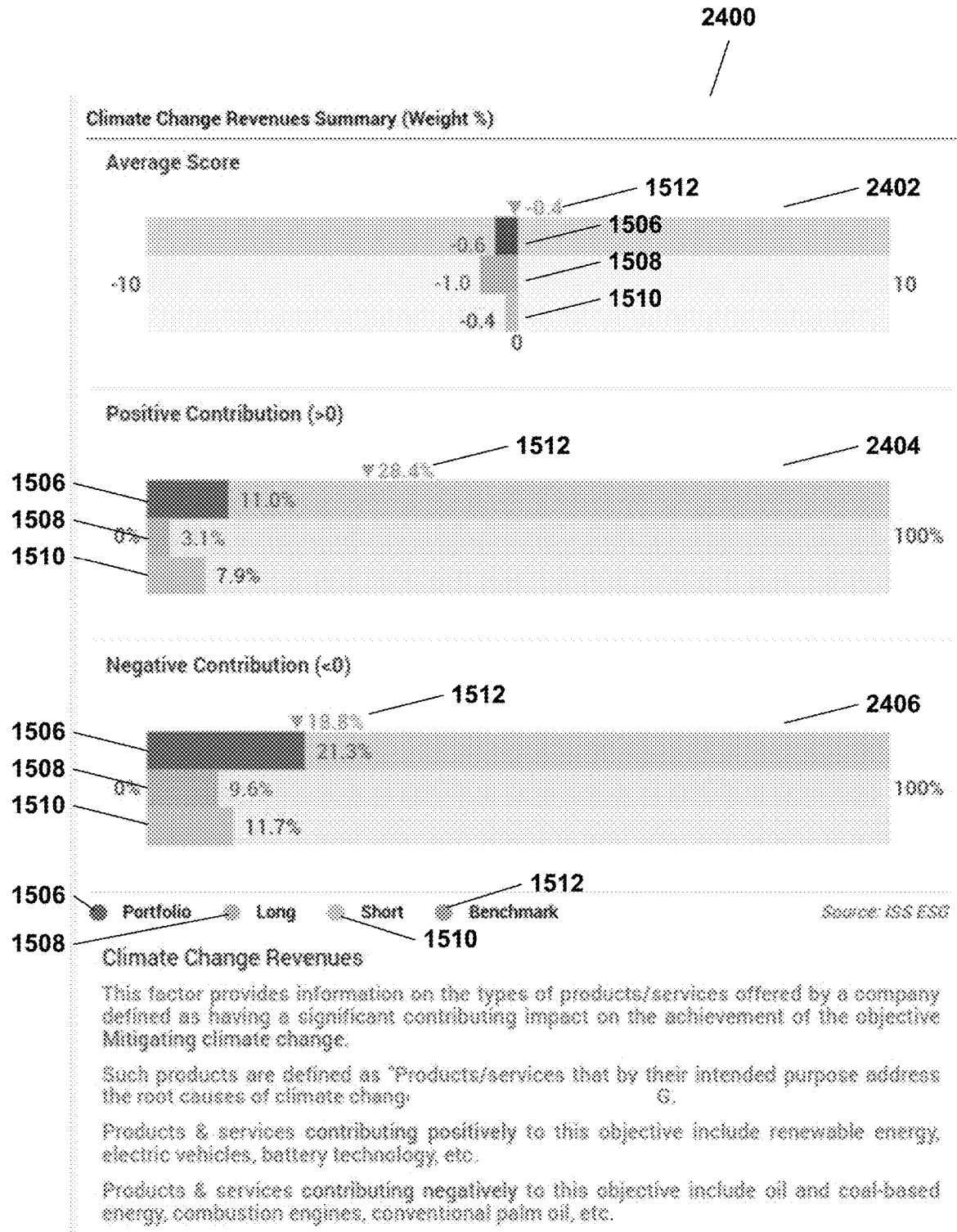
FIG. 24 shows a graphical element that can be displayed in a pane of FIG. 20.
Figure 25:
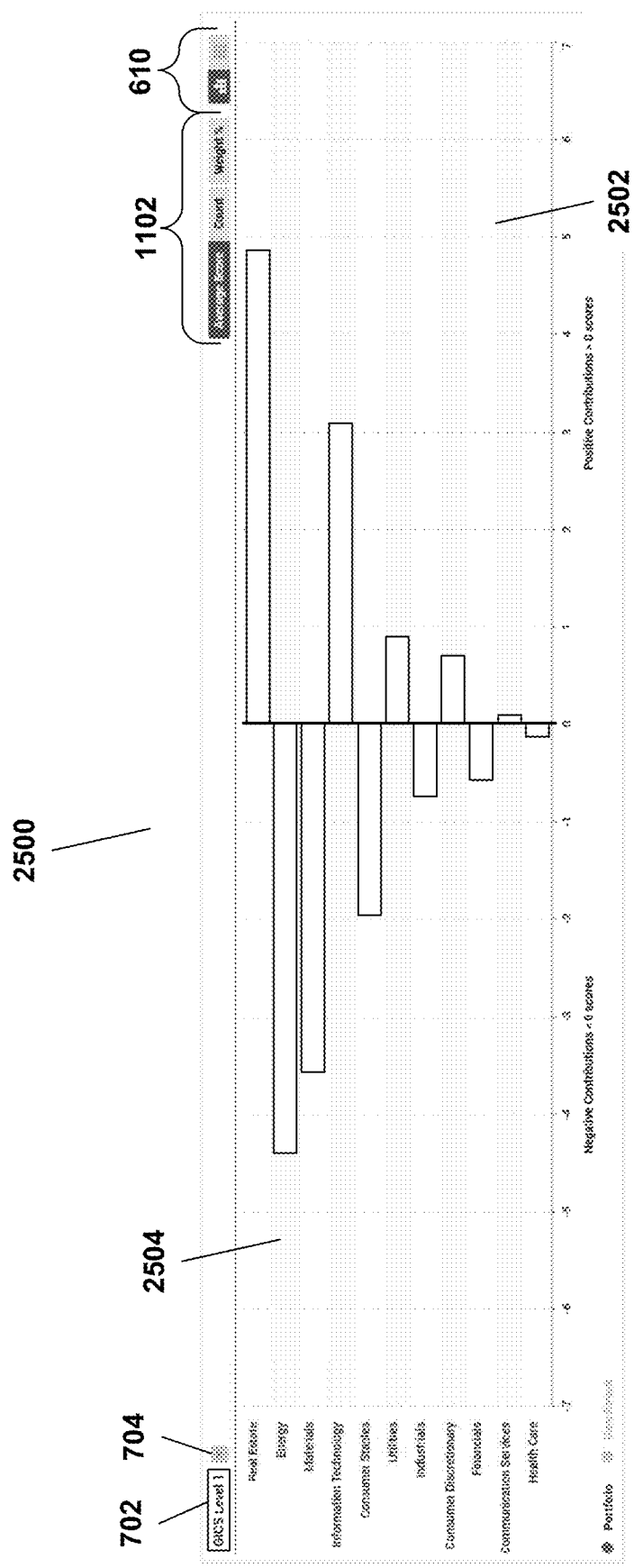
FIG. 25 shows a graphical element that can be displayed in a pane of FIG. 20.
Figure 26:
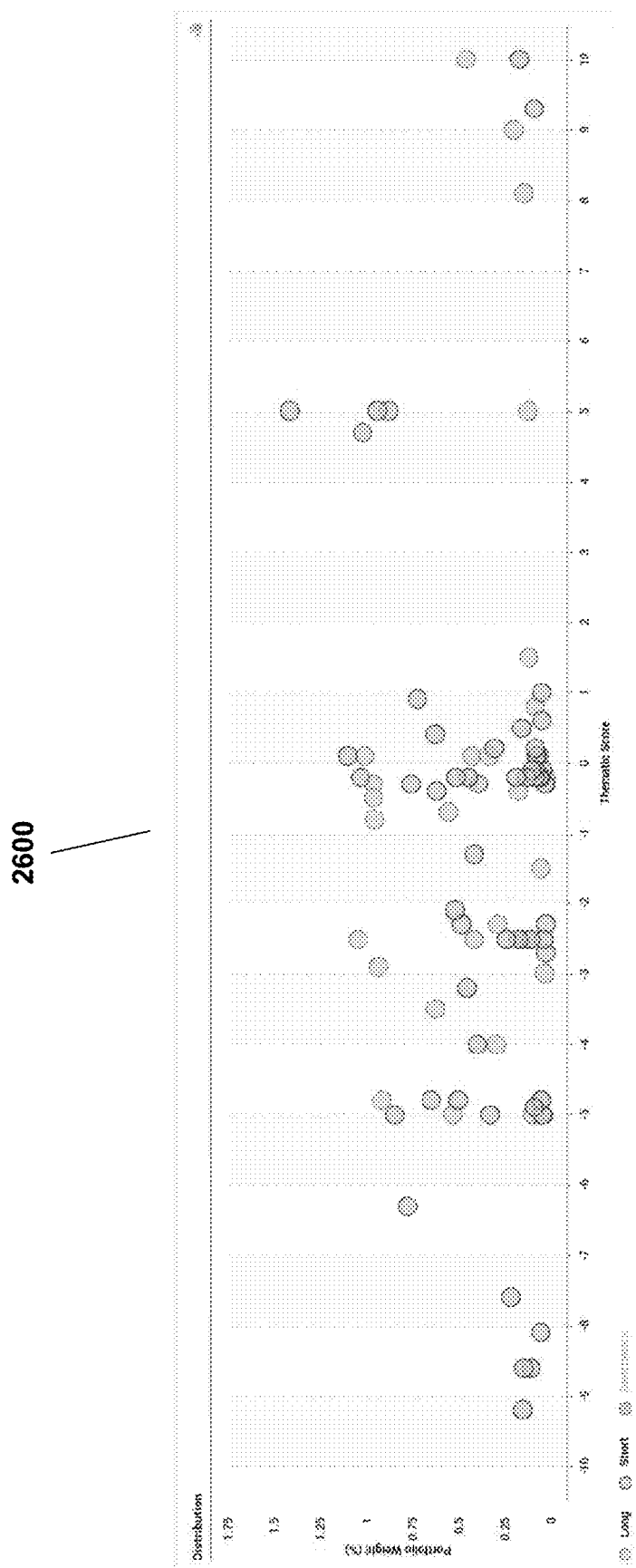
FIG. 26 shows a graphical element that can be displayed in a pane of FIG. 20.

FIGS. 24-26 show the third family of the Climate GUI Module 1402 accessible by selecting the third button 1408 of multiple family selection buttons 1404, 1406, 1408, 1410.

More particularly, FIG. 24 shows a graphical element that can be displayed in pane 2002 of FIG. 20, FIG. 25 shows a graphical element that can be displayed in pane 2004 of FIG. 20, and FIG. 26 shows a graphical element that can be displayed in pane 2006 of FIG. 20, Even more particularly, FIG. 24 shows a set of charts 2400 that can be displayed in the pane 2002 of FIG. 20 and displays Climate Change Revenue metrics for an overall portfolio along with long and short positions and the selected benchmark.

The first section 2402 of the chart 2400 displays the average Climate Change Revenue score on a scale of −10 to 10 for the overall portfolio 1506 along with long 1508 and short 1510 positions. The benchmark score 1512 is overlaid. For example, as shown in this section 2402, the long positions in this portfolio have a weighted average score of −0.1, the short positions in the portfolio have a weighted average score of −0.4, resulting in the overall portfolio having a weighted average score of −0.6, while the benchmark weighted average score is −0.4 (the same as the short positions).

The second section 2404 of the chart 2400 displays the weight % of the portfolio and benchmark contributing positively (score>0) to the Climate Change Revenues score. In this example section 2404, 51.9% of the portfolio is contributing positively towards mitigating climate change compared to 28.4% of the benchmark. More particularly, 3.1% of the long positions and 7.9% of the short positions are contributing positively towards mitigating climate change compared to 28.4% of the benchmark.

The third section 2406 of the chart 2400 displays the weight % of the portfolio and benchmark contributing negatively (score<0) to the Climate Change Revenues score. In this example section 2406, 21.3% of the portfolio is contributing negatively to mitigating climate change compared to 18.8% of the benchmark. More particularly, 9.6% of the long positions and 11.7% of the short positions are contributing negatively towards mitigating climate change compared to 18.8% of the benchmark.

FIG. 25 shows, in simplified form, an example chart 2500 that can be displayed in the pane 2004 of FIG. 20 and graphically shows the average score of positive 2502 and negative 2504 contributions for various sectors and sub-sectors in a portfolio. In this pane, users can toggle 1102 between Average Score, Count and Weight %.

FIG. 26 shows, in simplified form, an example bubble chart 2600 that can be displayed in the pane 2006 of FIG. 20 that plots the notional weights (y-axis) of individual issuers in the portfolio against their thematic score (x-axis) across the −10 to 10 distribution.

Figure 27:
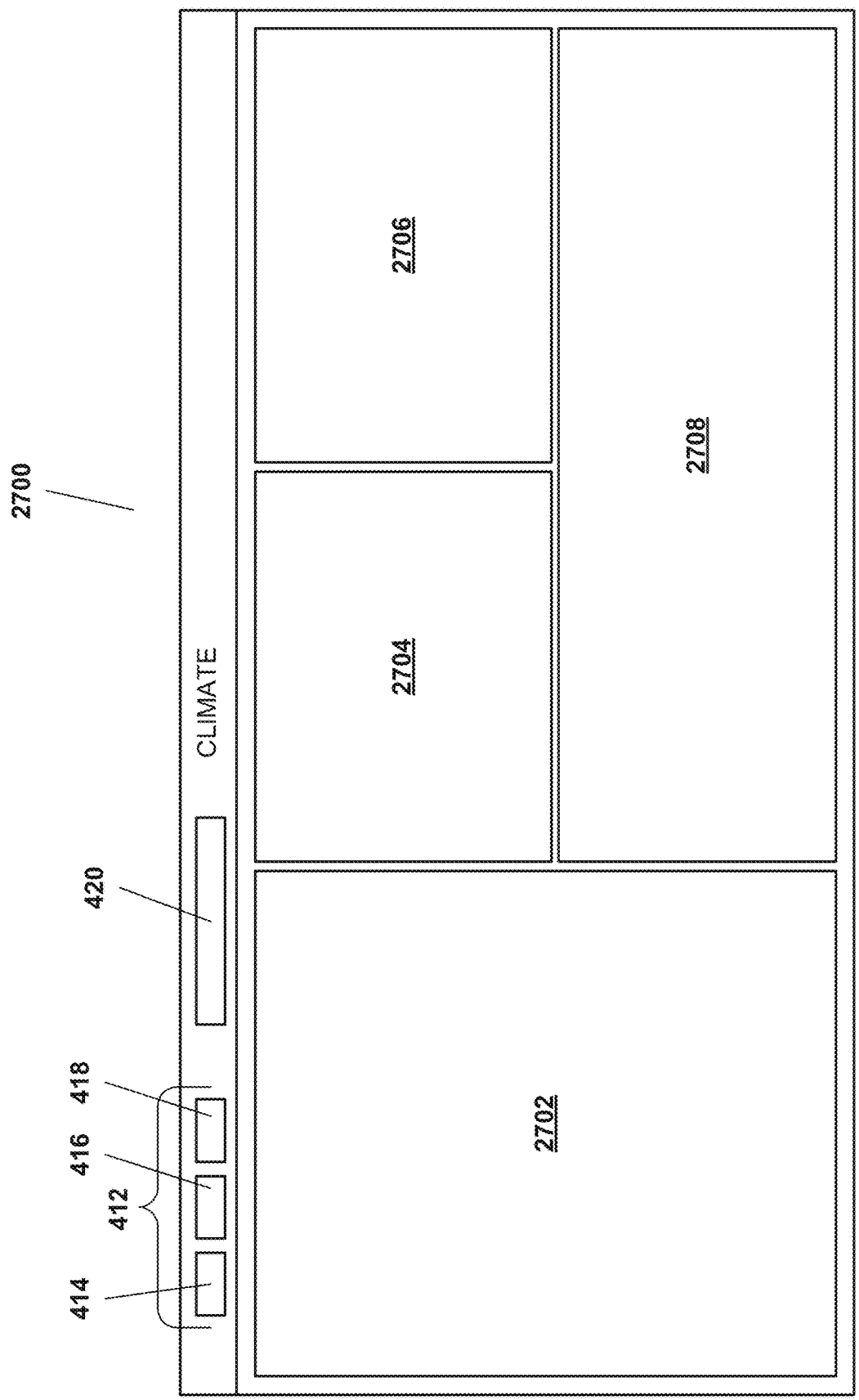
FIG. 27 illustrates, in simplified form, an example layout for a fourth family, of multiple families of interactive, interrelated, panes for a Climate GUI Module of the GUI.

FIG. 27 illustrates, in simplified form, an example layout 2700 for a fourth family of multiple families of interactive, interrelated, panes for a Climate GUI Module 1402 of the GUI. As shown in FIG. 27, the fourth family of the Climate GUI Module 1402 is accessed by selecting the fourth button 1410 of multiple family selection buttons 1404, 1406, 1408, 1410.

The fourth family layout 2700 includes four panes 2702, 2704, 2706, 2708 that each contain different graphical elements as will be described in greater detail below.

Figure 28:
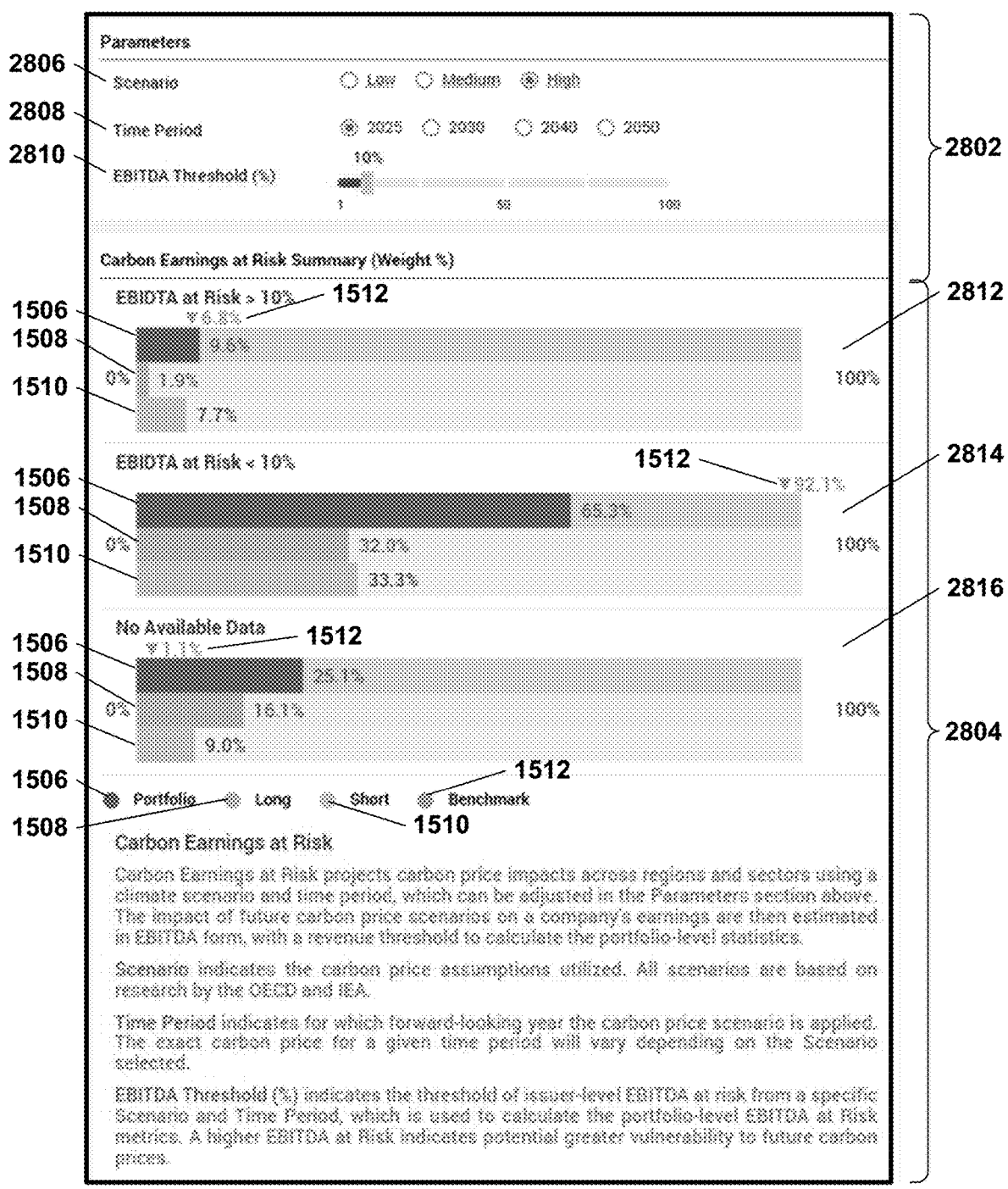
FIG. 28 shows, in simplified form, an example chart that can be displayed in a pane of FIG. 27.

FIG. 28 shows, in simplified form, an example chart 2800 that can be displayed in the pane 2702 of FIG. 27. The chart 2800 is made up of two parts 2802, 2804. The first part 2802 includes a set of parameters that can be modified and, when modified, cause associated changes in the charts in this pane 270 as well as in the other panes 2704, 2706, 2708.

The user has an ability to select a Scenario 2806 related to the implementation of the nationally determined contributions under the Paris Agreement of "Low," "Medium" or "High" where "Low" assumes the full implementation of country nationally determined contributions under the Paris Agreement, "Medium" assumes achievement of the Paris Agreement target, but with action delayed in the short term, and "High" assumes policies are implemented to reduce GHG emissions in line with the Paris Agreement, achieving a 2° C. reduction by 2050.

The user also has an ability to select a Time Period 2808 (as shown, the years 2025, 2030, 2040 and 2050), which is the forward-looking year to which the carbon price scenario is applied, with the carbon price for a given time period varying based upon the selected scenario.

The user additionally has the ability to select an EBITDA Threshold 2810 using a slider. The EBITDA Threshold 2810 is a percentage of issuer-level EBITDA at risk, which can be set between 1%-100% in order to calculate the portfolio-level EBITDA at Risk metrics in the second part 2804 of the chart 2800. A higher EBITDA at Risk indicates potential greater vulnerability to future carbon prices, whereas a lower EBITDA at Risk indicates potentially less vulnerability to future carbon prices.

The second part 2804 displays shows the aggregate portfolio and benchmark weight of carbon earnings at risk given the Threshold set in the first part 2802 of the chart 2800.

The upper graph 2812 in the second part 2804 displays the percentage of the portfolio and benchmark that has EBITDA at risk greater than the threshold set in the first part 2802 of the chart 2800—in this example, based upon an EBITDA Threshold 2810 set by the slider at 10%.

The middle graph 2814 in the second part 2804 displays the percentage of the portfolio and benchmark that has EBITDA at risk less than the threshold set in the first part 2802 of the chart 2800.

The lower graph 2814 in the second part 2804 displays the percentage of the portfolio and benchmark that do not have carbon earnings at risk data available.

Figure 29:
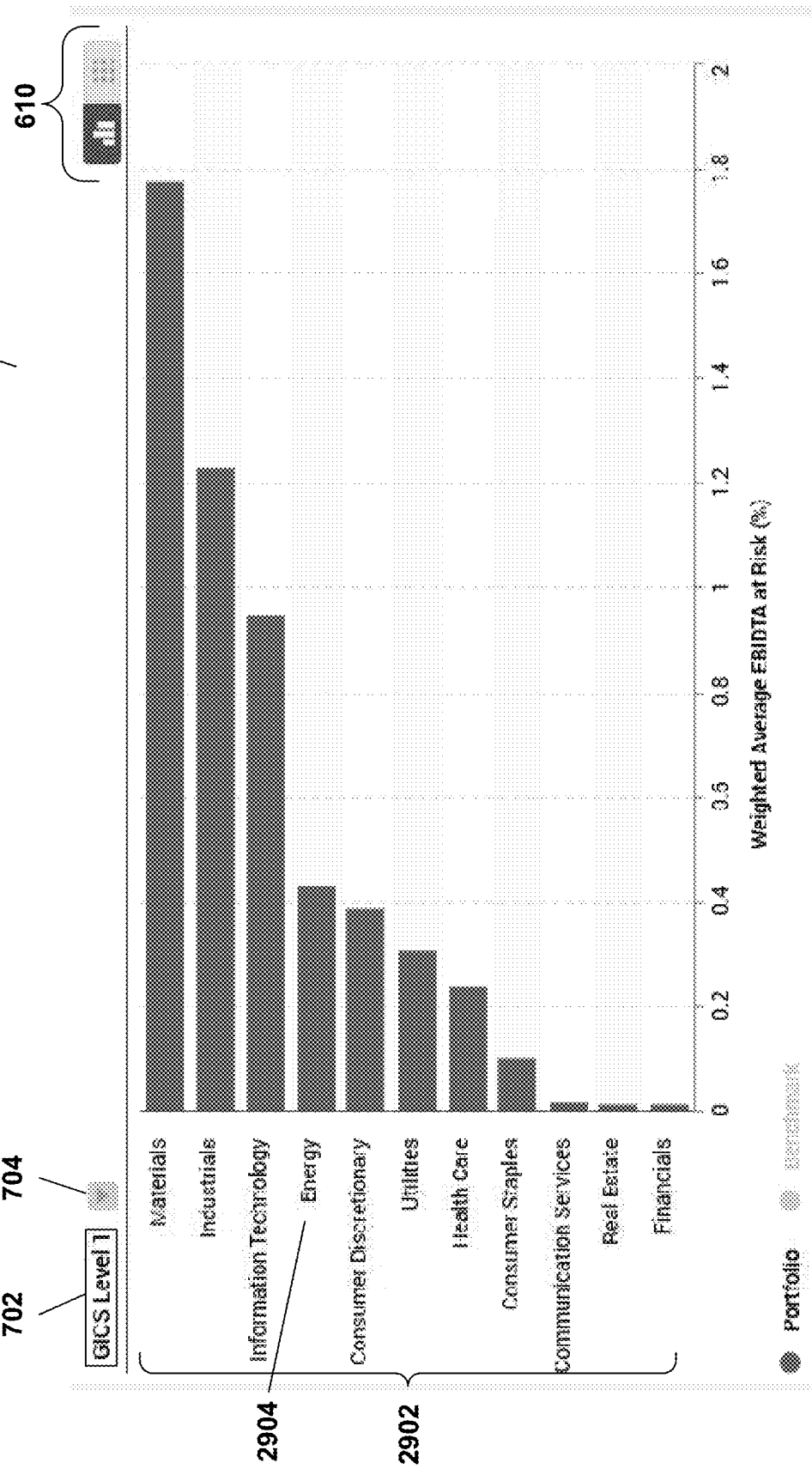
FIG. 29 shows, in simplified form, an example chart that can be displayed in a pane of FIG. 27.

FIG. 29 shows, in simplified form, an example chart 2900 that can be displayed in the pane 2704 of FIG. 27 and shows the portfolio level weighted average EBITDA at risk for various sectors and sub-sectors 2902 based upon the Scenario and Time parameters selected in the first part 2802 of the chart 2800. In addition, a user can further drill down by selecting one of the sectors or sub-sectors 2902, for example "Energy" 2904.

Figure 30:
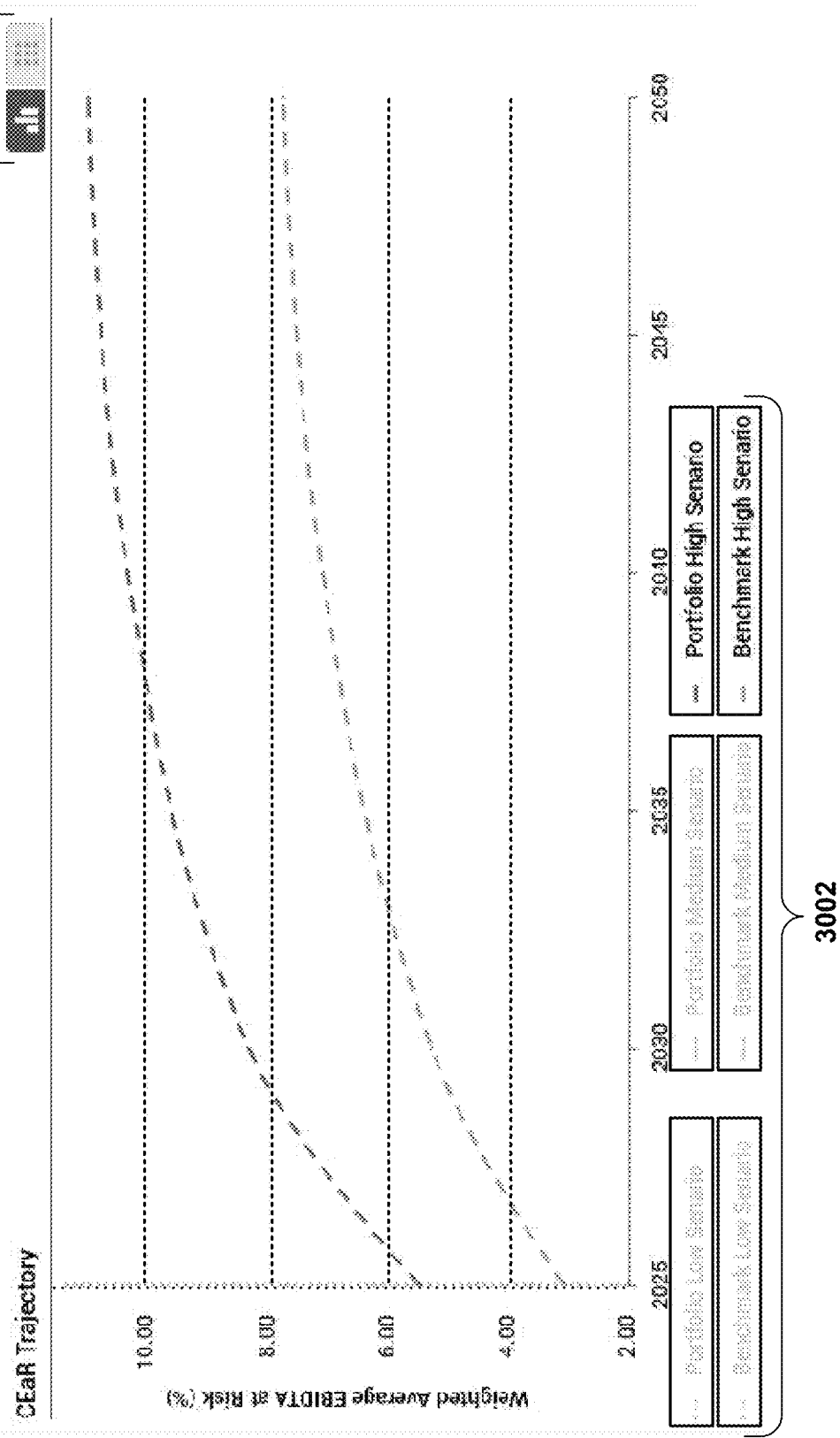
FIG. 30 shows, in simplified form, an example chart that can be displayed in a pane of FIG. 27.

FIG. 30 shows, in simplified form, an example chart 3000 that can be displayed in the pane 2706 of FIG. 27 and, when a sector or sub-sector is selected in the chart 2900, shows the weighted average EBITDA at risk from 2025 to 2050 for the portfolio and benchmark under the selected sector or sub-sector, in this example "Energy" 2904 form FIG. 29. The chart 2900 of FIG. 29 provides a granular breakdown of the aggregate trajectory on this chart 3000 for a specific Time Period and Scenario parameter selected in the first part 2802 of the chart 2800.

In addition, in this chart 3000, a user is able to select items 3002 to switch the display and/or overlay, in the chart 3000, Low, Medium and/or High Scenarios for the Portfolio and/or Benchmark.

Figure 31:
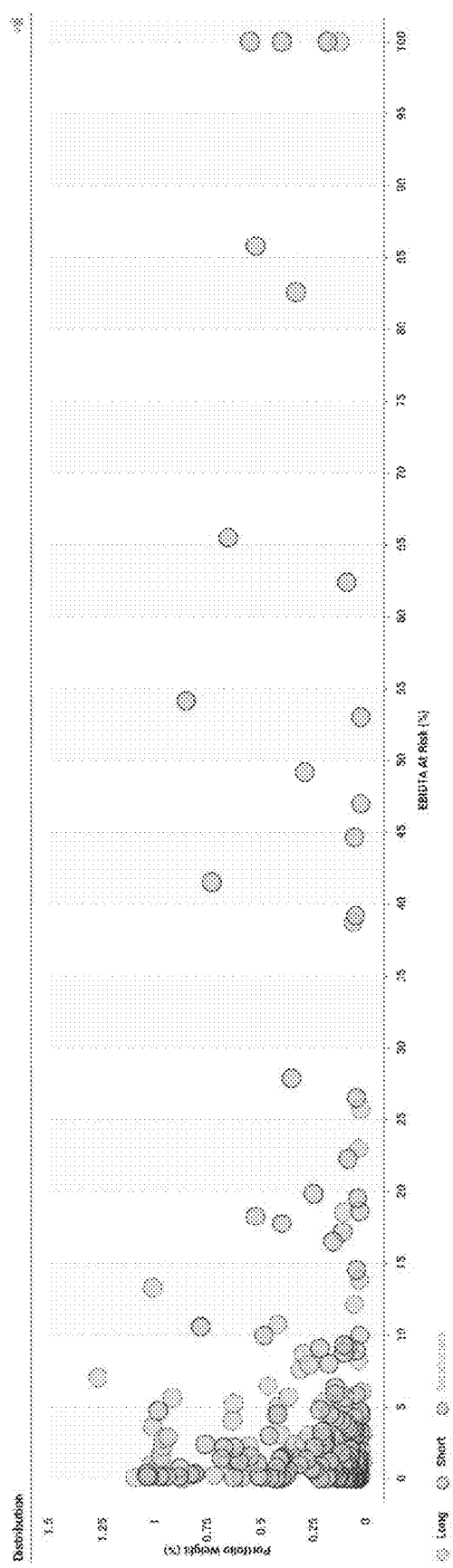
FIG. 31 shows, in simplified form, an example bubble chart that can be displayed in a pane of FIG. 27.

FIG. 31 shows, in simplified form, an example bubble chart 3100 that can be displayed in the pane 2708 of FIG. 27. The chart 3100 plots the notional weights (y-axis) of individual issuers in the portfolio against the EBITDA at risk (x-axis) based on the parameters selected in the first part 2802 of the chart 2800. Although, as shown, the chart 3100 of FIG. 31 pertains to the entire selected portfolio, if a user selected one of the sectors or sub-sectors 2902, for example "Energy" 2904 in the chart 2900 of FIG. 29, then this chart 3100 would contain a plot only for companies that fell under "Energy" 2904.

Figure 32:
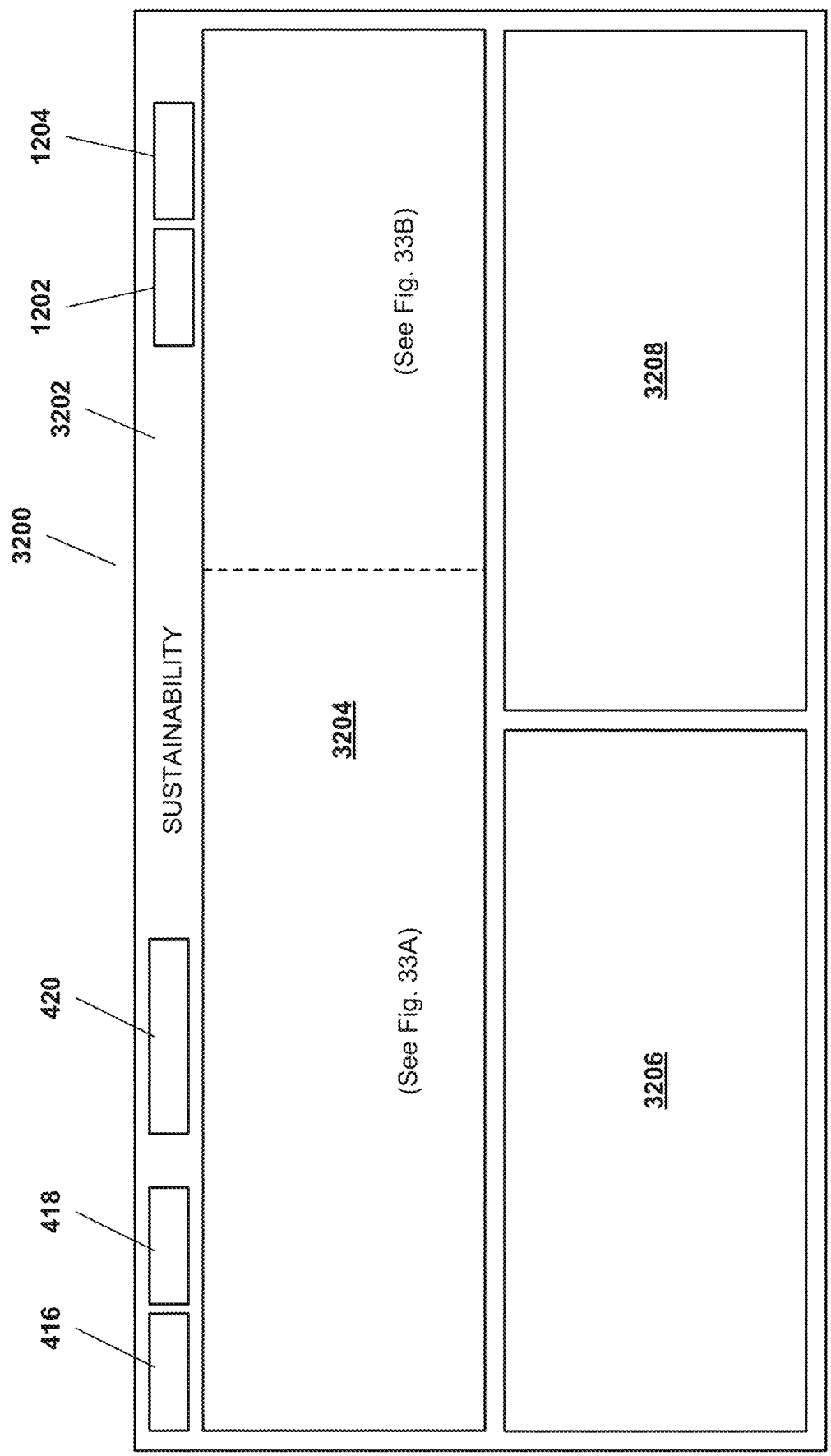
FIG. 32 illustrates, in simplified form, an example layout for a concurrently displayable interactive family of dynamically interrelated panes for a Sustainability GUI Module in accordance with the description herein.

FIG. 32 illustrates, in simplified form, an example layout 3200 for a concurrently displayable interactive family of dynamically interrelated panes for a Sustainability GUI Module 3202 in accordance with the description herein. As shown in FIG. 32, the Sustainability GUI Module 902 includes three panes 3204, 3206, 3208 that each contain different graphical elements as will be described in greater detail below. Note that the dashed line in the upper pane 3204 is merely to indicate that, for clarity of description, example contents of that pane 3204 must span two figures.

FIGS. 33A-33B, in combination show, in simplified form, the left (FIG. 33A) and right (FIG. 33B) sides of an example chart 3300 that can be displayed in the pane 3202 of FIG. 32.

Collectively, FIGS. 33A-33B show, by way of example, a portfolio's overall sustainable theme scores for different "Themes" by evaluating companies that positively or negatively contribute to a theme, based on their product or services revenues associated with the given theme relative to a benchmark.

As shown, FIGS. 33A-33B include six themes: Climate Solutions 3302, Circular Economy 3304, Access To Education 3306, Green Buildings 3308, Healthy Living 3310 and Water Solutions 3312.

In this example, Climate Solutions involves information on the types of products/services offered by a company having a significant contributing impact on the achievement of the objective of "mitigating climate change." Products & services contributing positively to this objective include renewable energy, electric vehicles, battery technology, etc., whereas products & services contributing negatively to this objective include oil and coal-based energy, combustion engines, conventional palm oil, etc.

Circular Economy involves information on the types of products/services offered by a company having a significant contributing impact on the achievement of the objective of "optimizing material use." Products & services contributing positively to this objective include recycling activities, reusable packaging, non-agricultural renewable raw materials, etc. There are no specific products & services that contribute negatively to this objective.

Access To Education involves information on the types of products/services offered by a company having a significant contributing impact on the achievement of the objective of "delivering education." Products & services contributing positively to this objective include educational facilities, teaching materials, software solutions, etc. There are no specific products & services that contribute negatively to this objective.

Green Buildings involves information on the types of products/services offered by a company having a significant contributing impact on the achievement of the objective of "promoting sustainable buildings." Products & services contributing positively to this objective include LEED certified buildings, insulating materials, rooftop solar panels, etc. There are no specific products & services that contribute negatively to this objective.

Healthy Living involves the maximum scoring of two objectives—"Ensuring health" and "Combating hunger and malnutrition." Ensuring health involves information on the types of products/services offered by a company having a significant contributing impact on the achievement of that objective, such as products/services designed to treat severe diseases, ensure survival, enable participation in daily life, essential diagnostics as well as complex safety products. Products & services contributing positively to this objective include prescription medicines, vaccines, imaging equipment, etc. Products & services contributing negatively to this objective include weapons, tobacco products, etc.

Combating hunger and malnutrition involves information on the types of products/services having a significant contributing impact on the achievement of that objective, such as products/services with a high nutritional value that provide people with energy and beneficial nutrients for growth, development and maintenance. Products & services contributing positively to this objective include fruits, vegetables, pulses, etc. Products & services contributing negatively to this objective include alcohol, red meat-based products, sugar, etc.

Water Solutions involves the types of products/services offered by a company having a significant contributing impact on the achievement of the objective of "conserving water" by significantly improving the quantity and quality of freshwater resources. Products & services contributing positively to this objective include waste-water treatment, water-saving technologies, purification products, etc. Products & services contributing negatively to this objective include riverine disposal of mine tailings, tailings disposal in lakes, etc.

The portfolio and benchmark receive weighted average scores $3314a$-$3314f$ for each theme ranging 3316 from −10 to 10 based on issuer's underlying scores in each theme. In this example, the weighted overall portfolio score $3314a$ in the Climate Solutions Theme is −1.03 while the weighted overall benchmark score for the same Theme is −0.38.

This chart 3300 also graphically displays how much weight of the portfolio and benchmark are positively or negatively contributing to each theme, which is the basis for the weighted average scores 3314*a*-3314*f*. In this example chart 3300, referring to the Climate Solutions Theme, as shown, 3.13% of the long issuers in the portfolio are contributing positively to Healthy Living (scores>0) whereas 9.56% of the long issuers in the portfolio are contributing negatively to Healthy Living (scores<0) resulting in the weighted average score 3314*a* of −1.03 compared to the benchmark of −0.38.

In addition, each Theme 3302, 3304, 3306, 3308, 3310, 3312 is selectable by, for example, clicking within the bounded area 3320*a*-3320*f* for that Theme.

Figure 34:
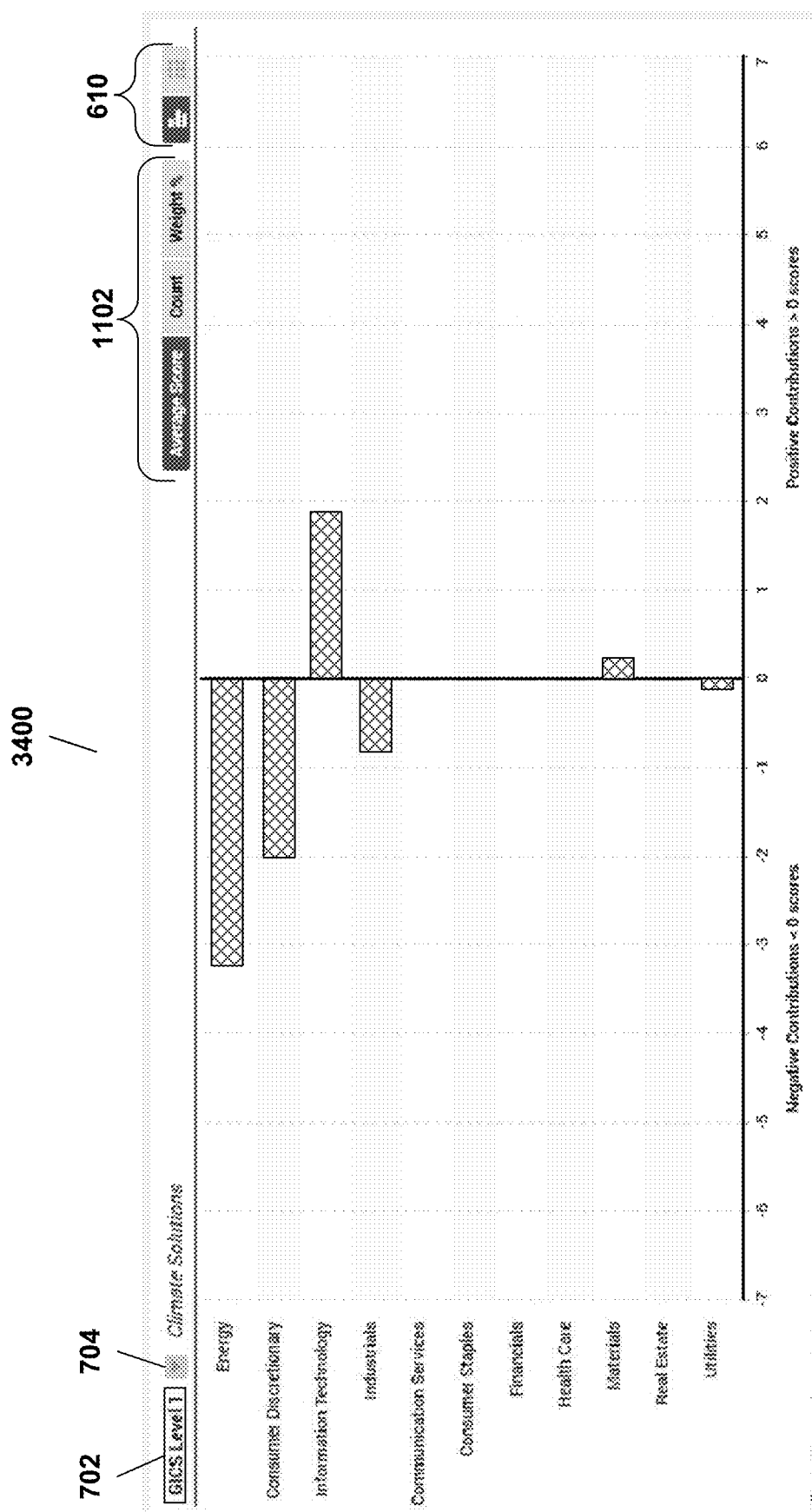
FIG. 34 shows, in simplified form, an example of a chart that can be displayed in a pane of FIG. 32.

FIG. 34 shows, in simplified form, an example chart 3400 that can be displayed in the pane 3204 of FIG. 32 and graphically shows the average score for various sectors and sub-sectors in the portfolio. This is specific to the theme selected by selection of a theme (by clicking in a bounded area 3320*a*-3320*f*). For example, since Climate Solution was selected in the chart 3300 of pane 3202, this chart was updated to reflect the long issuer scores for that Theme and will dynamically change based on a new Theme selection in the chart 3300 of pane 3202.

Figure 35:
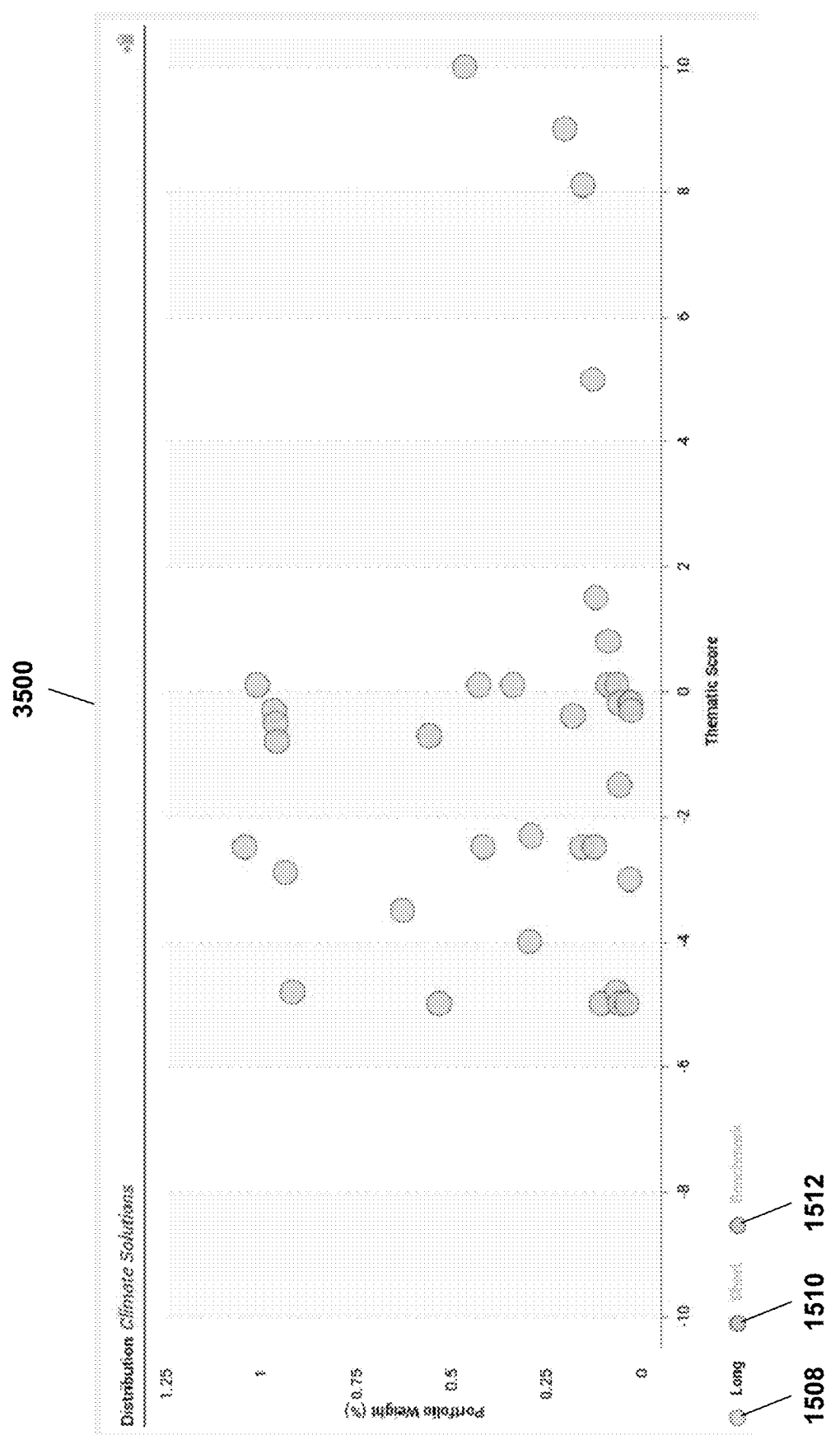
FIG. 35 shows, in simplified form, an example bubble chart that can be displayed in a pane of FIG. 32.

FIG. 35 shows, in simplified form, an example bubble chart 3500 that can be displayed in the pane 3206 of FIG. 32. The chart 3100 plots the notional weights (y-axis) of individual issuers in the portfolio against their thematic scores (x-axis) based on the rating type selected in pane 3202.

FIG. 36 shows, in simplified form, an example chart 3600 that can be generated by the Sustainability Micro Service 232 for display in the GUI as part of the Sustainability GUI Module 3202. More particularly, the chart 3600 is a table that shows a selected portfolio's long and short performance and a selected benchmark performance on a subset of principal adverse sustainability indicators (PASI) under the EU Sustainable Finance Disclosure Regulation (SFDR). This chart 3600 also provides a comparison between a selected leg 3602 of the portfolio (as shown, the long leg) and the selected benchmark, which can each be adjusted, along with the percentage of the portfolio legs and benchmark that had available data, which may vary by metric.

As a final note, it should be understood and appreciated that, although the contents of panes are stated as having specific positions within the GUI, those positions are purely for purposes of example. The referenced panes could be arranged in other orders. Moreover, additional panes could be provided in a given view, one of the example layouts could be split into two layouts, or where multiple families are involved, the different panes in those families could be rearranged into different families without departing from the teachings herein.

As a result of the foregoing, a user using a system constructed in accordance with the teachings herein, can modify the specific holdings in a portfolio to account for the effect of ESG on the resultant modified portfolio.

Based upon the foregoing, it should also now be appreciated that we have developed a unique system, method and GUI that contains unique features which allow a user to easily understand the ESG characteristics of a portfolio's (or long- or short-only portion).

A common set of user interface tools allow a user to view such information and the system is designed so that a user selection will cause real-time dynamic updating of all appropriate GUI Modules and displays within the GUI depending on the selection. Users can also dynamically switch a benchmark selection, which will also cause real-time dynamic updating of all appropriate GUI Modules and displays within the GUI.

Advantageously, an index or ETF product can be searched for in a back-end database and used as the benchmark across all visuals in the GUI.

More particularly, in summary, within the Screening GUI Module, the user interface allows a user to see the high-level categories of screens, dynamically change the Revenue Threshold used for all screens, and within specific charts select, highlight, or examine the information in greater detail. Within a Screening GUI Module Sub-module an individual screen's revenue amount can be manually changed and overridden against the Revenue Threshold selection. A specific Screening GUI Module sub-module can be selected which then dynamically updates the other charts on the screen to allow for greater detail on, for example, GICS and country exposures. Also on a Screening GUI Module sub-module chart, a user can switch between chart and table view, and how the information is aggregated (% portfolio weight, count of issuers, or $ amount of portfolio). A GICS Level 1 chart can also be switched between chart view and table view, and also allows flexibility to switch between various financial characteristics such as GICS 1, GICS 2, GICS 3, Market Cap, Country, Region, and Country Status. Selecting any of these automatically updates the chart, thereby allowing a user to easily change how they are viewing the Screening content. A Distribution chart allows the user to see the security-level holdings for either the Long, Short, or Benchmark (which can be manually turned on or off by selecting the legend).

Within the Ratings GUI Module similar features also exist. A user can dynamically change between the Overall ESG Score, Environmental Score, Social Score, and Governance Score. This selection will alter all other graphs on the screen. A specific part of the Ratings Histogram chart can be selected, which will update a GICS Level 1 and Distribution chart. As above, a GICS Level 1 chart can be dynamically updated to adjust how the information is aggregated (Average Score based on the ESG Ratings Overview selection, Count of issuers, or Percent of Weight). The Distribution chart allows for the same functionality as the Screening chart.

Within the Climate GUI Module there are a selection of pane families which allow for detail across Carbon Analysis, Emissions Reduction Targets, and Climate Change Revenues. Each pane family contains unique charts and visualizations. Within Carbon Analysis the charts allow for a user to see how their weighted average carbon intensity (WACI) is broken out across the portfolio. Within Portfolio Settings a user can dynamically switch between just assessing Scope 1&2 emissions or also including (or only assessing) Scope 3 emissions. The visualization techniques and flexibility to click on specific sectors operates as in the above GUI Modules. Within Emissions Reduction Targets we have visualized this categorical variable while allowing a user the flexibility to switch between Weight and Count. We have also uniquely displayed both carbon emissions data and emissions reduction data in the same Distribution chart, while giving users the flexibility to switch the metrics on the x-axis and bubble size.

Within the Sustainable Themes GUI Module a user can dynamically select a specific theme within a Score Overview chart and the associated GICS Level 1 and Distribution charts in the other panes will each update accordingly. These charts can be further adjusted by the user either using drop-down selections, changing between Average Score, Count, and Weight, or zooming into the Distribution chart.

As a result of the foregoing, implementations of the teachings herein make it possible to highlight a portfolio's exposure to ESG impacting business activities of issuers or sectors based on an underlying screening sub-categories and revenue thresholds. It becomes possible to analyze, in a drill down fashion, in order to select and adjust a portfolio's exposure to various screening subcategories and to interactively adjust a revenue threshold according to preference.

A further advantage obtainable with some implementations is the ability to capture unique ESG preferences and analyze and compare a portfolio against a benchmark investment taking into account those preferences. This not only allows for the assessment of current exposures, but also allows for planning for future adjustments by highlighting decarbonization efforts and reduction targets, impact scenarios of future carbon tax changes on a company's earnings in EBITDA form.

Finally, another advantage obtainable with some implementations is that they can provide analytics describing the impact of a portfolio on the environment and the portfolio's performance on a list of sustainability indicators. This allows for setting thresholds on parameters such as revenue and carbon footprint and to adjust a portfolio's holdings according to those preferences.

The foregoing outlines, generally, the features and technical advantages of one or more implementations that can be constructed based upon the teachings in this disclosure in order that the following detailed description may be better understood. However, the advantages and features described herein are only a few of the many advantages and features available from representative examples of possible variant implementations and are presented only to assist in understanding. It should be understood that they are not to be considered limitations on the invention as defined by the appended claims, or limitations on equivalents to the claims. For instance, some of the advantages or aspects of different variants are mutually contradictory, in that they cannot be simultaneously present in a single embodiment. Similarly, some features or advantages may be applicable to one aspect and inapplicable to others. Thus, the foregoing features and advantages should not be considered dispositive in determining equivalence. Additional features and advantages will be apparent from the teachings of the description, drawings, and claims.

What is claimed is:

1. A system comprising:
   one or more processors;
   software, executable by the one or more processors that, when executed by the one or more processors, cause the system to
   a) retrieve Environmental, Social & Governance (ESG) related data from one or more first databases;
   b) retrieve financial-related data from one or more second databases;
   c) generate a dynamically interactive graphical user interface (GUI) comprising multiple GUI Modules comprising
      a Screening GUI Module,
      a Ratings GUI Module,
      a Climate GUI Module, and
      a Sustainability GUI Module;
      wherein the Screening GUI Module is generated by an ESG Micro Service and comprises at least two interactive, dynamically interrelated displayable panes containing a concurrent combination of
         i) ESG information based upon some of the ESG related data retrieved from the one or more first databases and
         ii) financial information based upon some of the financial-related data retrieved from the one or more second databases,
      such that, when a component within one of the at least two interactive, interrelated panes of the Screening GUI Module is selected, contents of at least an other of the at least two interactive, interrelated panes of the Screening GUI Module will automatically be updated in real-time based upon the selection; and
   d) receive a user selection of a component of a pane within a specific pane of the Screening GUI Module and generate, in real-time, an updated view in a chart within a different pane of the Screening GUI Module.

2. The system of claim 1, wherein the Ratings GUI Module is generated by the ESG Micro Service and comprises at least two interactive, dynamically interrelated displayable panes containing a concurrent combination of
   i) ESG information based upon some of the ESG related data retrieved from the one or more first databases and
   ii) financial information based upon some of the financial-related data retrieved from the one or more second databases,
such that, when a component within one of the at least two interactive, interrelated panes of the Ratings GUI Module is selected, contents of at least an other of the at least two interactive, interrelated panes of the Ratings GUI Module will automatically be updated in real-time based upon the selection.

3. The system of claim 1, wherein the Climate GUI Module is generated by the ESG Micro Service and comprises at least two interactive, dynamically interrelated displayable panes containing a concurrent combination of
   i) ESG information based upon some of the ESG related data retrieved from the one or more first databases and
   ii) financial information based upon some of the financial-related data retrieved from the one or more second databases,
such that, when a component within one of the at least two interactive, interrelated panes of the Climate GUI Module is selected, contents of at least an other of the at least two interactive, interrelated panes of the Climate GUI Module will automatically be updated in real-time based upon the selection.

4. The system of claim 1, wherein the Sustainability GUI Module is generated by the ESG Micro Service and comprises at least two interactive, dynamically interrelated displayable panes containing a concurrent combination of
   i) ESG information based upon some of the ESG related data retrieved from the one or more first databases and
   ii) financial information based upon some of the financial-related data retrieved from the one or more second databases,
such that, when a component within one of the at least two interactive, interrelated panes of the Sustainability GUI Module is selected, contents of at least an other of the at least two interactive, interrelated panes of the Sustainability GUI Module will automatically be updated in real-time based upon the selection.

5. The system of claim 1, wherein:
   when a component within one of the at least two interactive, interrelated panes of one of the Screening GUI Module, Ratings GUI Module, Climate GUI Module or Sustainability GUI Module is selected, contents of at least an other of the at least two interactive, interrelated panes of an other of the Screening GUI Module, Ratings GUI Module, Climate GUI Module or Sustainability GUI Module will automatically be updated in real-time based upon the selection.

6. The system of claim 5, wherein:

when the component within the one of the at least two interactive, interrelated panes of the one of the Screening GUI Module, Ratings GUI Module, Climate GUI Module or Sustainability GUI Module is selected, contents of all others of the at least two interactive, interrelated panes of the others of the Screening GUI Module, Ratings GUI Module, Climate GUI Module and Sustainability GUI Module will automatically be updated in real-time based upon the selection.

7. The system of claim 1 wherein a displayed pane of the Screening GUI Module includes a multivariate data visualization chart generated by an ESG Microservice including therewithin both ESG and financial formation.

8. The system of claim 7, wherein the multivariate data visualization chart includes, for each vertex, two or more user selectable categories.

9. The system of claim 8, wherein a user selection of a category from within the two or more user selectable categories will cause a result of the user selection to retrieve specific database information and propagate information derived from the database information to contents of other panes of the GUI.

* * * * *

UNITED STATES PATENT AND TRADEMARK OFFICE
CERTIFICATE OF CORRECTION

PATENT NO. : 11,875,163 B1
APPLICATION NO. : 18/367993
DATED : January 16, 2024
INVENTOR(S) : Srijan Sharma et al.

Page 1 of 1

It is certified that error appears in the above-identified patent and that said Letters Patent is hereby corrected as shown below:

On the Title Page

Item (54) and in the Specification Lines 1-5, Column 1 should read:
"SYSTEM AND METHOD FOR GENERATING A USER INTERFACE FOR VISUALIZATION, IN COMBINATION, ENVIRONMENTAL, SOCIAL, AND GOVERNANCE ( ESG ) AND FINANCIAL ANALYTICS"
Instead of:
"SYSTEM AND METHOD FOR GENERATING A USER INTERFACE FOR VISUALIZATION, IN COMBINATION, ENVIRONMENTAL, SOCIAL, AND GOVERNANCE ( ESG ) AND FINANCIAL ANALYTICS PRELIMINARY"

Signed and Sealed this
Twenty-seventh Day of February, 2024

Katherine Kelly Vidal
*Director of the United States Patent and Trademark Office*